United States Patent
Catovic et al.

(10) Patent No.: US 12,219,564 B2
(45) Date of Patent: Feb. 4, 2025

(54) LOCATION ACQUISITION DELAY MANAGEMENT

(71) Applicant: QUALCOMM Incorporated, San Diego, CA (US)

(72) Inventors: Amer Catovic, San Diego, CA (US); Mungal Singh Dhanda, Slough (GB); Ayan Sengupta, San Diego, CA (US); Alberto Rico Alvarino, San Diego, CA (US); Liangchi Hsu, San Diego, CA (US); Bharat Shrestha, San Diego, CA (US); Luis Fernando Brisson Lopes, Swindon (GB); Stephen William Edge, Escondido, CA (US)

(73) Assignee: QUALCOMM Incorporated, San Diego, CA (US)

( * ) Notice: Subject to any disclaimer, the term of this patent is extended or adjusted under 35 U.S.C. 154(b) by 675 days.

(21) Appl. No.: 17/394,397

(22) Filed: Aug. 4, 2021

(65) Prior Publication Data

US 2023/0037983 A1 Feb. 9, 2023

(51) Int. Cl.
| | |
|---|---|
| H04W 68/00 | (2009.01) |
| H04L 5/00 | (2006.01) |
| H04W 52/02 | (2009.01) |
| H04W 68/02 | (2009.01) |
| H04W 68/12 | (2009.01) |
| H04W 72/21 | (2023.01) |

(52) U.S. Cl.
CPC .......... H04W 72/21 (2023.01); H04L 5/0005 (2013.01)

(58) Field of Classification Search
CPC .............................. H04W 72/21; H04L 5/0005
See application file for complete search history.

(56) References Cited

U.S. PATENT DOCUMENTS

| | | |
|---|---|---|
| 2015/0282241 A1 | 10/2015 | Bergius et al. |
| 2022/0225265 A1* | 7/2022 | Jeong .................... H04W 76/20 |

OTHER PUBLICATIONS

Ericsson: "On Time and Frequency Synchronization Enhancements for IoT NTN", 3GPP TSG-RAN WG1 Meeting #104-bis-e, R1-2103061, 3rd Generation Partnership Project (3GPP), Mobile Competence Centre, 650, Route Des Lucioles, F-06921 Sophia-Antipolis Cedex, France, vol. RAN WG1, No. e-Meeting, Apr. 12, 2021-Apr. 20, 2021, Apr. 6, 2021, XP052177302, 9 Pages, Paragraph [0002] Paragraph [0004]-Paragraph [0005].

Gatehouse., et al., "Mobile-Termination with Non-Continuous Coverage in NTN", 3GPP TSG RAN WG2 meeting #114, R2-2106420, 3rd Generation Partnership Project (3GPP), Mobile Competence Centre, 650, Route Des Lucioles, F-06921 Sophia-Antipolis Cedex, France, vol. Ran WG2, No. Electronic Meeting, May 19, 2021-May 27, 2021, May 11, 2021, XP052007766, 3 Pages, paragraph [0002]-paragraph [0004], Sections 1-4, figures 1-3.

(Continued)

*Primary Examiner* — Moustapha Diaby
(74) *Attorney, Agent, or Firm* — Procopio, Cory, Hargreaves & Savitch LLP

(57) ABSTRACT

A UE may include IoT NTN device, and the UE may acquire the GNSS location to perform the time/frequency pre-compensation. A NAS layer of the UE may initiate a connection request procedure based on the GNSS fix procedure at one or more lower layer of the UE. A network may transmit a paging request to the UE, and manage a paging response timer based on the GNSS fix procedure at the UE.

21 Claims, 22 Drawing Sheets

(56) References Cited

OTHER PUBLICATIONS

Mediatek Inc., "On Discontinuous Coverage in IoT-NTN", 3GPP TSG-RAN WG2 Meeting #114-e, R2-2105254, 3rd Generation Partnership Project (3GPP), Mobile Competence Centre, 650, Route Des Lucioles, F-06921 Sophia-Antipolis Cedex, France, vol. RAN WG2, No. Online, May 19, 2021-May 27, 2021, May 11, 2021, XP052006903, 3 Pages, Paragraph [0002].

Nokia, et al., "Enhancement to Time and Frequency Synchronization for NB-IoT/eMTC over NTN", 3GPP TSG RAN WG1 #105, R1-2105405, 3rd Generation Partnership Project (3GPP), Mobile Competence Centre, 650, Route Des Lucioles, F-06921 Sophia-Antipolis Cedex, France, vol. RAN WG1, No. e-Meeting, May 19, 2021-May 27, 2021, May 12, 2021 (May 12, 2021), XP052011424, 14 Pages, Paragraph [2.3.4] Figure 1.

Partial International Search Report—PCT/US2022/037910—ISA/EPO—Oct. 28, 2022 12 pages.

Satcom G., et al., "Essential Adaptations for Discontinuous Coverage in IoT-NTN", 3GPP TSG RAN WG2 meeting #113b, R2-2102961, 3rd Generation Partnership Project (3GPP), Mobile Competence Centre, 650, Route Des Lucioles, F-06921 Sophia-Antipolis Cedex, France, vol. RAN WG2, No. Electronic Meeting, Apr. 12, 2021-Apr. 20, 2021, Apr. 1, 2021, XP051991968, 9 Pages, paragraph [0003].

Sony, et al., "Update to Solution 33: Delayed Paging Response", S2-186342, SA WG2 Meeting #128, 3rd Generation Partnership Project (3GPP), Mobile Competence Centre, 650, Route Des Lucioles, F-06921 Sophia-Antipolis Cedex, France, vol. SA WG2, No. Vilnius, LT, Jul. 2, 2018-Jul. 6, 2018, Jun. 25, 2018 (Jun. 25, 2018), XP051537832, 4 Pages, paragraph [6.33].

International Search Report and Written Opinion—PCT/US2022/037910—ISA/EPO—Mar. 3, 2023.

OPPO: "Nas Timers for GEO", 3GPP TSG CT WG1 Meeting #126-e, C1-205966, 3rd Generation Partnership Project, Mobile Competence Centre, 650, Route Des Lucioles, F-06921 Sophia-Antipolis Cedex, France, vol. CT WG1, No. Electronic meeting, Oct. 15, 2020-Oct. 26, 2020, Oct. 8, 2020, 3 Pages, XP051950969, The whole document.

Qualcomm Incorporated: "GNSS Fix and Paging Response Delay", 3GPP TSG-RAN WG2 Meeting #116-e, R2-2109967, 3rd Generation Partnership Project, Mobile Competence Centre, 650, Route Des Lucioles, F-06921 Sophia-Antipolis Cedex, France, vol. RAN WG2, No. E-Meeting, Nov. 1, 2021-Nov. 12, 2021, Oct. 22, 2021, 3 Pages, XP052066420, The whole document.

\* cited by examiner

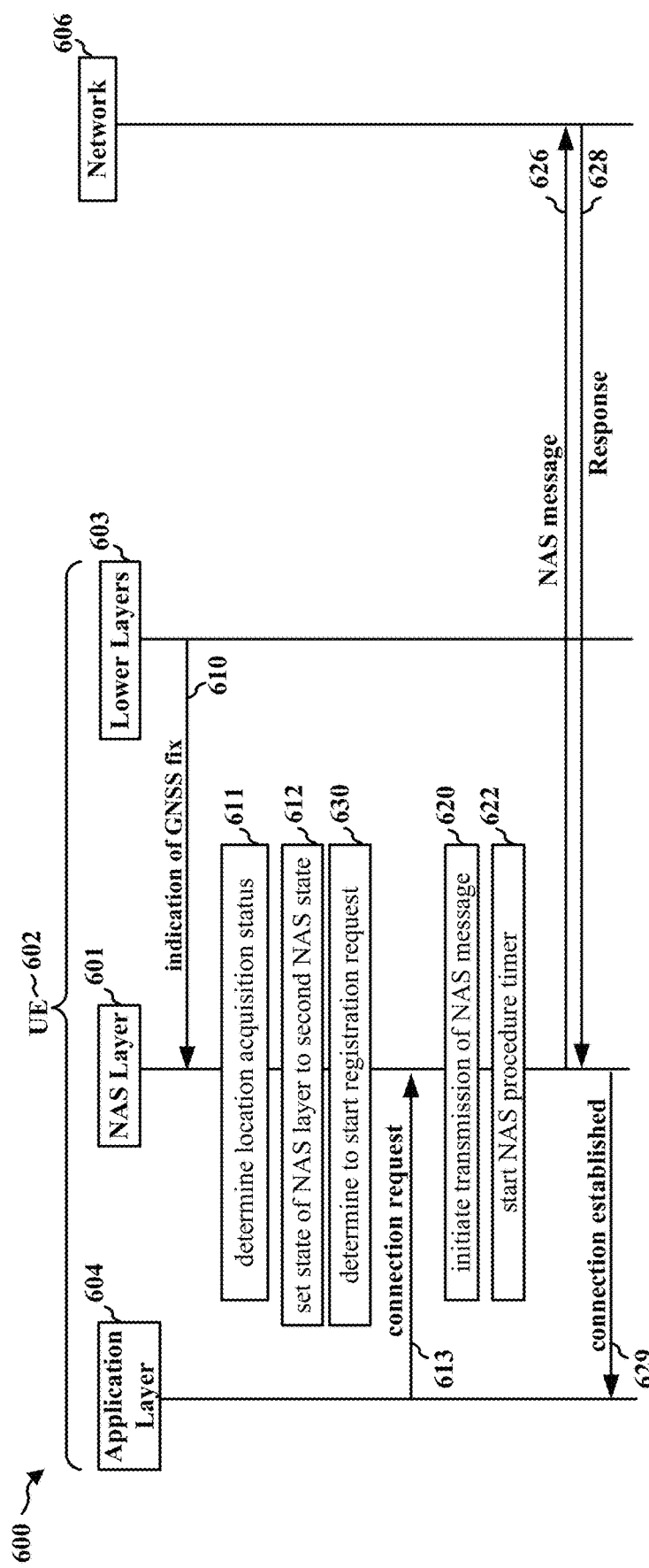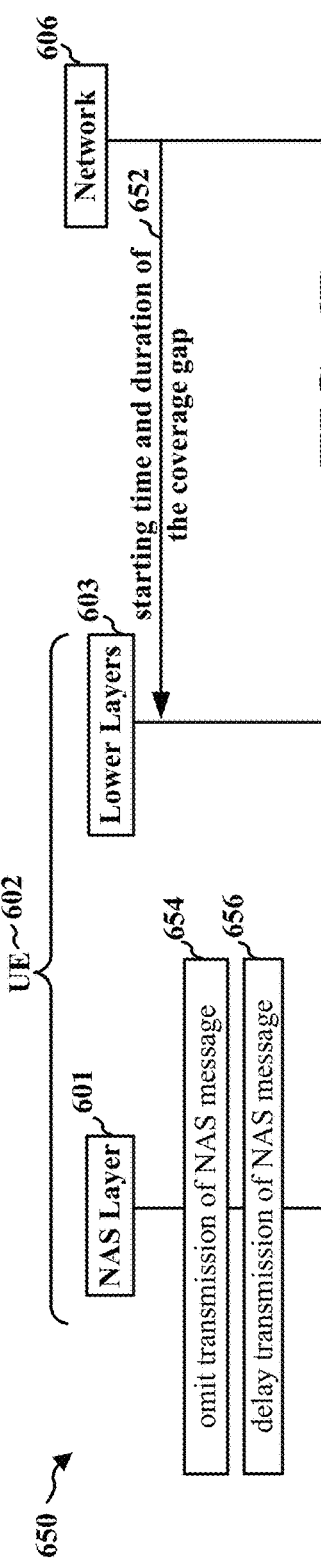
FIG. 6A
FIG. 6B

LOCATION ACQUISITION DELAY MANAGEMENT

TECHNICAL FIELD

The present disclosure relates generally to communication systems, and more particularly, to a method of wireless communication with a location acquisition delay management.

INTRODUCTION

Wireless communication systems are widely deployed to provide various telecommunication services such as telephony, video, data, messaging, and broadcasts. Typical wireless communication systems may employ multiple-access technologies capable of supporting communication with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is 5G New Radio (NR). 5G NR is part of a continuous mobile broadband evolution promulgated by Third Generation Partnership Project (3GPP) to meet new requirements associated with latency, reliability, security, scalability (e.g., with Internet of Things (IoT)), and other requirements. 5G NR includes services associated with enhanced mobile broadband (eMBB), massive machine type communications (mMTC), and ultra-reliable low latency communications (URLLC). Some aspects of 5G NR may be based on the 4G Long Term Evolution (LTE) standard. There exists a need for further improvements in 5G NR technology. These improvements may also be applicable to other multi-access technologies and the telecommunication standards that employ these technologies.

BRIEF SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

In an aspect of the disclosure, a method, a computer-readable medium, and an apparatus are provided. The apparatus may include a user equipment (UE) and a network. The UE may include internet of things (IoT) non-terrestrial network (NTN) (IoT NTN) device, and the UE may acquire a global navigation satellite system (GNSS) location to perform the time/frequency pre-compensation. A NAS layer of the UE may determine a location acquisition status associated with a GNSS location of the UE, and initiate a connection request procedure based on the GNSS fix procedure at one or more lower layer of the UE. The NAS layer may set a state of a NAS layer to a first state based on the location acquisition status indicating that the GNSS location is not available in a lower layer than the NAS layer, and change the state of the NAS layer to the second state of the NAS layer in response to receiving an indication from the lower layer that the GNSS location is available. The NAS layer may delay initiation of the connection request at the NAS layer under the first state of the NAS layer and transmit the connection request under the second state of the NAS layer. The NAS layer may add a time delay to a NAS procedure timer based on the location acquisition status, and start the NAS procedure timer based on transmitting the connection request at the NAS layer. The NAS layer may omit or delay the transmission of the registration request message during the coverage gap.

The network may transmit a paging request to the UE, and manage a paging response timer based on the GNSS fix procedure at the UE. The paging response timer may be controlling a retransmission of the paging request based on a paging response not being received from the UE. The network may receive a UE capability indication from the UE, and the UE capability indication may include a duration of a time delay for the UE to perform a time-frequency pre-compensation before initiating connection with the network. The GNSS location availability of the UE may be received as a UE communication parameter from a home subscriber server (HSS) of the network. For one example, the network may add a delay to the paging response timer based on the non-stationary status. For another example, the network may calculate a duration of the paging response timer based on the GNSS location availability of the UE. The network may start the paging response timer based on a coverage gap in time during which the UE is not covered by a cell of the network, the cell including an NTN cell or a terrestrial network (TN) cell. The network may start the paging response timer based on a time duration until a next coverage gap being greater than or equal to an additional delay for the UE to perform a time-frequency pre-compensation before initiating connection with the network.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

FIG. 6A is a call-flow diagram of wireless communication.

FIG. 6B is a call-flow diagram of wireless communication.

DETAILED DESCRIPTION

Figure 1:
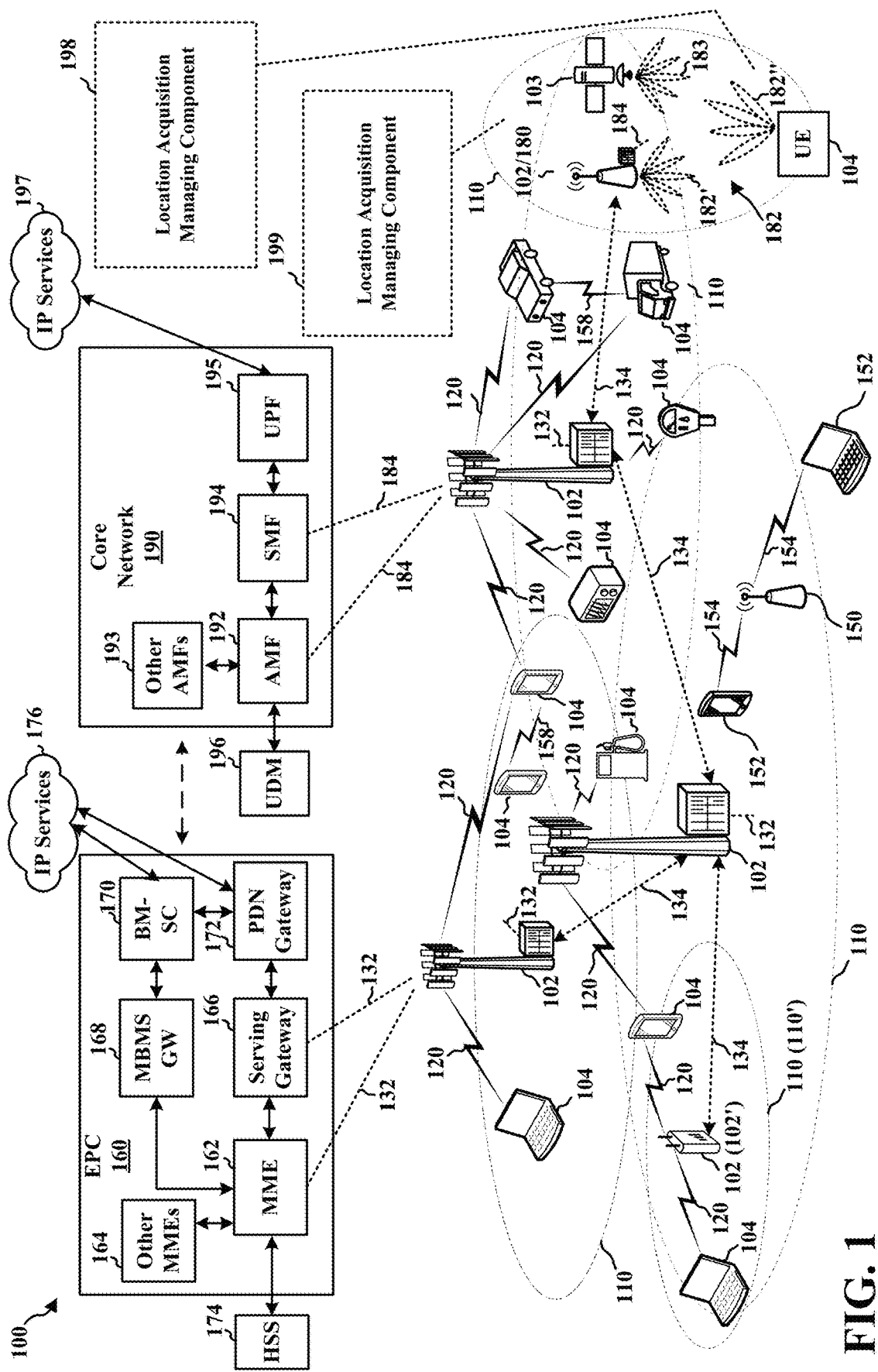
FIG. 1 is a diagram illustrating an example of a wireless communications system and an access network.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of telecommunication systems will now be presented with reference to various apparatus and methods. These apparatus and methods will be described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

Accordingly, in one or more example aspects, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise a random-access memory (RAM), a read-only memory (ROM), an electrically erasable programmable ROM (EEPROM), optical disk storage, magnetic disk storage, other magnetic storage devices, combinations of the types of computer-readable media, or any other medium that can be used to store computer executable code in the form of instructions or data structures that can be accessed by a computer.

While aspects and implementations are described in this application by illustration to some examples, those skilled in the art will understand that additional implementations and use cases may come about in many different arrangements and scenarios. Innovations described herein may be implemented across many differing platform types, devices, systems, shapes, sizes, and packaging arrangements. For example, implementations and/or uses may come about via integrated chip implementations and other non-module-component based devices (e.g., end-user devices, vehicles, communication devices, computing devices, industrial equipment, retail/purchasing devices, medical devices, artificial intelligence (AI)-enabled devices, etc.). While some examples may or may not be specifically directed to use cases or applications, a wide assortment of applicability of described innovations may occur. Implementations may range a spectrum from chip-level or modular components to non-modular, non-chip-level implementations and further to aggregate, distributed, or original equipment manufacturer (OEM) devices or systems incorporating one or more aspects of the described innovations. In some practical settings, devices incorporating described aspects and features may also include additional components and features for implementation and practice of claimed and described aspect. For example, transmission and reception of wireless signals necessarily includes a number of components for analog and digital purposes (e.g., hardware components including antenna, RF-chains, power amplifiers, modulators, buffer, processor(s), interleaver, adders/summers, etc.). It is intended that innovations described herein may be practiced in a wide variety of devices, chip-level components, systems, distributed arrangements, aggregated or disaggregated components, end-user devices, etc. of varying sizes, shapes, and constitution.

FIG. 1 is a diagram illustrating an example of a wireless communications system and an access network 100. The wireless communications system (also referred to as a wireless wide area network (WWAN)) includes base stations 102, UEs 104, an Evolved Packet Core (EPC) 160, and another core network 190 (e.g., a 5G Core (5GC)). The base stations 102 may include macrocells (high power cellular base station) and/or small cells (low power cellular base station). The macrocells include base stations. The small cells include femtocells, picocells, and microcells.

The base stations 102 configured for 4G LTE (collectively referred to as Evolved Universal Mobile Telecommunications System (UMTS) Terrestrial Radio Access Network (E-UTRAN)) may interface with the EPC 160 through first backhaul links 132 (e.g., S1 interface). The base stations 102 configured for 5G NR (collectively referred to as Next Generation RAN (NG-RAN)) may interface with core network 190 through second backhaul links 184. In addition to other functions, the base stations 102 may perform one or more of the following functions: transfer of user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, radio access network (RAN) sharing, multimedia broadcast multicast service (MBMS), subscriber and equipment trace, RAN information management (RIM), paging, positioning, and delivery of warning messages. The base stations 102 may communicate directly or indirectly (e.g., through the EPC 160 or core network 190) with each other over third backhaul links 134 (e.g., X2 interface). The first backhaul links 132, the second backhaul links 184, and the third backhaul links 134 may be wired or wireless.

The base stations 102 may wirelessly communicate with the UEs 104. Each of the base stations 102 may provide communication coverage for a respective geographic coverage area 110. There may be overlapping geographic coverage areas 110. For example, the small cell 102' may have a coverage area 110' that overlaps the coverage area 110 of one or more macro base stations 102. A network that includes both small cell and macrocells may be known as a heterogeneous network. A heterogeneous network may also include Home Evolved Node Bs (eNBs) (HeNBs), which may provide service to a restricted group known as a closed subscriber group (CSG). The communication links 120 between the base stations 102 and the UEs 104 may include uplink (UL) (also referred to as reverse link) transmissions from a UE 104 to a base station 102 and/or downlink (DL) (also referred to as forward link) transmissions from a base station 102 to a UE 104. The communication links 120 may use multiple-input and multiple-output (MIMO) antenna technology, including spatial multiplexing, beamforming, and/or transmit diversity. The communication links may be through one or more carriers. The base stations 102/UEs 104 may use spectrum up to Y MHz (e.g., 5, 10, 15, 20, 100, 400, etc. MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (e.g., more or fewer carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

Certain UEs 104 may communicate with each other using device-to-device (D2D) communication link 158. The D2D communication link 158 may use the DL/UL WWAN spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, WiMedia, Bluetooth, ZigBee, Wi-Fi based on the Institute of Electrical and Electronics Engineers (IEEE) 802.11 standard, LTE, or NR.

The wireless communications system may further include a Wi-Fi access point (AP) 150 in communication with Wi-Fi stations (STAs) 152 via communication links 154, e.g., in a 5 GHz unlicensed frequency spectrum or the like. When communicating in an unlicensed frequency spectrum, the STAs 152/AP 150 may perform a clear channel assessment (CCA) prior to communicating in order to determine whether the channel is available.

The small cell 102' may operate in a licensed and/or an unlicensed frequency spectrum. When operating in an unlicensed frequency spectrum, the small cell 102' may employ NR and use the same unlicensed frequency spectrum (e.g., 5 GHz, or the like) as used by the Wi-Fi AP 150. The small cell 102', employing NR in an unlicensed frequency spectrum, may boost coverage to and/or increase capacity of the access network.

The electromagnetic spectrum is often subdivided, based on frequency/wavelength, into various classes, bands, channels, etc. In 5G NR, two initial operating bands have been identified as frequency range designations FR1 (410 MHz-7.125 GHz) and FR2 (24.25 GHz-52.6 GHz). Although a portion of FR1 is greater than 6 GHz, FR1 is often referred to (interchangeably) as a "sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHz-24.25 GHz). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G NR operation beyond 52.6 GHz. For example, three higher operating bands have been identified as frequency range designations FR4a or FR4-1 (52.6 GHz-71 GHz), FR4 (52.6 GHz-114.25 GHz), and FR5 (114.25 GHz-300 GHz). Each of these higher frequency bands falls within the EHF band.

With the above aspects in mind, unless specifically stated otherwise, it should be understood that the term "sub-6 GHz" or the like if used herein may broadly represent frequencies that may be less than 6 GHz, may be within FR1, or may include mid-band frequencies. Further, unless specifically stated otherwise, it should be understood that the term "millimeter wave" or the like if used herein may broadly represent frequencies that may include mid-band frequencies, may be within FR2, FR4, FR4-a or FR4-1, and/or FR5, or may be within the EHF band.

A base station 102, whether a small cell 102' or a large cell (e.g., macro base station), may include and/or be referred to as an eNB, gNodeB (gNB), or another type of base station. Some base stations, such as gNB 180 may operate in a traditional sub 6 GHz spectrum, in millimeter wave frequencies, and/or near millimeter wave frequencies in communication with the UE 104. When the gNB 180 operates in millimeter wave or near millimeter wave frequencies, the gNB 180 may be referred to as a millimeter wave base station. The millimeter wave base station 180 may utilize beamforming 182 with the UE 104 to compensate for the path loss and short range. The base station 180 and the UE 104 may each include a plurality of antennas, such as antenna elements, antenna panels, and/or antenna arrays to facilitate the beamforming.

A base station 102, 103, or 180 may transmit a beamformed signal to the UE 104 in one or more transmit directions 182'. The UE 104 may receive the beamformed signal from the base station 102, 103, or 180 in one or more receive directions 182". The UE 104 may also transmit a beamformed signal to the base station 102, 103, or 180 in one or more transmit directions. The base station 102, 103, or 180 may receive the beamformed signal from the UE 104 in one or more receive directions. The base station 102, 103, or 180/UE 104 may perform beam training to determine the best receive and transmit directions for each of the base station 102, 103, or 180/UE 104. The transmit and receive directions for the base station 102, 103, or 180 may or may not be the same. The transmit and receive directions for the UE 104 may or may not be the same.

The base station 103 may be a non-terrestrial network (NTN) base station 103. The NTN base station 103 may be associated with the core network 190 and/or EPC 160, in some aspects. The NTN may operate similar to a base station 102 or 180 with a non-terrestrial location, such as at a satellite. The NTN base station 103 may include a satellite or an unmanned aerial system (UAS) platform. The NTN base station 103 may transmit a beamformed signal to the UE 104 in one or more transmit directions 183, and the UE 104 may also transmit a beamformed signal to the NTN base station 103 in one or more transmit directions.

The EPC 160 may include a Mobility Management Entity (MME) 162, other MMEs 164, a Serving Gateway 166, a Multimedia Broadcast Multicast Service (MBMS) Gateway 168, a Broadcast Multicast Service Center (BM-SC) 170, and a Packet Data Network (PDN) Gateway 172. The MME 162 may be in communication with a Home Subscriber Server (HSS) 174. The MME 162 is the control node that processes the signaling between the UEs 104 and the EPC 160. Generally, the MME 162 provides bearer and connection management. All user Internet protocol (IP) packets are transferred through the Serving Gateway 166, which itself is connected to the PDN Gateway 172. The PDN Gateway 172 provides UE IP address allocation as well as other functions. The PDN Gateway 172 and the BM-SC 170 are connected to the IP Services 176. The IP Services 176 may include the Internet, an intranet, an IP Multimedia Subsystem (IMS), a PS Streaming Service, and/or other IP services. The BM-SC 170 may provide functions for MBMS user service provisioning and delivery. The BM-SC 170 may serve as an entry point for content provider MBMS transmission, may be used to authorize and initiate MBMS Bearer Services within a public land mobile network (PLMN), and may be used to schedule MBMS transmissions. The MBMS Gateway 168 may be used to distribute MBMS traffic to the base stations 102 belonging to a Multicast Broadcast Single Frequency Network (MBSFN) area broadcasting a particular service, and may be responsible for session management (start/stop) and for collecting eMBMS related charging information.

The core network 190 may include an Access and Mobility Management Function (AMF) 192, other AMFs 193, a Session Management Function (SMF) 194, and a User Plane Function (UPF) 195. The AMF 192 may be in communication with a Unified Data Management (UDM) 196. The AMF 192 is the control node that processes the signaling between the UEs 104 and the core network 190. Generally, the AMF 192 provides QoS flow and session management. All user Internet protocol (IP) packets are transferred through the UPF 195. The UPF 195 provides UE IP address allocation as well as other functions. The UPF 195 is connected to the IP Services 197. The IP Services 197 may include the Internet, an intranet, an IP Multimedia Subsystem (IMS), a Packet Switch (PS) Streaming (PSS) Service, and/or other IP services.

The base station may include and/or be referred to as a gNB, Node B, eNB, an access point, a base transceiver station, a radio base station, a radio transceiver, a transceiver function, a basic service set (BSS), an extended service set (ESS), a transmit reception point (TRP), or some other suitable terminology. The base station 102 provides an access point to the EPC 160 or core network 190 for a UE 104. Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, a vehicle, an electric meter, a gas pump, a large or small kitchen appliance, a healthcare device, an implant, a sensor/actuator, a display, or any other similar functioning device. Some of the UEs 104 may be referred to as IoT devices (e.g., parking meter, gas pump, toaster, vehicles, heart monitor, etc.). The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology. In some scenarios, the term UE may also apply to one or more companion devices such as in a device constellation arrangement. One or more of these devices may collectively access the network and/or individually access the network.

Referring again to FIG. 1, in certain aspects, the UE 104 may include a location acquisition managing component 198 configured to determine a location acquisition status associated with a GNSS location of the UE, initiate a connection request for a NAS procedure based on the location acquisition status of the UE, and transmit the connection request to a network. In certain aspects, the base station 102, 103, or 180 may include a location acquisition managing component 199 configured to transmit a paging request to a UE, and manage a paging response timer based on a GNSS location availability of the UE, the paging response timer controlling a retransmission of the paging request based on a paging response not being received from the UE. Although the following description may be focused on 5G NR, the concepts described herein may be applicable to other similar areas, such as LTE, LTE-A, CDMA, GSM, and other wireless technologies.

Figure 2:
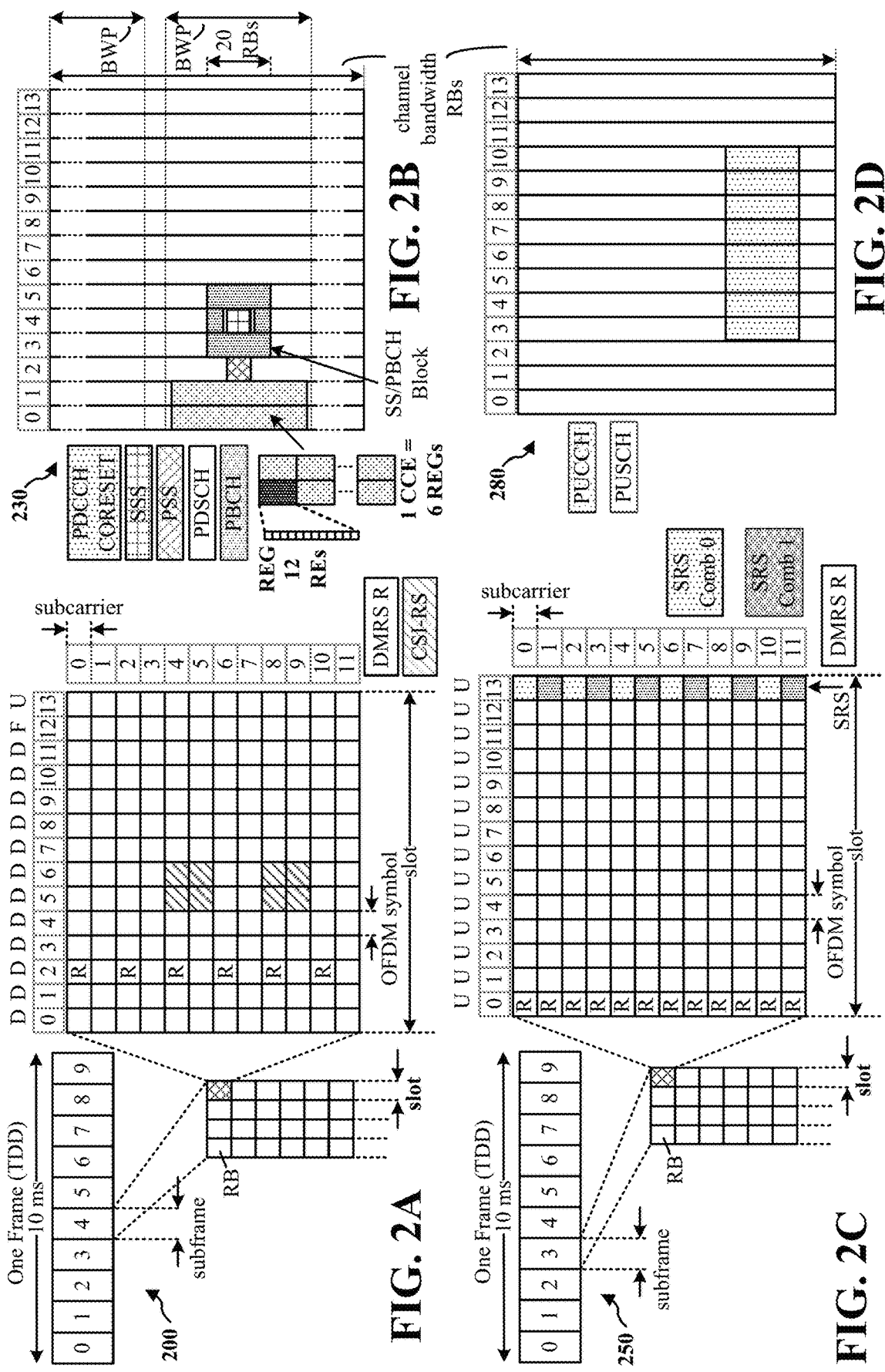
FIG. 2A is a diagram illustrating an example of a first frame, in accordance with various aspects of the present disclosure.
FIG. 2B is a diagram illustrating an example of DL channels within a subframe, in accordance with various aspects of the present disclosure.
FIG. 2C is a diagram illustrating an example of a second frame, in accordance with various aspects of the present disclosure.
FIG. 2D is a diagram illustrating an example of UL channels within a subframe, in accordance with various aspects of the present disclosure.

FIG. 2A is a diagram 200 illustrating an example of a first subframe within a 5G NR frame structure. FIG. 2B is a diagram 230 illustrating an example of DL channels within a 5G NR subframe. FIG. 2C is a diagram 250 illustrating an example of a second subframe within a 5G NR frame structure. FIG. 2D is a diagram 280 illustrating an example of UL channels within a 5G NR subframe. The 5G NR frame structure may be frequency division duplexed (FDD) in which for a particular set of subcarriers (carrier system bandwidth), subframes within the set of subcarriers are dedicated for either DL or UL, or may be time division duplexed (TDD) in which for a particular set of subcarriers (carrier system bandwidth), subframes within the set of subcarriers are dedicated for both DL and UL. In the examples provided by FIGS. 2A, 2C, the 5G NR frame structure is assumed to be TDD, with subframe 4 being configured with slot format 28 (with mostly DL), where D is DL, U is UL, and F is flexible for use between DL/UL, and subframe 3 being configured with slot format 1 (with all UL). While subframes 3, 4 are shown with slot formats 1, 28, respectively, any particular subframe may be configured with any of the various available slot formats 0-61. Slot formats 0, 1 are all DL, UL, respectively. Other slot formats 2-61 include a mix of DL, UL, and flexible symbols. UEs are configured with the slot format (dynamically through DL control information (DCI), or semi-statically/statically through radio resource control (RRC) signaling) through a received slot format indicator (SFI). Note that the description infra applies also to a 5G NR frame structure that is TDD.

FIGS. 2A-2D illustrate a frame structure, and the aspects of the present disclosure may be applicable to other wireless communication technologies, which may have a different frame structure and/or different channels. A frame (10 ms) may be divided into 10 equally sized subframes (1 ms). Each subframe may include one or more time slots. Subframes may also include mini-slots, which may include 7, 4, or 2 symbols. Each slot may include 14 or 12 symbols, depending on whether the cyclic prefix (CP) is normal or extended. For normal CP, each slot may include 14 symbols, and for extended CP, each slot may include 12 symbols. The symbols on DL may be CP orthogonal frequency division multiplexing (OFDM) (CP-OFDM) symbols. The symbols on UL may be CP-OFDM symbols (for high throughput scenarios) or discrete Fourier transform (DFT) spread OFDM (DFT-s-OFDM) symbols (also referred to as single carrier frequency-division multiple access (SC-FDMA) symbols) (for power limited scenarios; limited to a single stream transmission). The number of slots within a subframe is based on the CP and the numerology. The numerology defines the subcarrier spacing (SCS) and, effectively, the symbol length/duration, which is equal to 1/SCS.

| $\mu$ | SCS $\Delta f = 2^\mu \cdot 15$ [kHz] | Cyclic prefix |
|---|---|---|
| 0 | 15 | Normal |
| 1 | 30 | Normal |
| 2 | 60 | Normal, Extended |
| 3 | 120 | Normal |
| 4 | 240 | Normal |

For normal CP (14 symbols/slot), different numerologies $\mu$ 0 to 4 allow for 1, 2, 4, 8, and 16 slots, respectively, per subframe. For extended CP, the numerology 2 allows for 4 slots per subframe. Accordingly, for normal CP and numerology $\mu$, there are 14 symbols/slot and $2^\mu$ slots/subframe. The subcarrier spacing may be equal to $2^\mu *15$ kHz, where $\mu$ is the numerology 0 to 4. As such, the numerology $\mu=0$ has a subcarrier spacing of 15 kHz and the numerology $\mu=4$ has a subcarrier spacing of 240 kHz. The symbol length/duration is inversely related to the subcarrier spacing. FIGS. 2A-2D provide an example of normal CP with 14 symbols per slot and numerology $\mu=2$ with 4 slots per subframe. The slot duration is 0.25 ms, the subcarrier spacing is 60 kHz, and the symbol duration is approximately 16.67 µs. Within a set of frames, there may be one or more different bandwidth parts (BWPs) (see FIG. 2B) that are frequency division multiplexed. Each BWP may have a particular numerology and CP (normal or extended).

A resource grid may be used to represent the frame structure. Each time slot includes a resource block (RB) (also referred to as physical RBs (PRBs)) that extends 12 consecutive subcarriers. The resource grid is divided into multiple resource elements (REs). The number of bits carried by each RE depends on the modulation scheme.

As illustrated in FIG. 2A, some of the REs carry reference (pilot) signals (RS) for the UE. The RS may include demodulation RS (DM-RS) (indicated as R for one particular configuration, but other DM-RS configurations are possible) and channel state information reference signals (CSI-RS) for channel estimation at the UE. The RS may also include beam measurement RS (BRS), beam refinement RS (BRRS), and phase tracking RS (PT-RS).

FIG. 2B illustrates an example of various DL channels within a subframe of a frame. The physical downlink control channel (PDCCH) carries DCI within one or more control channel elements (CCEs) (e.g., 1, 2, 4, 8, or 16 CCEs), each CCE including six RE groups (REGs), each REG including 12 consecutive REs in an OFDM symbol of an RB. A PDCCH within one BWP may be referred to as a control resource set (CORESET). A UE is configured to monitor PDCCH candidates in a PDCCH search space (e.g., common search space, UE-specific search space) during PDCCH monitoring occasions on the CORESET, where the PDCCH candidates have different DCI formats and different aggregation levels. Additional BWPs may be located at greater and/or lower frequencies across the channel bandwidth. A primary synchronization signal (PSS) may be within symbol 2 of particular subframes of a frame. The PSS is used by a UE 104 to determine subframe/symbol timing and a physical layer identity. A secondary synchronization signal (SSS) may be within symbol 4 of particular subframes of a frame. The SSS is used by a UE to determine a physical layer cell identity group number and radio frame timing. Based on the physical layer identity and the physical layer cell identity group number, the UE can determine a physical cell identifier (PCI). Based on the PCI, the UE can determine the locations of the DM-RS. The physical broadcast channel (PBCH), which carries a master information block (MIB), may be logically grouped with the PSS and SSS to form a synchronization signal (SS)/PBCH block (also referred to as SS block (SSB)). The MIB provides a number of RBs in the system bandwidth and a system frame number (SFN). The physical downlink shared channel (PDSCH) carries user data, broadcast system information not transmitted through the PBCH such as system information blocks (SIBs), and paging requests.

As illustrated in FIG. 2C, some of the REs carry DM-RS (indicated as R for one particular configuration, but other DM-RS configurations are possible) for channel estimation at the base station. The UE may transmit DM-RS for the physical uplink control channel (PUCCH) and DM-RS for the physical uplink shared channel (PUSCH). The PUSCH DM-RS may be transmitted in the first one or two symbols of the PUSCH. The PUCCH DM-RS may be transmitted in different configurations depending on whether short or long PUCCHs are transmitted and depending on the particular PUCCH format used. The UE may transmit sounding reference signals (SRS). The SRS may be transmitted in the last symbol of a subframe. The SRS may have a comb structure, and a UE may transmit SRS on one of the combs. The SRS may be used by a base station for channel quality estimation to enable frequency-dependent scheduling on the UL.

FIG. 2D illustrates an example of various UL channels within a subframe of a frame. The PUCCH may be located as indicated in one configuration. The PUCCH carries uplink control information (UCI), such as scheduling requests, a channel quality indicator (CQI), a precoding matrix indicator (PMI), a rank indicator (RI), and hybrid automatic repeat request (HARQ) acknowledgment (ACK) (HARQ-ACK) feedback (i.e., one or more HARQ ACK bits indicating one or more ACK and/or negative ACK (NACK)). The PUSCH carries data, and may additionally be used to carry a buffer status report (BSR), a power headroom report (PHR), and/or UCI.

Figure 3:
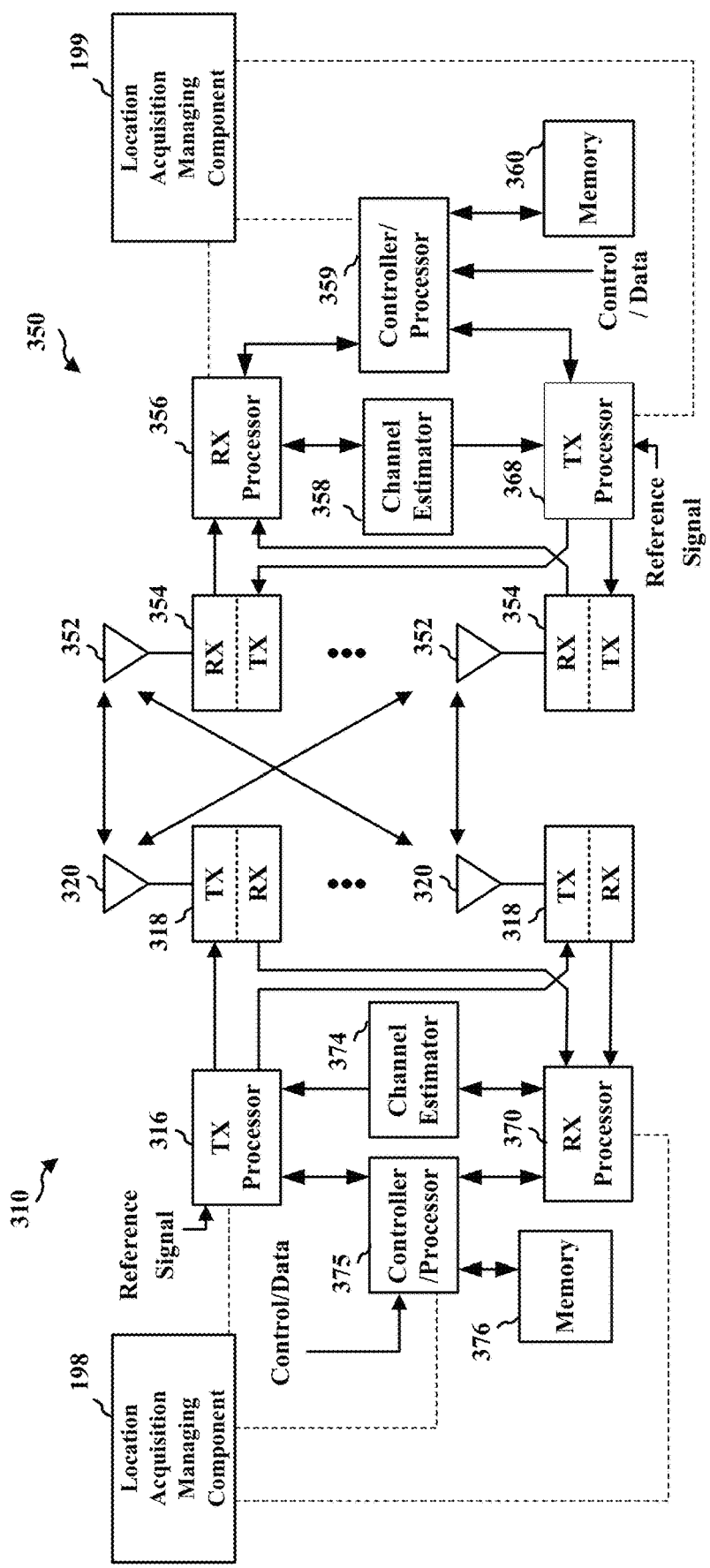
FIG. 3 is a diagram illustrating an example of a base station and user equipment (UE) in an access network.

FIG. 3 is a block diagram of a base station 310 in communication with a UE 350 in an access network. The base station 310 may correspond to the base station 102/180 and/or the NTN base station 103. In the DL, IP packets from the EPC 160 may be provided to a controller/processor 375. The controller/processor 375 implements layer 3 and layer 2 functionality. Layer 3 includes a radio resource control (RRC) layer, and layer 2 includes a service data adaptation protocol (SDAP) layer, a packet data convergence protocol (PDCP) layer, a radio link control (RLC) layer, and a medium access control (MAC) layer. The controller/processor 375 provides RRC layer functionality associated with broadcasting of system information (e.g., MIB, SIBs), RRC connection control (e.g., RRC connection paging, RRC connection establishment, RRC connection modification, and RRC connection release), inter radio access technology (RAT) mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer packet data units (PDUs), error correction through ARQ, concatenation, segmentation, and reassembly of RLC service data units (SDUs), re-segmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from TBs, scheduling information reporting, error correction through HARQ, priority handling, and logical channel prioritization.

The transmit (TX) processor 316 and the receive (RX) processor 370 implement layer 1 functionality associated with various signal processing functions. Layer 1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The TX processor 316 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 374 may be used to determine the coding and modulation scheme, as well as for spatial processing. The channel estimate may be derived from a reference signal and/or channel condition feedback transmitted by the UE 350. Each spatial stream may then be provided to a different antenna 320 via a separate transmitter 318 TX. Each transmitter 318 TX may modulate a radio frequency (RF) carrier with a respective spatial stream for transmission.

At the UE 350, each receiver 354 RX receives a signal through its respective antenna 352. Each receiver 354 RX recovers information modulated onto an RF carrier and provides the information to the receive (RX) processor 356. The TX processor 368 and the RX processor 356 implement layer 1 functionality associated with various signal processing functions. The RX processor 356 may perform spatial processing on the information to recover any spatial streams destined for the UE 350. If multiple spatial streams are destined for the UE 350, they may be combined by the RX processor 356 into a single OFDM symbol stream. The RX processor 356 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, are recovered and demodulated by determining the most likely signal constellation points transmitted by the base station 310. These soft decisions may be based on channel estimates computed by the channel estimator 358. The soft decisions are then decoded and deinterleaved to recover the data and control signals that were originally transmitted by the base station 310 on the physical channel. The data and control signals are then provided to the controller/processor 359, which implements layer 3 and layer 2 functionality.

The controller/processor 359 can be associated with a memory 360 that stores program codes and data. The memory 360 may be referred to as a computer-readable medium. In the UL, the controller/processor 359 provides demultiplexing between transport and logical channels, packet reassembly, deciphering, header decompression, and control signal processing to recover IP packets from the EPC 160. The controller/processor 359 is also responsible for error detection using an ACK and/or NACK protocol to support HARQ operations.

Similar to the functionality described in connection with the DL transmission by the base station 310, the controller/processor 359 provides RRC layer functionality associated with system information (e.g., MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TBs, demultiplexing of MAC SDUs from TBs, scheduling information reporting, error correction through HARQ, priority handling, and logical channel prioritization.

Channel estimates derived by a channel estimator 358 from a reference signal or feedback transmitted by the base station 310 may be used by the TX processor 368 to select the appropriate coding and modulation schemes, and to facilitate spatial processing. The spatial streams generated by the TX processor 368 may be provided to different antenna 352 via separate transmitters 354TX. Each transmitter 354TX may modulate an RF carrier with a respective spatial stream for transmission.

The UL transmission is processed at the base station 310 in a manner similar to that described in connection with the receiver function at the UE 350. Each receiver 318RX receives a signal through its respective antenna 320. Each receiver 318RX recovers information modulated onto an RF carrier and provides the information to a RX processor 370.

The controller/processor 375 can be associated with a memory 376 that stores program codes and data. The memory 376 may be referred to as a computer-readable medium. In the UL, the controller/processor 375 provides demultiplexing between transport and logical channels, packet reassembly, deciphering, header decompression, control signal processing to recover IP packets from the UE 350. IP packets from the controller/processor 375 may be provided to the EPC 160. The controller/processor 375 is also responsible for error detection using an ACK and/or NACK protocol to support HARQ operations.

At least one of the TX processor 368, the RX processor 356, and the controller/processor 359 may be configured to perform aspects in connection with 198 of FIG. 1. At least one of the TX processor 316, the RX processor 370, and the controller/processor 375 may be configured to perform aspects in connection with 199 of FIG. 1.

Figure 4:
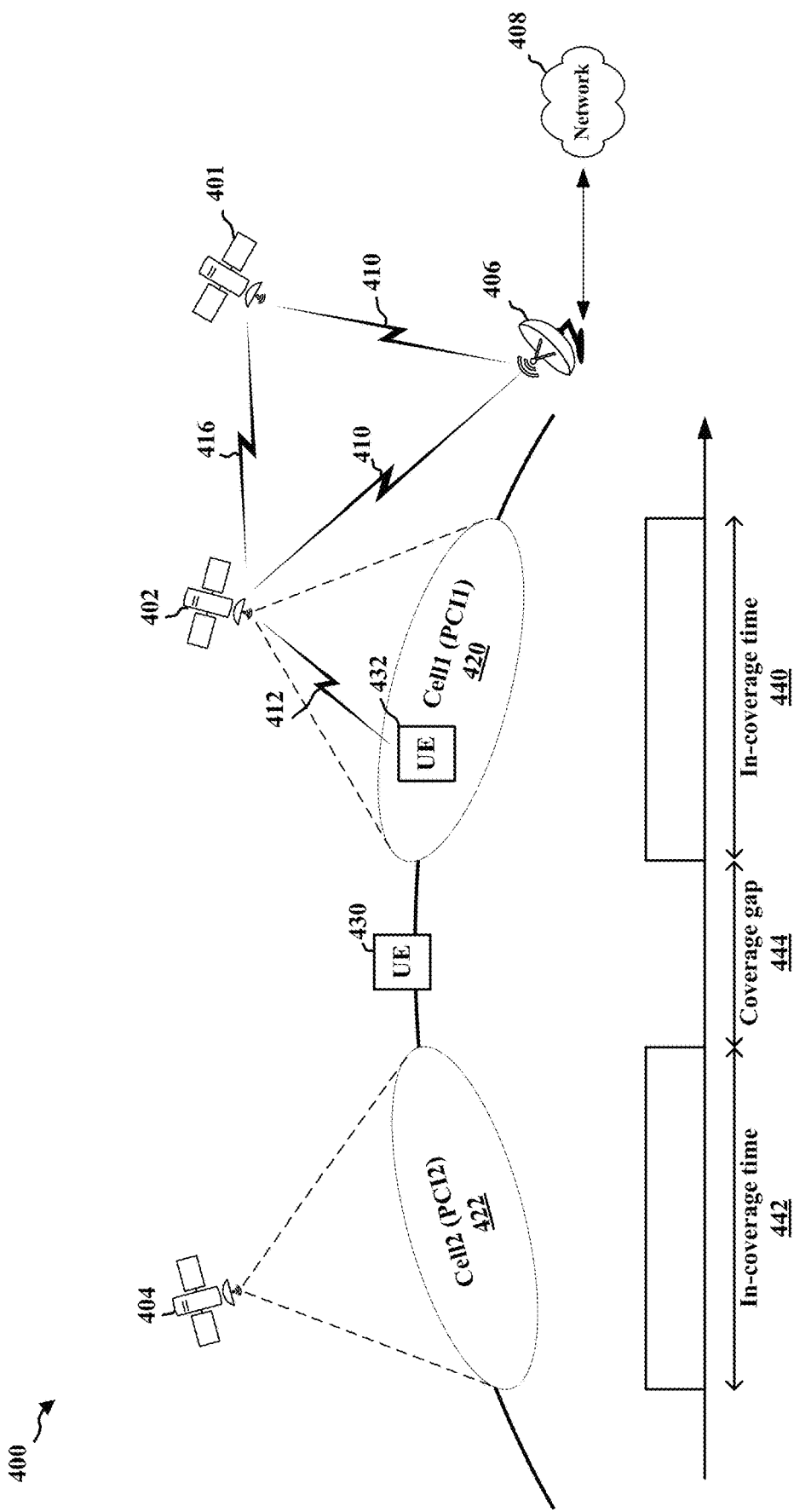
FIG. 4 illustrates an example of a non-terrestrial network (NTN) configuration.

FIG. 4 illustrates an example of an NTN 400 configuration. An NTN may refer to a network, or a segment of a network, that uses RF resources on-board a satellite or UAS platform. In some aspects, the NTN may comprise an NR-NTN. The example provides that the NTN 400 may include a first NTN base station 402, a second NTN base station 404, a third NTN base station 401, one or more NTN gateways 406, a network 408, and a UE 430 outside the cell coverage and the UE 432 within the cell coverage of the first NTN base station 402.

In some aspects, the UE 430 or the UE 432 may include the IoT devices, and the UE may be connected to the NTN for wireless communication.

One or more NTN gateways 406 may connect the NTN to a public data network. For a transparent satellite, the NTN gateway 406 may support functions to forward a signal from the satellite to a Uu interface, such as an NR-Uu interface. For a regenerative satellite, the gateway 406 may provide a transport network layer node, and may support transport protocols, e.g., acting as an IP router. A satellite radio interface (SRI) may provide IP trunk connections between the NTN gateway 406 and the satellite to transport NG or F1 interfaces, respectively. One or more geosynchronous equatorial orbit (GEO) satellites (e.g., which may be referred to herein as the first NTN base station 402, the second NTN base station 404, or the third NTN base station 401) may be fed by one or more NTN gateways 406, and the one or more satellites may be deployed across the satellite targeted coverage, which may correspond to regional coverage or even continental coverage. A non-GEO satellite may be served successively by one or more gateways 406 at a time, and the NTN may be configured to provide service and feeder link continuity between the successive serving gateways 406 with time duration to perform mobility anchoring and handover.

The first NTN base station 402, including satellites or UAS platform, may communicate with the data network 408 through a feeder link 410 established between the first NTN base station 402 and the gateway 406 in order to provide service to the UE 432 within the cell coverage, or field of view of cell 420, of the first NTN base station 402 via a service link 412. A satellite may correspond to a space-borne vehicle embarking a bent pipe payload or a regenerative payload telecommunication transmitter, placed into Low-Earth Orbit (LEO), Medium-Earth Orbit (MEO), or Geostationary Earth Orbit (GEO). A UAS may refer to a system encompassing Tethered UAS (TUA), Lighter Than Air UAS (LTA), Heavier Than Air UAS (HTA), e.g., in altitudes typically between 8 and 50 km including High Altitude Platforms (HAPs). A feeder link may include a wireless link between an NTN gateway and a satellite, UAS, etc. The service link 412 may refer to a radio link between a satellite (e.g., the base station 402) and a UE 432. As described in connection with FIG. 1, the NTN base station 402 may use one or more directional beams, e.g., beamforming, to exchange communication with the UE 432. A satellite beam may refer to a wireless communication beam generated by an antenna on-board a satellite.

In some aspects, a UE may include a low-cost IoT device with delay-tolerant services. That is, the UE may include IoT devices such as utility meters, sensors collect weather measurement once every hour, etc., that may have limited computing budget and be configured with low latency and/or bandwidth specification. In one aspect, such IoT NTN devices may not have the ability to continuously maintain their location information, and in another aspect, the IoT NTN devices may be configured to support a global navigation satellite system (GNSS) and/or a global positioning system (GPS), but not necessarily at the same time with the data transmission and/or reception.

The IoT NTN devices may be configured to acquire the GNSS location to perform time/frequency pre-compensation before initiating the uplink transmission. That is, before the IoT NTN device may initiate the uplink data transmission to the NTN, the IoT NTN device may acquire the GNSS location to perform the time/frequency pre-compensation. The GNSS fix or GNSS location acquisition procedure may take a relatively extensive time delay, e.g., between 10 to 30 seconds, and therefore, the IoT NTN devices and the NTN providing the wireless communication to the IoT NTN devices may experience inefficiencies in the transmission of uplink messaged in the handling of paging response in the network.

In another aspect, the UEs 432 may communicate with the NTN base station 402 via the service link 412, and a third NTN base station 401 may relay the communication for the first NTN base station 402 through an inter-satellite link (ISL) 416, and the third NTN base stations 401 may communicate with the data network 408 through the feeder link 410 established between the third NTN base stations 401 and the NTN gateway 406. The ISL links may be provided between a constellation of satellites and may involve the use of transparent payloads on-board the satellites. The ISL may operate in an RF frequency or an optical band.

In some aspects, the NTN may include a low-cost deployment with incomplete constellations and/or cell coverage. That is, the NTN cell provided by the NTN may have one or more coverage gaps. Referring to FIG. 4, the first NTN base station 402 may provide the first NTN cell 420 with a first physical cell ID (PCI), i.e., PCI1, and the second NTN base station 404 may provide a second NTN cell 422 with a second PCI, i.e., PCI2. Due to the incomplete coverage of the NTN cells, the UE 430 disposed between the first NTN cell 420 and the second NTN cell 422 may not be covered by one or more NTN cells (e.g., the first NTN cell 420 or the second NTN cell 422), respectively, provided by the first NTN base station 402 or the second NTN base station 404. Therefore, the UE 430 may be in the coverage gap 444, during which the UE 430 is not covered by the NTN cell provided by the network.

The first NTN cell 420 may correspond with a first in-coverage time 440, the second NTN cell 422 may correspond with a second in-coverage time 442, and the area not covered by any NTN cell between the first NTN cell 420 and the second NTN cell 422 may correspond with a coverage gap 444. For example, a stationary UE in a 1000 km NTN cell may have an in-coverage time 440/442 of about 2.2 minutes (132 seconds) and a coverage gap 444 between 10 minutes and 40 minutes.

When the first NTN cell 420 coverage becomes available to the UE 432, the backhaul link may be assumed available for the UE 432. The UEs 430 and 432 may be aware of the coverage gap 444 schedules. That is, the UEs 430 and 432 and the NTN base stations 402 and 404 may be aware when the UEs 430 and 432 may be within the in-coverage time 440 and 442 or the coverage gap 444. However, the core network may not be aware of the coverage gap 444. Therefore, certain data communications, e.g., transmission and reception of message on NAS layer, may not be aware of the time-consuming GNSS fix procedure. The GNSS fix procedure may refer to the procedure performed by the UEs 430 and 432 to acquire the signals of a sufficient number of the NTN base stations 402 and 404 (e.g., GNSS satellites) to confidently determine the location of the UEs 430 and 432, e.g., to a particular level of estimated accuracy. In one embodiment, the sufficient number of the NTN base stations 402 and 404 may be 4. In another embodiment, the sufficient number of the NTN base stations 402 and 404 may be 6. Acquiring of the signals may refer to the procedure by the UE to detect the energy and the timing of the signals from each NTN base station. The duration of the GNSS fix procedure may depend on several factors. In one example, the GNSS fix procedure may be executed without any previous knowledge about the timing of the satellite signals (i.e., cold start). In another example, the GNSS the procedure may be executed with a previous knowledge about the timing of the satellite signals, which may take shorter than the cold start. The previous knowledge of the timing of the satellite signals may become invalid after a certain amount of time has passed since the last GNSS fix procedure.

The first NTN base station 402, the second NTN base station 404, and the third NTN base station 401 of FIG. 4 may be configured to perform aspects in connection with the location acquisition managing component 199 of FIG. 1. The UEs 430 and 432 of FIG. 4 may be configured to perform aspects in connection with the location acquisition managing component 198 of FIG. 1.

Figure 5:
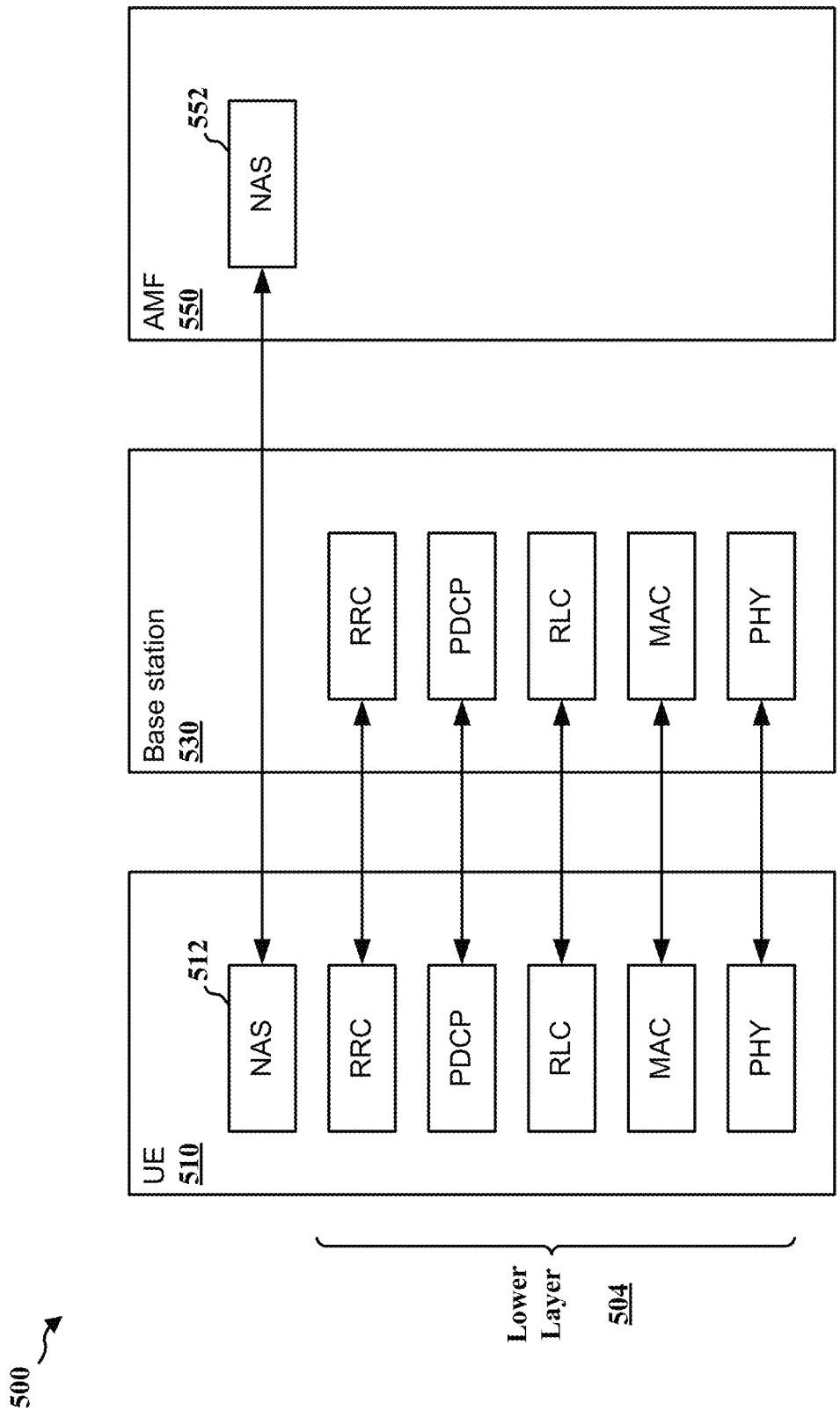
FIG. 5 illustrates an example of control plane protocol stack of wireless communication.

FIG. 5 illustrates an example of control plane protocol stack 500 of wireless communication. The example of control plane protocol stack 500 may include a UE 510, a base station 530, and an Access and Mobility Management Function (AMF) 550 of a core network. The UE 510 and the AMF 550 may include a non-access-stratum (NAS) layer and the lower layers 504. The lower layer may include the RRC layer, the PDCP layer, the RLC layer, the MAC layer, and the PHY layer. The NAS layer may refer to a highest stratum of the control plane between UE and AMF at the radio interface. The main functions of the protocols at the NAS layer may include a mobility management of the UE and the support of session management procedures to establish and maintain the IP connectivity between the UE and a packet data network (PDN) gateway. That is, the NAS layer may provide the support for the connection between the UE and the network. Accordingly, the NAS layer 512 of the UE 510 and the NAS layer 552 of the AMF 550 may provide the support for the connectivity between the UE 510 and the AMF 550.

In one aspect, the NAS layer may initiate the connection request and transmit the registration request to NAS layer of the core network. However, the NAS layer logic may not be aware of the time-consuming GNSS fix procedure at the lower layer 504. Accordingly, The NAS layer 512 of the UE may initiate the connection request, but the connection request may not be transmitted to the network due to a lack of valid location information.

From the perspective of the UE, e.g., IoT NTN devices, the NAS layer of the UE may initiate a connection request towards the lower layers and start the NAS procedure supervision timer (i.e., NAS procedure timer), e.g., for sending a registration request message. For example, the NAS procedure timer may be configured as 15 seconds for the registration procedure. If the NAS procedure timer expires before the NAS layer has received a response from the network to the transmitted registration message, the NAS layer re-starts or aborts the registration procedure. However, at the lower layers, the procedure to fix, e.g., determine, the GNSS address may take 14 seconds before sending out the RRC connection request message, as an example. The time may take less than 14 seconds or more than 14 seconds in other examples. After the GNSS fix, the RRC procedure may be completed in 0.5 seconds, for example, and the registration request message may be transmitted to the network side at the lower layers 14.5 seconds after initiating the connection request at the NAS layer with the 15 seconds NAS procedure timer running. Therefore, the 15 seconds NAS procedure timer may expire before receiving, from the network, a response to the registration request message, and the NAS layer may abort the initial attempt and re-starts or aborts the procedure.

The failed first attempt may cause wasted energy on the UE's side, and the signaling uses limited resources of the IoT NTN devices. The UE may perform multiple procedures in order to connect to the network. The additional procedure is due to the NAS layer assuming that the application layer that the lower layers are capable of establishing the connection without delay, when the lower layers may instead establish the GNSS location to perform the time/frequency pre-compensation prior to transmitting the registration request message to the network. Furthermore, due to the discontinuous coverage, the UE may further wait for the next in-coverage time to successfully initiate the connection request.

A UE may determine a location acquisition status associated with the GNSS location of the UE, initiate a connection request for the NAS procedure based on the location acquisition status of the UE, and transmit the connection request to a network. In one aspect, the location acquisition status may indicate whether the GNSS location is available or can be made available within a short period of time (e.g., no need to get a GNSS fix). In another aspect, the location acquisition status may indicate that the UE is a type that employs an additional delay in the one or more lower layers for GNSS location acquisition.

In some aspects, one or more lower layers may maintain awareness of the GNSS location availability. That is, the UE may maintain an awareness of the GNSS location availability at the one or more lower layers of the UE. The one or more lower layers of the UE may be configured to provide an indication to the NAS layer about the GNSS location availability. Based on the indication of the GNSS location availability received from the one or more lower layers, the NAS layer may determine whether to initiate the connection request to the one or more lower layers. That is, based on the GNSS location being available in the one or more lower layers, the NAS layer may initiate the connection request to the one or more lower layers.

The NAS layer may maintain a first NAS state, in which the UE is registered but is unable to initiate connection requests due to a lack of valid location information. That is, the UE may be configured with the first NAS state that indicates that the UE is unable to initiate connection requests before establishing the GNSS Fix. The indication of the GNSS location availability may be received from the one or more lower layers, and the state of the NAS layer of the UE may be set to the first NAS state that indicates that the UE is unable to initiate connection requests before establishing the GNSS Fix. The first NAS state may be considered as a substitute of a registered state, such as a 5GMM-REGISTERED state. In one example, the state may be referred to "5GMM-REGISTERED.NO-LOCATION-AVAILABLE" state. In another example, the first NAS state may be considered as a substate of a 5GMM-IDLE state and may be referred to as "5GMM-IDLE mode with location delay." In other examples, the first NAS state may be referred to by another name.

The NAS layer may be set to the first NAS state upon receiving the indication from the one or more lower layers that the GNSS location is not available. The UE may change the state of the NAS layer out of the first NAS state upon receiving the indication from the one or more lower layers that the location is available. That is, the UE may change the state of the NAS layer from the first NAS state to a different state, in which the NAS layer may initiate the connection request. The different states of the NAS layer may include states, e.g., the 5GMM-REGISTERED.NORMAL-SERVICE state or the 5GMM-IDLE state, respectively, upon receiving the indication from the one or more lower layers that the GMSS location is available.

Based on the NAS layer being in the first NAS state, the NAS layer may indicate to the application layer that the connection requests are not possible due to the location being unavailable. That is, the UE may be in the first NAS state indicating that the UE is unable to initiate connection requests before establishing the GNSS Fix, and the NAS layer in the first NAS state may be configured to indicate the application layer that the connection request at the NAS layer is delayed until the state of the NAS layer is changed to a different state.

In some aspects, the NAS layer may determine whether the UE is of the type that employs an additional delay in the lower layers for GNSS location acquisition and may determine a NAS procedure timer based on the type of the UE. That is, based on the UE being of the type that uses an additional delay in the lower layers for the location acquisition, and the NAS procedure timer may be determined based on the type of the UE. The type of the UE may be determined based on the UE configuration. The UE configuration may indicate the type of the UE, indicating whether the UE uses the additional delay in the lower layers for the GNSS location acquisition.

In response to the NAS layer determines that the UE is of the type that uses the additional delay in the one or more lower layers for the GNSS location acquisition, the NAS layer may apply the additional delay to the NAS procedure timer. The delay may correspond to the time to acquire the GNSS fix. That is, based on the NAS layer determining that the UE uses the additional delay in the one or more lower layers for the GNSS location acquisition, the NAS layer may increase the NAS procedure timer based on the additional delay so that the NAS procedure timer may not expire due to the additional delay from the GNSS location acquisition at the one or more lower layers. For example, if the NAS procedure timer is 15 seconds and the NAS layer determines that the UE will use a 10 seconds delay in the one or more lower layers for the GNSS location acquisition, the UE may increase the NAS procedure timer by 10 seconds and set the NAS procedure timer to be 25 seconds. Accordingly, UE may increase the NAS procedure timer based on the additional delay in the one or more lower layers for the GNSS location acquisition to avoid the expiration of the NAS procedure timer due to the additional delay from the GNSS location acquisition.

In one aspect, the delay may be applied if the time since the last uplink transmission is greater than a threshold, wherein the threshold corresponds to the validity time of the GNSS fix. That is, even if the NAS layer determines that the UE is specified with the additional delay in the one or more lower layers for the GNSS location acquisition, if the GNSS location acquisition from the previous uplink transmission is still valid, the UE may initiate the connection request without incurring the additional delay. Accordingly, the NAS layer may determine if the time since the last uplink transmission is shorter than the validity duration of the GNSS location, the GNSS location is still valid, and the UE may not add the additional delay to increase the NAS procedure timer.

In another aspect, the NAS layer may determine that the additional delay would cause the message to be sent during the coverage gap, and the NAS layer may be configured to not send the registration request message or further delay the registration request message by the duration of the coverage gap. The registration request message may be transmitted to the network based on the one or more lower layers establishing the GNSS location information and the RRC connection with the network. However, the NAS procedure timer may be increased by the additional delay due to the GNSS location acquisition at the one or more lower layers and cause the transmission of the registration request message to be scheduled during the coverage gap. Since the UE and the network may not communicate during the coverage gap, the UE may not transmit the registration request message to the network. In one aspect, the NAS layer of the UE may determine to omit the transmission of the registration request. The UE may re-initiate the connection request within the subsequent in-coverage time. In another aspect, the NAS layer of the UE may postpone the transmission of the registration request to the subsequent in-coverage time. That is, the UE may delay the transmission of the registration request for a time delay corresponding to the duration of the coverage gap so that the registration request may be transmitted to the network during the subsequent in-coverage time.

From the network's perspective, the network may page the UE and start a paging response timer. That is, the network may transmit a paging request to the UE and run the paging response timer until the network receives a paging response from the UE. The paging response timer may run in response to transmitting the paging request to the UE, and the network may declare that the transmission of the paging request failed in response to the expiration of the paging response timer. The network may calculate the paging response timer to compensate for the additional time delay from the GNSS location acquisition at the UE.

For example, the paging response timer may be configured to 10 seconds. The UE may receive the page at the one or more lower layers, and the UE may forward the paging request to the NAS layer. The NAS layer may initiate connection establishment procedure (e.g., sends the SER- VICE REQUEST message) to respond to the paging request received from the network. For example, the one or more lower layers of the UE may take 10 seconds to acquire GNSS fix before sending the SERVICE REQUEST message out to the network. The network, not being aware of this, may declare that the paging request was not successful and re-send the paging request to the UE.

Because the initial transmission of the paging request may be unsuccessful from the delay on the UE side to establish the GNSS fix, the network may have wasted energy and reduced efficiency. The network may also have wasted network resources on transmitting the futile paging request. In some cases, the network may declare the UE unreachable after the first attempt. Because of the discontinuous coverage in the cells, the network may need to wait for the next in-coverage time to page the UE again.

The network may determine the GNSS location availability of the UE. That is, the network may determine whether the UE is specified with additional delay for the GNSS location acquisition. The network may transmit a paging request to the UE and determine the paging response timer based on the GNSS location availability of the UE. In some aspects, the network may determine whether to start the paging response timer and/or the value of the paging response timer based on the GNSS location availability in the UE. In one aspect, the network may determine not to start the paging response timer for a time duration corresponding to the additional delay for the GNSS location acquisition. In another aspect, the network may add the additional delay for the GNSS location acquisition to the paging response timer. If the paging timer expires before receiving the paging response, the network may re-page the UE. That is, the paging timer expires before receiving the paging response from the UE, and the network may retransmit the paging request to the UE.

In one aspect, the network may determine the GNSS location availability in the UE based on the UE capability indication received by the network from the UE. That is, the UE may transmit the UE capability indication indicating the GNSS location availability of the UE. The UE capability indication may indicate whether the UE uses a delay to perform the time/frequency pre-compensation before initiating a connection with the network. The UE capability indication may also indicate the length of the delay to perform the time/frequency pre-compensation before initiating the connection with the network.

In another aspect, the network may determine the GNSS location availability in the UE communication parameters stored in the home subscriber server (HSS). That is, the HSS of the network may keep a database of the UE communication parameters, and the UE communication parameters may include the indication of the GNSS location availability of the UE. The network may refer to the database in the HSS to determine the GNSS location availability in the UE. The UE communication parameters may include a stationary indication, which, if set, indicates that the UE is a stationary UE that is specified with the delay. The UE communication parameters may also include an indication of the length of the delay to perform the time/frequency pre-compensation before initiating the connection with the network.

The network may further determine whether to start the paging response based on the determination of the time until the next coverage gap at the UE location. If the time to the next coverage gap is less than the value of the page response timer, the network does not start the page response timer. That is, if the network determines that the page response is expected during the next coverage gap, the network may not start the page response timer.

FIGS. 6A and 6B are a call-flow diagrams 600 and 650 of wireless communication. FIG. 6A is a call-flow diagram 600 of wireless communication. The call-flow diagram 600 may include a UE 602 and a network 606. The UE 602 may include a NAS layer 601, one or more lower layers 603, and an application layer 604. The call-flow diagram 600 may illustrate the procedure to transmit the NAS message based on the GNSS fix procedure from the perspective of the UE 602. The NAS message may include at least one of a connection request, a registration request, or a paging response. In one aspect, the connection request may be started based on the connection request from the application layer 604. In another aspect, the registration request may be started from the NAS layer 601. For example, the UE 602 may include the IoT NTN device, and acquire the GNSS location to perform the time/frequency pre-compensation. The UE 602 may be configured to delay initiation of the transmission of the NAS message at the NAS layer 601 until the one or more lower layers 603 successfully establishes the GNSS fix procedure. The NAS layer 601 of the UE 602 may receive an indication from the one or more lower layer 603 that GNSS fix is available, and initiate the transmission of the NAS message.

At 610, the NAS layer 601 of the UE 602 may receive, from the one or more lower layer 603, an indication of the location acquisition indicating whether the GNSS location is available in the one or more lower layers 603 than the NAS layer 601. The indication of the location acquisition may indicate whether the GNSS location is available or can be made available within a short period of time (e.g., no need to get a GNSS fix). Here, the NAS layer 601 of the UE 602 may receive, from the one or more lower layer 603, an indication of the location acquisition indicating that the GNSS location is available in the one or more lower layers 603 than the NAS layer 601.

At 611, the NAS layer 601 of the UE 602 may determine a location acquisition status associated with a GNSS location of the UE 602. Here, the NAS layer 601 of the UE 602 may determine that the GNSS fix is available based on the indication of the location acquisition received from the one or more lower layers 603 at 610.

At 612, the NAS layer 601 of the UE 602 may set a state of the NAS layer 601. The NAS layer 601 of the UE 602 may set a state of the NAS layer to a first state (e.g., the first NAS state) indicating that the UE 602 is unable to initiate transmission of the NAS message before establishing the GNSS Fix or a second state (e.g., the second NAS state) indicating that the UE 602 is able to initiate transmission of the NAS message before establishing the GNSS Fix. Here, the NAS layer 601 may set the state of the NAS layer 601 to the second NAS state based on the location acquisition status indicating that the GNSS location is available in a lower layer than the NAS layer 601. That is, the UE 602 may be configured with the second NAS state indicating that the UE 602 is able to initiate transmission of the NAS message before establishing the GNSS Fix.

At 630, the NAS layer 601 of the UE 602 may determine to start a network registration process. The NAS layer 601 of the UE 602 may be specified to transmit a registration reqeust to the network. The NAS layer 601 of the UE 602 may initiate the registration request or delay the registration request based on the state of NAS layer set at 612 determined based on the location acquisition status determined at 611. In one aspect, based on the NAS layer 601 being in the first NAS state indicating that the GNSS location is not available in a lower layer than the NAS layer 601, the NAS layer 601 may delay initiation of the registration request. In another aspect, based on the NAS layer 601 being in the second NAS state indicating that the GNSS location is available in a lower layer than the NAS layer 601, the NAS layer 601 may initiate the registration request.

At 613, the NAS layer 601 of the UE 602 may receive a connection request from the application layer 604. In response to receiving the connection request from the application layer 604, the NAS layer 601 may initiate the connection request or delay the connection request based on the state of NAS layer set at 612 determined based on the location acquisition status determined at 611. In one aspect, based on the NAS layer 601 being in the first NAS state indicating that the GNSS location is not available in a lower layer than the NAS layer 601, the NAS layer 601 may delay initiation of the connection request received from the application layer 604. In another aspect, based on the NAS layer 601 being in the second NAS state indicating that the GNSS location is available in a lower layer than the NAS layer 601, the NAS layer 601 may initiate the connection request received from the application layer 604.

At 620, the NAS layer 601 of the UE 602 may initiate the transmission of the NAS message for a NAS procedure based on the state of the NAS layer 601 being the second NAS state. That is, the NAS layer 601 may determine to initiate the transmission of the NAS message to the one or more lower layers 603, based on the GNSS location being available in the one or more lower layers 603. In one aspect, the state of the NAS layer 601 may be set to the second NAS state at 612, and the NAS layer 601 may initiate the connection request. In another aspect, the state of the NAS layer 601 may initially be set to the first NAS state at 612 and changed to the second NAS state at 618 based on receiving the indication of the location acquisition associated with the acquisition of the GNSS location of the UE 602 at 611.

At 622, the NAS layer 601 of the UE 602 may start the NAS procedure timer based on transmitting the NAS message at the NAS layer 601. The NAS procedure timer may run until the UE 602 receives a response to the transmission of the NAS message, and if the NAS procedure timer expires before receiving, from the network 606, the response to the registration request message, the NAS layer 601 may abort the initial attempt and re-starts the procedure.

At 626, the one or more lower layers 603 of the UE 602 may transmit the NAS message to the network 606, and at 628, the one or more lower layers 603 of the UE 602 may receive, from the network 606, a response to the connection request transmitted to the network 606 at 626. The NAS message may include at least one of a connection request, a registration request, or a paging response. In one aspect, the connection request may be started based on the connection request from the application layer 604. In another aspect, the registration request may be started from the NAS layer 601 at 630. At 629, the NAS layer 601 may indicate the application layer 604 that the connection with the network 606 was successfully established.

FIG. 6B is a call-flow diagram 650 of wireless communication. The call-flow diagram 650 illustrates that the UE 602 may determine to omit or delay the transmission of the NAS message to the network 606 based on determining that the transmission of the NAS message may fall into the coverage gap. In one aspect, the determination to omit or delay the transmission of the NAS message based on the coverage gap may be super-imposed to the procedure illustrated in FIG. 6A. That is, the UE 602 may determine whether to omit or delay the transmition of the NAS message based on the coverage gap between any of the steps illustrates in the call-flow diagram 600 of FIG. 6A.

At 652, the UE 602 may receive a starting time and a duration of the coverage gap from the network 606. In one aspect, the UE 602 may determine the coverage gap based on the starting time and the duration of the coverage gap received from the network 606.

At 654, the NAS layer 601 of the UE 602 may omit transmission of the NAS message during a coverage gap in time during which the UE 602 is not covered by a cell of the network 606, the cell comprising an NTN cell or a TN cell. The NTN providing the NTN cell may include a satellite network.

At 656, the NAS layer 601 of the UE 602 may delay transmission of the NAS message until the UE 602 is within coverage of the cell of the network 606. That is, the NAS layer 601 of the UE 602 may postpone the transmission of the registration request to the subsequent in-coverage time. In one aspect, the transmission of the connection request may be delayed by a time delay based on a duration of the coverage gap. In another aspect, the UE 602 may delay the transmission of the registration request for a time delay corresponding to the duration of the coverage gap so that the registration request may be transmitted to the network 606 during the subsequent in-coverage time.

Figure 7:
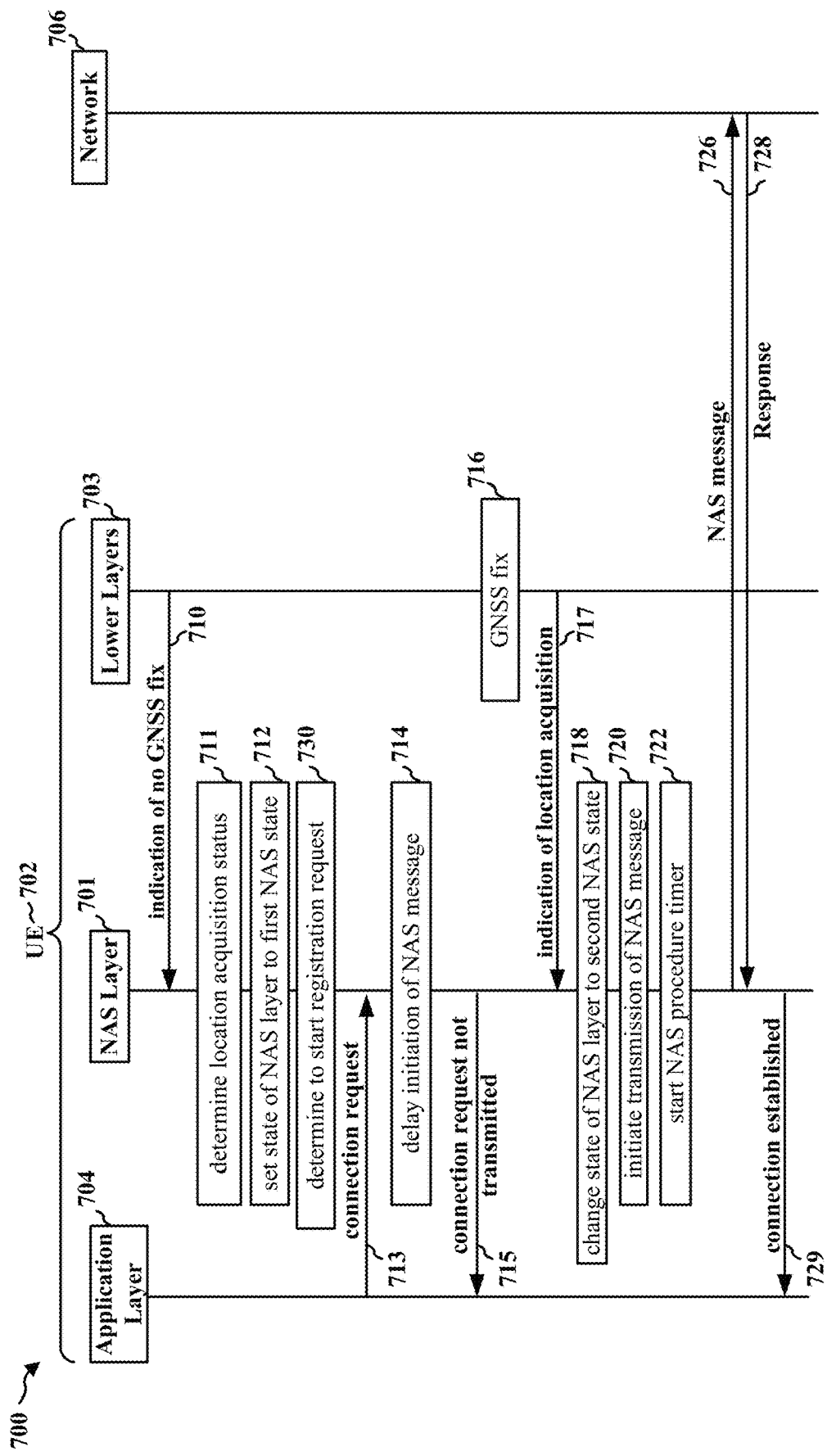
FIG. 7 is a call-flow diagram of wireless communication.

FIG. 7 is a call-flow diagram 700 of a method of wireless communication. The call-flow diagram 700 may include a UE 702 and a network 706. The UE 702 may include a NAS layer 701, one or more lower layers 703, and an application layer 704. The call-flow diagram 700 may illustrate the procedure to transmit the NAS message based on the GNSS fix procedure from the perspective of the UE 702. The NAS message may include at least one of a connection request, a registration request, or a paging response. In one aspect, the connection request may be started based on the connection request from the application layer 704. In another aspect, the registration request may be started from the NAS layer 701. For example, the UE 702 may include the IoT NTN device, and acquire the GNSS location to perform the time/frequency pre-compensation. The UE 702 may be configured to delay initiation of the transmission of the NAS message at the NAS layer 701 until the one or more lower layers 703 successfully establishes the GNSS fix procedure. The NAS layer 701 of the UE 702 may receive an indication from the one or more lower layer 703 that GNSS fix is not available, and delay the initiation of the transmission of the NAS message.

At 710, the NAS layer 701 of the UE 702 may receive, from the one or more lower layer 703, an indication of the location acquisition indicating whether the GNSS location is available in the one or more lower layers 703 than the NAS layer 701. The indication of the location acquisition may indicate whether the GNSS location is available or can be made available within a short period of time (e.g., no need to get a GNSS fix). Here, the NAS layer 601 of the UE 602 may receive, from the one or more lower layer 603, an indication of the location acquisition indicating that the GNSS location is not available in the one or more lower layers 603 than the NAS layer 601.

At 711, the NAS layer 701 of the UE 702 may determine a location acquisition status associated with a GNSS location of the UE 702. Here, The NAS layer 701 of the UE 702 may be determine that the GNSS fix is not available based on the indication of the location acquisition received from the one or more lower layers 703 at 710.

At 712, the NAS layer 701 of the UE 702 may set a state of the NAS layer 701. The NAS layer 701 of the UE 702 may set a state of the NAS layer to a first state (e.g., the first NAS state) indicating that the UE 702 is unable to initiate transmission of the NAS message before establishing the GNSS Fix or the second NAS state (e.g., the second NAS state) indicating that the UE 702 is able to initiate transmission of the NAS message before establishing the GNSS Fix. Here, the NAS layer 701 of the UE 702 may set a state of a NAS layer 701 to the first NAS state based on the location acquisition status indicating that the GNSS location is not available in a lower layer than the NAS layer 701. That is, the UE 702 may be configured with the first NAS state that indicates that the UE 702 is unable to initiate transmission of the NAS message before establishing the GNSS Fix. The first NAS state may be considered as a substitute of a registered state, such as a 5GMM-REGISTERED state. In one example, the state may be referred to "5GMM-REGISTERED.NO-LOCATION-AVAILABLE" state. In another example, the first NAS state may be considered as a substate of a 5GMM-IDLE state and may be referred to as "5GMM-IDLE mode with location delay." In other examples, the first NAS state may be referred to by another name.

At 730, the NAS layer 701 of the UE 702 may determine to start a network registration process. The NAS layer 701 of the UE 702 may be specified to transmit a registration reqeust to the network. The NAS layer 701 of the UE 702 may initiate the registration request or delay the registration request based on the state of NAS layer set at 712 determined based on the location acquisition status determined at 711. In one aspect, based on the NAS layer 701 being in the first NAS state indicating that the GNSS location is not available in a lower layer than the NAS layer 701, the NAS layer 701 may delay initiation of the registration request. In another aspect, based on the NAS layer 701 being in the second NAS state indicating that the GNSS location is available in a lower layer than the NAS layer 701, the NAS layer 701 may initiate the registration request.

At 713, the NAS layer 701 of the UE 702 may receive a connection request from the application layer 704. In response to receiving the connection request from the application layer 704, the NAS layer 701 may initiate the connection request or delay the connection request based on the state of NAS layer set at 712 determined based on the location acquisition status determined at 711. In one aspect, based on the NAS layer 701 being in the first NAS state indicating that the GNSS location is not available in a lower layer than the NAS layer 701, the NAS layer 701 may delay initiation of the connection request received from the application layer 704. In another aspect, based on the NAS layer 701 being in the second NAS state indicating that the GNSS location is available in a lower layer than the NAS layer 701, the NAS layer 701 may initiate the connection request received from the application layer 704.

At 714, the NAS layer 701 of the UE 702 may delay initiation of the transmission of the NAS message at the NAS layer 701 until the state of the NAS layer 701 is changed to the second NAS state based on the location acquisition status indicating that the GNSS location is available at the lower layer 703. That is, the NAS layer 701 of the UE 702 may not initiate the transmission of the NAS message at the NAS layer 701 until the state of the NAS layer 701 is changed from the first NAS state to the second NAS state. After the state of the NAS layer 701 is changed to the second NAS state based on receiving an indication of the location acquisition status indicating that the GNSS location is available at the one or more lower layers 703, the NAS layer 701 may initiate the transmission of the NAS message. The transmission of the NAS message may include at least one of the connection request, the registration request, or the paging response. In one aspect, the NAS message may be associated with the connection request received from the application layer 704 at 713. In another aspect, the NAS message may be associated with the registration request generated from the NAS layer 701 at 730.

At 715, the NAS layer 701 of the UE 702 may indicate to the application layer 704 of the UE 702 that the connection request is not transmitted at the NAS layer 701 based on the location acquisition status. The NAS layer 701 in the first state may indicate to the application layer 704 that the connection requests are delayed due to the GNSS location unavailable at the one or more lower layers 703. That is, the UE 702 may be configured that when the NAS layer 701 is in the first NAS state, indicating that the UE 702 is unable to initiate connection requests before establishing the GNSS Fix, and the NAS layer 701 in the first NAS state may be configured to indicate the application layer 704 that the connection request at the NAS layer 701 is delayed until the state of the NAS layer 701 is changed to a different state.

At 716, the one or more lower layers 703 of the UE 702 may acquire the GNSS fix with the network 706. The GNSS fix procedure may refer to the procedure performed by the UE 702 to acquire the signals of a sufficient number of base stations to confidently determine the location of the UE 702. Before the UE 702 may initiate the uplink data transmission to the network 706, the UE 702 may acquire the GNSS location to perform the time/frequency pre-compensation. For example, the GNSS fix or GNSS location acquisition procedure may take a relatively extensive time delay, e.g., between 10 to 30 seconds.

At 717, the NAS layer 701 of the UE 702 may receive, from the one or more lower layer 703, an indication of the location acquisition indicating that the GNSS location is available in the one or more lower layers 703 than the NAS layer 701 based on the one or more lower layers 703 acquiring the GNSS fix with the network 706 at 716.

At 718, the NAS layer 701 of the UE 702 may change the state of the NAS layer 701 to the second NAS state of the NAS layer 701 in response to receiving the indication from the lower layer that the GNSS location is available. The NAS layer 701 of the UE 702 may change the state of the NAS layer 701 from the first NAS state to the second NAS state upon receiving the indication from the one or more lower layers 703 that the location is available at 710. That is, the UE 702 may change the state of the NAS layer 701 from the first NAS state to a different state, in which the NAS layer 701 may initiate the transmission of the NAS message. The different states of the NAS layer 701 may include states, e.g., the 5GMM-REGISTERED.NORMAL-SERVICE state or the 5GMM-IDLE state, respectively, upon receiving the indication from the one or more lower layers 703 that the GMSS location is available.

At 720, the NAS layer 701 of the UE 702 may initiate the transmission of the NAS message for a NAS procedure based on the state of the NAS layer 701 being the second NAS state. That is, the NAS layer 701 may determine to initiate the transmission of the NAS message to the one or more lower layers 703, based on the GNSS location being available in the one or more lower layers 703. In one aspect, the state of the NAS layer 701 may be set to the second NAS state at 712, and the NAS layer 701 may initiate the transmission of the NAS message. In another aspect, the state of the NAS layer 701 may initially be set to the first NAS state at 712 and changed to the second NAS state at

718 based on receiving the indication of the location acquisition associated with the acquisition of the GNSS location of the UE 702 at 711.

At 722, the NAS layer 701 of the UE 702 may start the NAS procedure timer based on transmitting the NAS message at the NAS layer 701. The NAS procedure timer may run until the UE 702 receives a response to the transmission of the NAS message, and if the NAS procedure timer expires before receiving, from the network 706, the response to the registration request message, the NAS layer 701 may abort the initial attempt and re-starts the procedure.

At 726, the one or more lower layers 703 of the UE 702 may transmit the NAS message to the network 706, and at 728, the one or more lower layers 703 of the UE 702 may receive, from the network 706, a response to the transmission of the NAS message transmitted to the network 706 at 726. At 729, the NAS layer 701 may indicate the application layer 704 that the connection with the network 706 was successfully established.

The call-flow diagram 650 of FIG. 6B may be applicable to the call-flow diagram 700 of FIG. 7. Based on the call-flow diagram 650, the UE 702 may determine to omit or delay the transmission of the NAS message to the network 706 based on determining that the transmission of the NAS message may fall into the coverage gap. In one aspect, the determination to omit or delay the transmition of the NAS message based on the coverage gap may be super-imposed to the procedure illustrated in FIG. 7. That is, the UE 702 may determine whether to omit or delay the transmission of the NAS message based on the coverage gap between any of the steps illustrates in the call-flow diagram 700 of FIG. 7.

Figure 8:
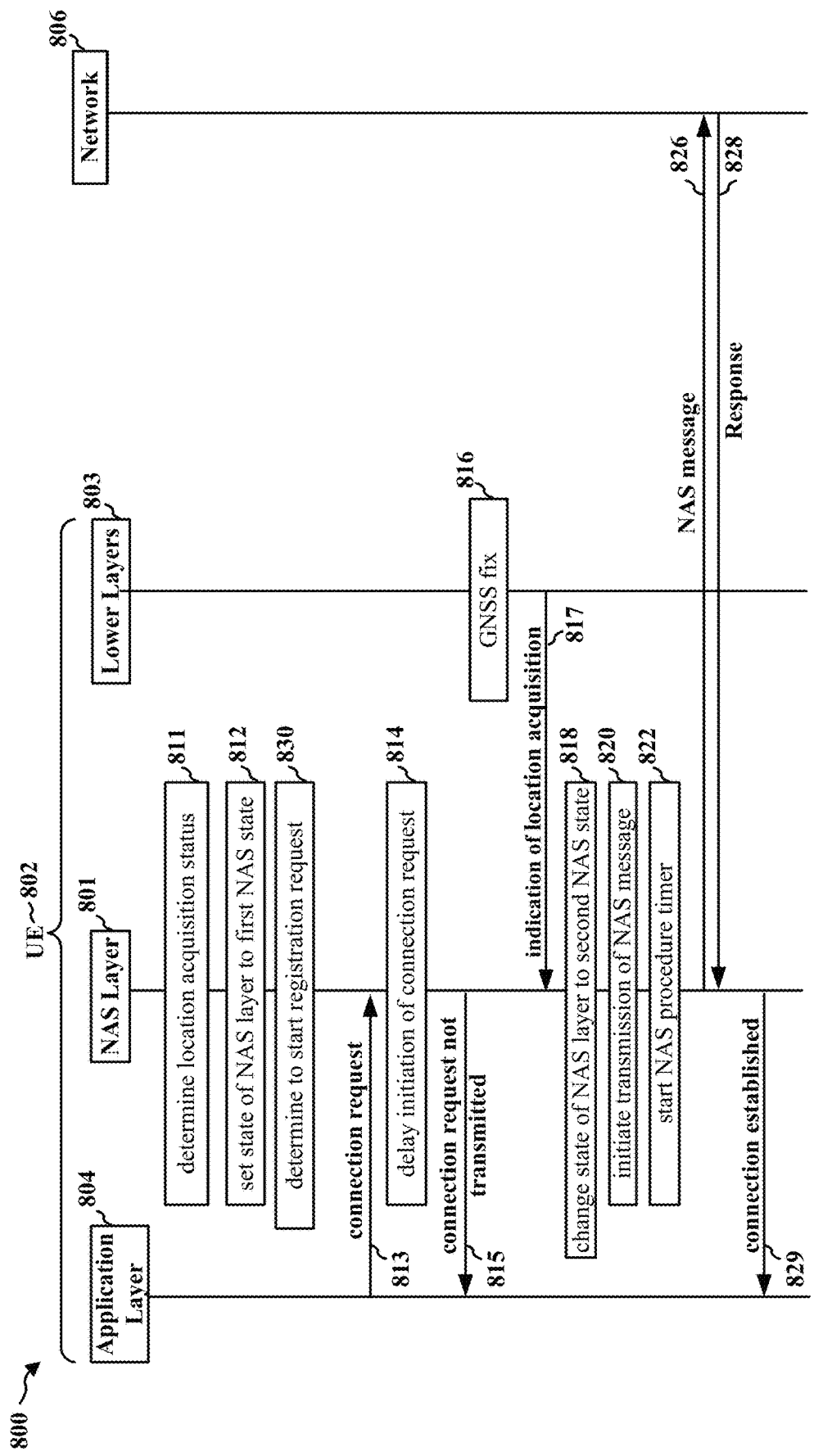
FIG. 8 is a call-flow diagram of wireless communication.

FIG. 8 is a call-flow diagram 800 of a method of wireless communication. The call-flow diagram 800 may include a UE 802 and a network 806. The UE 802 may include a NAS layer 801, one or more lower layers 803, and an application layer 804. The call-flow diagram 800 may illustrate the procedure to transmit the NAS message based on the GNSS fix procedure from the perspective of the UE 802. The NAS message may include at least one of a connection request, a registration request, or a paging response. In one aspect, the connection request may be started based on the connection request from the application layer 804. In another aspect, the registration request may be started from the NAS layer 801. For example, the UE 802 may include the IoT NTN device, and acquire the GNSS location to perform the time/frequency pre-compensation. The UE 802 may be configured to delay initiation of the transmission of the NAS message at the NAS layer 801 until the one or more lower layers 803 successfully establishes the GNSS fix procedure. The NAS layer 801 of the UE 802 may determine that the UE 802 is of the type that an additional delay in the one or more lower layers 803 may be specified for GNSS location acquisition, and delay the initiation of the transmission of the NAS message.

At 811, the NAS layer 801 of the UE 802 may determine a location acquisition status associated with a GNSS location of the UE 802. Here, the NAS layer 801 of the UE 802 may determine that the UE 802 is of the type that an additional delay in the one or more lower layers 803 may be specified for GNSS location acquisition.

At 812, the NAS layer 801 of the UE 802 may set a state of the NAS layer 801. The NAS layer 801 of the UE 802 may set a state of the NAS layer to a first state (e.g., the first NAS state) indicating that the UE 802 is unable to initiate transmission of the NAS message before establishing the GNSS Fix or a second state (e.g., the second NAS state) indicating that the UE 802 is able to initiate the transmission of the NAS message before establishing the GNSS Fix. Here, the NAS layer 801 of the UE 802 may set a state of a NAS layer 801 to the first NAS state based on the location acquisition status indicating that the UE is of the type that the additional delay in the one or more lower layers 803 may be specified for the GNSS location acquisition. That is, the UE 802 may be configured with the first NAS state that indicates that the UE 802 is unable to initiate transmission of the NAS message before establishing the GNSS Fix. Based on determining that the UE 802 is of the type that an additional delay in the one or more lower layers 803 may be specified for GNSS location acquisition, the NAS layer 801 of the UE 802 may set the state of the NAS layer 801 to the first NAS state as a default state of the NAS layer 801. The first NAS state may be considered as a substitute of a registered state, such as a 5GMM-REGISTERED state. In one example, the state may be referred to "5GMM-REGISTERED.NO-LOCATION-AVAILABLE" state. In another example, the first NAS state may be considered as a sub state of a 5GMM-IDLE state and may be referred to as "5GMM-IDLE mode with location delay." In other examples, the first NAS state may be referred to by another name.

At 830, the NAS layer 801 of the UE 802 may determine to start a network registration process. The NAS layer 801 of the UE 802 may be specified to transmit a registration reqeust to the network. The NAS layer 801 of the UE 802 may initiate the registration request or delay the registration request based on the state of NAS layer set at 812 determined based on the location acquisition status determined at 811. In one aspect, based on the NAS layer 801 being in the first NAS state indicating that the GNSS location is not available in a lower layer than the NAS layer 801, the NAS layer 801 may delay initiation of the registration request. In another aspect, based on the NAS layer 801 being in the second NAS state indicating that the GNSS location is available in a lower layer than the NAS layer 801, the NAS layer 801 may initiate the registration request.

At 813, the NAS layer 801 of the UE 802 may receive a connection request from the application layer 804. In response to receiving the connection request from the application layer 804, the NAS layer 801 may initiate the connection request or delay the connection request based on the state of NAS layer set at 812 determined based on the location acquisition status determined at 811. In one aspect, based on the NAS layer 801 being in the first NAS state indicating that the UE is of the type that the additional delay in the one or more lower layers 803 may be specified for the GNSS location acquisition, the NAS layer 801 may delay initiation of the connection request received from the application layer 804. In another aspect, based on the NAS layer 801 being in the second NAS state indicating that the GNSS location is available in a lower layer than the NAS layer 801, the NAS layer 801 may initiate the connection request received from the application layer 804.

At 814, the NAS layer 801 of the UE 802 may delay initiation of the transmission of the NAS message at the NAS layer 801 until the state of the NAS layer 801 is changed to the second NAS state based on the location acquisition status indicating that the GNSS location is available at the lower layer 803. That is, the NAS layer 801 of the UE 802 may not initiate the transmission of the NAS message at the NAS layer 801 until the state of the NAS layer 801 is changed from the first NAS state to the second NAS state. After the state of the NAS layer 801 is changed to the second NAS state based on receiving an indication of the location acquisition status indicating that the GNSS location is available at the one or more lower layers 803, the NAS layer 801 may initiate the transmission of the NAS message. The transmission of the NAS message may include at least one of the connection request, the registration request, or the paging response. In one aspect, the NAS message may be associated with the connection request received from the application layer 804 at 813. In another aspect, the NAS message may be associated with the registration request generated from the NAS layer 801 at 830.

At 815, the NAS layer 801 of the UE 802 may indicate to the application layer 804 of the UE 802 that the connection request is not transmitted at the NAS layer 801 based on the location acquisition status. The NAS layer 801 in the first state may indicate to the application layer 804 that the connection requests are delayed due to the GNSS location unavailable at the one or more lower layers 803. That is, the UE 802 may be configured that when the NAS layer 801 is in the first NAS state, indicating that the UE 802 is unable to initiate connection requests before establishing the GNSS Fix, and the NAS layer 801 in the first NAS state may be configured to indicate the application layer 804 that the connection request at the NAS layer 801 is delayed until the state of the NAS layer 801 is changed to a different state.

At 816, the one or more lower layers 803 of the UE 802 may acquire the GNSS fix with the network 806. The GNSS fix procedure may refer to the procedure performed by the UE 802 to acquire the signals of a sufficient number of base stations to confidently determine the location of the UE 802. Before the UE 802 may initiate the uplink data transmission to the network 806, the UE 802 may acquire the GNSS location to perform the time/frequency pre-compensation. For example, the GNSS fix or GNSS location acquisition procedure may take a relatively extensive time delay, e.g., between 10 to 30 seconds.

At 817, the NAS layer 801 of the UE 802 may receive, from the one or more lower layer 803, an indication of the location acquisition indicating that the GNSS location is available in the one or more lower layers 803 than the NAS layer 801 based on the one or more lower layers 803 acquiring the GNSS fix with the network 806 at 816.

At 818, the NAS layer 801 of the UE 802 may change the state of the NAS layer 801 to the second NAS state of the NAS layer 801 in response to receiving the indication from the lower layer that the GNSS location is available. The NAS layer 801 of the UE 802 may change the state of the NAS layer 801 from the first NAS state to the second NAS state upon receiving the indication from the one or more lower layers 803 that the location is available at 810. That is, the UE 802 may change the state of the NAS layer 801 from the first NAS state to a different state, in which the NAS layer 801 may initiate the connection request. The different states of the NAS layer 801 may include states, e.g., the 5GMM-REGISTERED.NORMAL-SERVICE state or the 5GMM-IDLE state, respectively, upon receiving the indication from the one or more lower layers 803 that the GMSS location is available.

At 820, the NAS layer 801 of the UE 802 may initiate the transmission of the NAS message for a NAS procedure based on the state of the NAS layer 801 being the second NAS state. That is, the NAS layer 801 may determine to initiate the transmission of the NAS message to the one or more lower layers 803, based on the GNSS location being available in the one or more lower layers 803. Here, the state of the NAS layer 801 may initially be set to the first NAS state by default at 812 and changed to the second NAS state at 818 based on receiving the indication of the location acquisition associated with the acquisition of the GNSS location of the UE 802 at 811.

At 822, the NAS layer 801 of the UE 802 may start the NAS procedure timer based on transmitting the NAS message at the NAS layer 801. The NAS procedure timer may run until the UE 802 receives a response to the transmission of the NAS message, and if the NAS procedure timer expires before receiving, from the network 806, the response to the registration request message, the NAS layer 801 may abort the initial attempt and re-starts the procedure.

At 826, the one or more lower layers 803 of the UE 802 may transmit the NAS message to the network 806, and at 828, the one or more lower layers 803 of the UE 802 may receive, from the network 806, a response to the NAS message transmitted to the network 806 at 826. At 829, the NAS layer 801 may indicate the application layer 804 that the connection with the network 806 was successfully established.

The call-flow diagram 650 of FIG. 6B may be applicable to the call-flow diagram 800 of FIG. 8. Based on the call-flow diagram 650, the UE 802 may determine to omit or delay the transmission of the NAS message to the network 806 based on determining that the transmission of the NAS message may fall into the coverage gap. In one aspect, the determination to omit or delay the transmition of the NAS message based on the coverage gap may be super-imposed to the procedure illustrated in FIG. 8. That is, the UE 802 may determine whether to omit or delay the transmission of the NAS message based on the coverage gap between any of the steps illustrates in the call-flow diagram 800 of FIG. 8.

Figure 9:
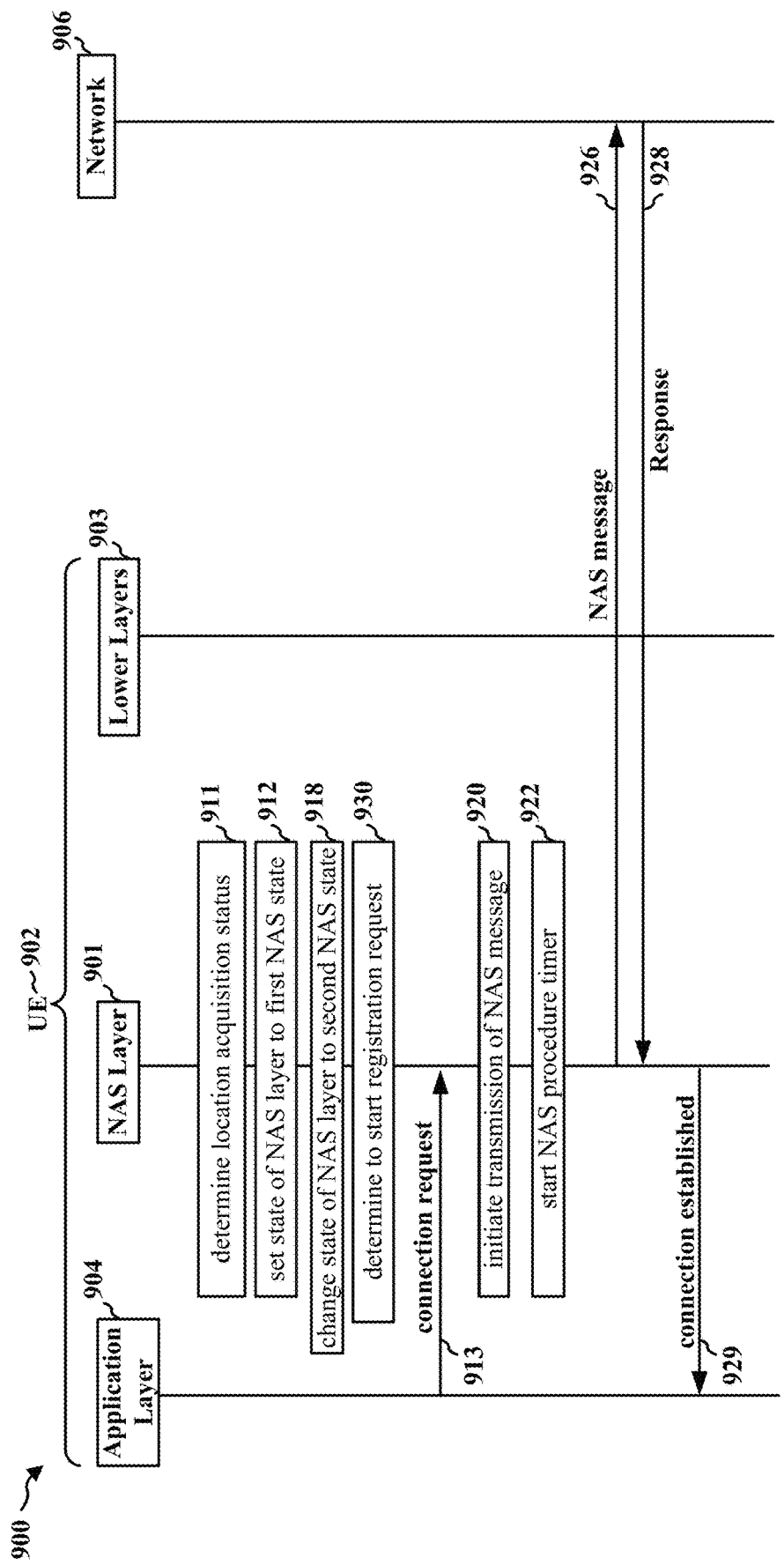
FIG. 9 is a call-flow diagram of wireless communication.

FIG. 9 is a call-flow diagram 900 of a method of wireless communication. The call-flow diagram 900 may include a UE 902 and a network 906. The UE 902 may include a NAS layer 901, one or more lower layers 903, and an application layer 904. The call-flow diagram 900 may illustrate the procedure to transmit the NAS message based on the GNSS fix procedure from the perspective of the UE 902. The NAS message may include at least one of a connection request, a registration request, or a paging response. In one aspect, the connection request may be started based on the connection request from the application layer 904. In another aspect, the registration request may be started from the NAS layer 901. For example, the UE 902 may include the IoT NTN device, and acquire the GNSS location to perform the time/frequency pre-compensation. The UE 902 may be configured to delay initiation of the transmission of the NAS message at the NAS layer 901 until the one or more lower layers 903 successfully establishes the GNSS fix procedure. The NAS layer 801 of the UE 802 may determine that the UE 802 is of the type that an additional delay in the one or more lower layers 803 may be specified for GNSS location acquisition, and initiate the transmission of the NAS message based on the time since the last uplink transmission is less than a threshold.

At 911, the NAS layer 901 of the UE 902 may determine a location acquisition status associated with a GNSS location of the UE 902. Here, the NAS layer 901 of the UE 902 may determine that the UE 902 is of the type that an additional delay in the one or more lower layers 903 may be specified for GNSS location acquisition.

At 912, the NAS layer 901 of the UE 902 may set a state of the NAS layer 901. The NAS layer 901 of the UE 902 may set a state of the NAS layer to a first state (e.g., the first NAS state) indicating that the UE 902 is unable to initiate transmission of the NAS message before establishing the GNSS Fix or a second state (e.g., the second NAS state) indicating that the UE 902 is able to initiate transmission of the NAS message before establishing the GNSS Fix. Here, the NAS layer 901 of the UE 902 may set a state of a NAS layer 901 to the first NAS state based on the location acquisition status indicating that the UE is of the type that the additional delay in the one or more lower layers 903 may be specified for the GNSS location acquisition. That is, the UE 902 may be configured with the first NAS state that indicates that the UE 902 is unable to initiate transmission of the NAS message before establishing the GNSS Fix. Based on determining that the UE 902 is of the type that an additional delay in the one or more lower layers 903 may be specified for GNSS location acquisition, the NAS layer 901 of the UE 902 may set the state of the NAS layer 901 to the first NAS state as a default state of the NAS layer 901. The first NAS state may be considered as a substitute of a registered state, such as a 5GMM-REGISTERED state. In one example, the state may be referred to "5GMM-REGISTERED.NO-LOCATION-AVAILABLE" state. In another example, the first NAS state may be considered as a substate of a 5GMM-IDLE state and may be referred to as "5GMM-IDLE mode with location delay." In other examples, the first NAS state may be referred to by another name.

At 918, the NAS layer 901 of the UE 902 may change the state of the NAS layer 901 to the second NAS state of the NAS layer 901 based on the time since the last uplink transmission is less than a threshold, wherein the threshold corresponds to the validity time of the GNSS fix. That is, even if the NAS layer 901 determines that the UE 902 is specified with the additional delay in the one or more lower layers 903 for the GNSS location acquisition, if the GNSS location acquisition from the previous uplink transmission is still valid, the UE 902 may initiate the transmission of the NAS message without waiting for the one or more lower layer 903 to acquire the GNSS fix. Accordingly, the NAS layer 901 may determine if the time since the last uplink transmission is shorter than the validity duration of the GNSS location, the GNSS location is still valid, and the UE 902 may not delay the initiation of the transmission of the NAS message. That is, the UE 902 may change the state of the NAS layer 901 from the first NAS state to a different state, in which the NAS layer 901 may initiate the transmission of the NAS message. The different states of the NAS layer 901 may include states, e.g., the 5GMM-REGISTERED.NORMAL-SERVICE state or the 5GMM-IDLE state, respectively, upon receiving the indication from the one or more lower layers 903 that the GMSS location is available.

At 930, the NAS layer 901 of the UE 902 may determine to start a network registration process. The NAS layer 901 of the UE 902 may be specified to transmit a registration reqeust to the network. The NAS layer 901 of the UE 902 may initiate the registration request or delay the registration request based on the state of NAS layer set at 912 determined based on the location acquisition status determined at 911. In one aspect, based on the NAS layer 901 being in the first NAS state indicating that the GNSS location is not available in a lower layer than the NAS layer 901, the NAS layer 901 may delay initiation of the registration request. In another aspect, based on the NAS layer 901 being in the second NAS state indicating that the GNSS location is available in a lower layer than the NAS layer 901, the NAS layer 901 may initiate the registration request.

At 913, the NAS layer 901 of the UE 902 may receive a connection request from the application layer 904. In response to receiving the connection request from the application layer 904, the NAS layer 901 may initiate the connection request or delay the connection request based on the state of NAS layer set at 912 determined based on the location acquisition status determined at 911. In one aspect, based on the NAS layer 901 being in the first NAS state indicating that the GNSS location is not available in a lower layer than the NAS layer 901 or the UE is of the type that the additional delay in the one or more lower layers 903 may be specified for the GNSS location acquisition, the NAS layer 901 may delay initiation of the connection request received from the application layer 904. In another aspect, based on the NAS layer 901 being in the second NAS state indicating that the GNSS location is available in a lower layer than the NAS layer 901 or the UE is of the type that the additional delay is not specified for the GNSS location acquisition, the NAS layer 901 may initiate the connection request received from the application layer 904.

At 920, the NAS layer 901 of the UE 902 may initiate the transmission of the NAS message for a NAS procedure based on the state of the NAS layer 901 being the second NAS state. That is, the NAS layer 901 may determine to initiate the transmission of the NAS message to the one or more lower layers 903, based on the GNSS location being available in the one or more lower layers 903. Here, the state of the NAS layer 901 may initially be set to the first NAS state by default at 912 and changed to the second NAS state at 918 based on receiving the indication of the location acquisition associated with the acquisition of the GNSS location of the UE 902 at 911.

At 922, the NAS layer 901 of the UE 902 may start the NAS procedure timer based on transmitting the NAS message at the NAS layer 901. The NAS procedure timer may run until the UE 902 receives a response to the transmission of the NAS message, and if the NAS procedure timer expires before receiving, from the network 906, the response to the registration request message, the NAS layer 901 may abort the initial attempt and re-starts the procedure.

At 926, the one or more lower layers 903 of the UE 902 may transmit the connection request to the network 906, and at 928, the one or more lower layers 903 of the UE 902 may receive, from the network 906, a response to the connection request transmitted to the network 906 at 926. At 929, the NAS layer 901 may indicate the application layer 904 that the connection with the network 906 was successfully established. The transmission of the NAS message may include at least one of the connection request, the registration request, or the paging response. In one aspect, the NAS message may be associated with the connection request received from the application layer 904 at 913. In another aspect, the NAS message may be associated with the registration request generated from the NAS layer 901 at 930. At 929, the NAS layer 901 may indicate the application layer 904 that the connection with the network 906 was successfully established.

The call-flow diagram 650 of FIG. 6B may be applicable to the call-flow diagram 900 of FIG. 9. Based on the call-flow diagram 650, the UE 902 may determine to omit or delay the transmission of the NAS message to the network 906 based on determining that the transmission of the NAS message may fall into the coverage gap. In one aspect, the determination to omit or delay the transmition of the NAS message based on the coverage gap may be super-imposed to the procedure illustrated in FIG. 9. That is, the UE 902 may determine whether to omit or delay the transmition of the NAS message based on the coverage gap between any of the steps illustrates in the call-flow diagram 900 of FIG. 9.

Figure 10:
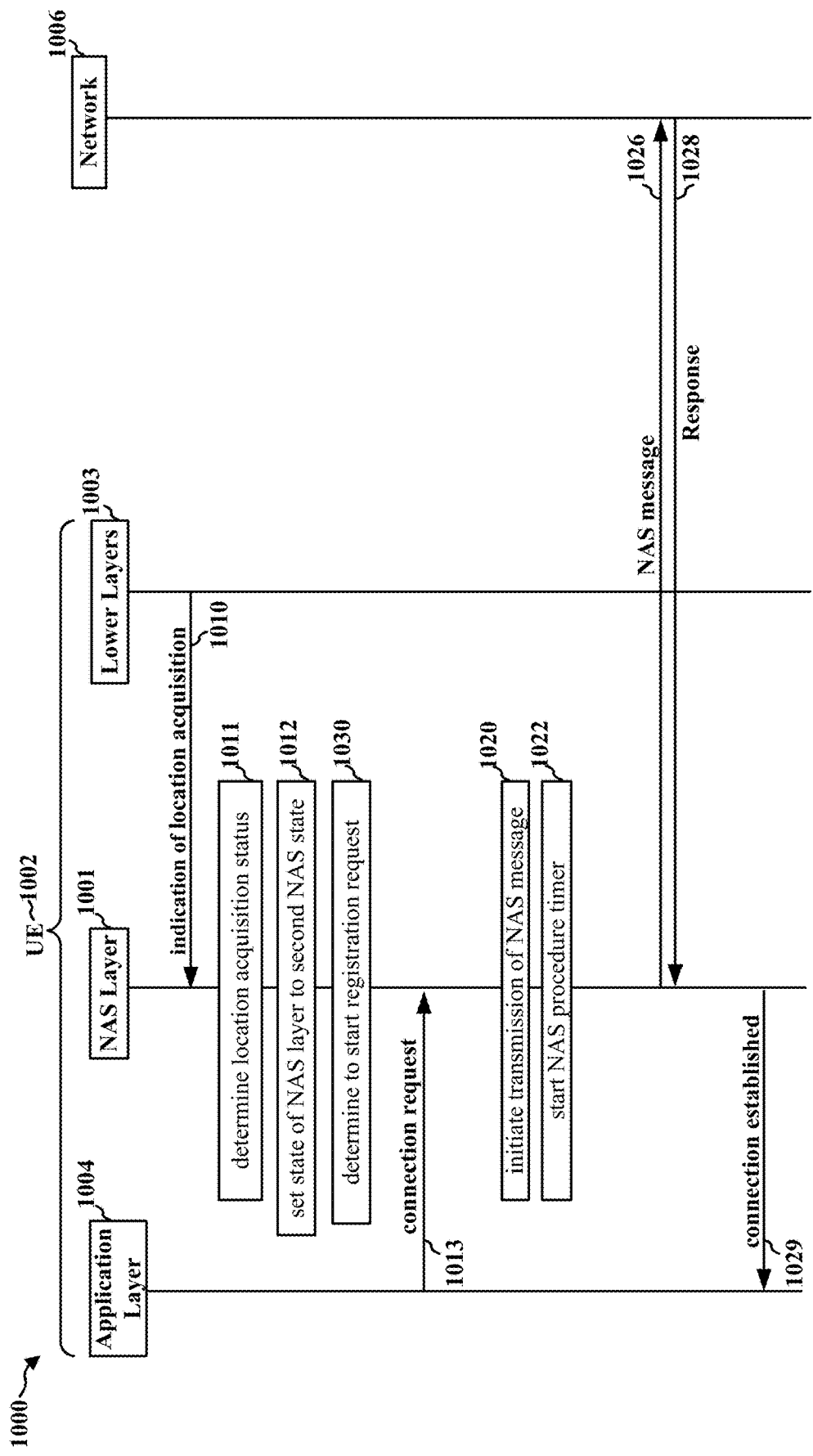
FIG. 10 is a call-flow diagram of wireless communication.

FIG. 10 is a call-flow diagram 1000 of a method of wireless communication. The call-flow diagram 1000 may include a UE 1002 and a network 1006. The UE 1002 may include a NAS layer 1001, one or more lower layers 1003, and an application layer 1004. The call-flow diagram 1000 may illustrate the procedure to transmit the NAS message based on the GNSS fix procedure from the perspective of the UE 1002. The NAS message may include at least one of a connection request, a registration request, or a paging response. In one aspect, the connection request may be started based on the connection request from the application layer 1004. In another aspect, the registration request may be started from the NAS layer 1001. For example, the UE 1002 may include the IoT NTN device, and acquire the GNSS location to perform the time/frequency pre-compensation. The UE 1002 may be configured to apply additional time delay to the NAS procedure timer based on the additional delay being specified in the one or more lower layers 1003 for GNSS location acquisition. The NAS layer 1001 of the UE 1002 may receive an indication from the one or more lower layer 1003 that GNSS fix is available, and not increase the NAS procedure timer.

At 1010, the NAS layer 1001 of the UE 1002 may receive, from the one or more lower layer 1003, an indication of the location acquisition indicating whether the GNSS location is available in the one or more lower layers 1003 than the NAS layer 1001. The location acquisition may indicate whether the GNSS location is available or can be made available within a short period of time (e.g., no need to get a GNSS fix). Here, the NAS layer 1001 of the UE 1002 may receive, from the one or more lower layer 1003, an indication of the location acquisition indicating that the GNSS location is available in the one or more lower layers 1003 than the NAS layer 1001.

At 1011, the NAS layer 1001 of the UE 1002 may determine a location acquisition status associated with a GNSS location of the UE 1002. Here, the NAS layer 1001 of the UE 1002 may determine that the GNSS fix is available based on the indication of the location acquisition received from the one or more lower layers 1003 at 1010.

At 1012, the NAS layer 1001 of the UE 1002 may set a state of the NAS layer 1001. The NAS layer 1001 of the UE 1002 may set a state of the NAS layer to a first state (e.g., the first NAS state) indicating that the UE 1002 is unable to initiate transmission of the NAS message before establishing the GNSS Fix or a second state (e.g., the second NAS state) indicating that the UE 1002 is able to initiate transmission of the NAS message before establishing the GNSS Fix. Here, the NAS layer 1001 may set the state of the NAS layer 1001 to the second NAS state) based on the location acquisition status indicating that the GNSS location is available in a lower layer than the NAS layer 1001 or the UE is of the type that the additional delay is not specified for the GNSS location acquisition. That is, the UE 1002 may be configured with the second NAS state indicating that the UE 1002 is able to initiate transmission of the NAS message before establishing the GNSS Fix.

At 1030, the NAS layer 1001 of the UE 1002 may determine to start a network registration process. The NAS layer 1001 of the UE 1002 may be specified to transmit a registration reqeust to the network. The NAS layer 1001 of the UE 1002 may may determine to increase the NAS procedure timer based on the state of NAS layer set at 1012 determined based on the location acquisition status determined at 1011. In one aspect, based on the NAS layer 1001 being in the first NAS state indicating that the GNSS location is not available in a lower layer than the NAS layer 1001, the NAS layer 1001 may increase the NAS procedure timer. In another aspect, based on the NAS layer 1001 being in the second NAS state indicating that the GNSS location is available in a lower layer than the NAS layer 1001, the NAS layer 1001 may initiate the registration request without increasing the NAS procedure timer.

At 1013, the NAS layer 1001 of the UE 1002 may receive a connection request from the application layer 1004. In response to receiving the connection request from the application layer 1004, the NAS layer 1001 may increase or maintain the NAS procedure timer and initiate the connection request based on the state of NAS layer set at 1012 determined based on the location acquisition status determined at 1011. In one aspect, based on the NAS layer 1001 being in the first NAS state indicating that the GNSS location is not available in a lower layer than the NAS layer 1001, the NAS layer 1001 may delay initiation of the connection request received from the application layer 1004. In another aspect, based on the NAS layer 1001 being in the second NAS state indicating that the GNSS location is available in a lower layer than the NAS layer 1001, the NAS layer 1001 may initiate the connection request received from the application layer 1004.

At 1020, the NAS layer 1001 of the UE 1002 may initiate the transmission of the NAS message for a NAS procedure based on the state of the NAS layer 1001 being the second NAS state. That is, the NAS layer 1001 may determine to initiate the transmission of the NAS message to the one or more lower layers 1003, based on the GNSS location being available in the one or more lower layers 1003. In one aspect, the state of the NAS layer 1001 may be set to the second NAS state at 1012, and the NAS layer 1001 may initiate the transmission of the NAS message. In another aspect, the state of the NAS layer 1001 may initially be set to the first NAS state at 1012 and changed to the second NAS state at 1018 based on receiving the indication of the location acquisition associated with the acquisition of the GNSS location of the UE 1002 at 1011, At 1022, the NAS layer 1001 of the UE 1002 may start the NAS procedure timer based on transmitting the NAS message at the NAS layer 1001. The NAS procedure timer may run until the UE 1002 receives a response to the connection request, and if the NAS procedure timer expires before receiving, from the network 1006, the response to the registration request message, the NAS layer 1001 may abort the initial attempt and re-starts the procedure.

At 1026, the one or more lower layers 1003 of the UE 1002 may transmit the NAS message to the network 1006, and at 1028, the one or more lower layers 1003 of the UE 1002 may receive, from the network 1006, a response to the connection request transmitted to the network 1006 at 1026. The NAS message may include at least one of a connection request, a registration request, or a paging response. In one aspect, the connection request may be started based on the connection request from the application layer 1004. In another aspect, the registration request may be started from the NAS layer 1001 at 1030. At 1029, the NAS layer 1001 may indicate the application layer 1004 that the connection with the network 1006 was successfully established.

The call-flow diagram 650 of FIG. 6B may be applicable to the call-flow diagram 1000 of FIG. 10. Based on the call-flow diagram 650, the UE 1002 may determine to omit or delay the transmission of the NAS message to the network 1006 based on determining that the transmission of the NAS message may fall into the coverage gap. In one aspect, the determination to omit or delay the transmission of the NAS message based on the coverage gap may be super-imposed to the procedure illustrated in FIG. 10. That is, the UE 1002 may determine whether to omit or delay the transmission of the NAS message based on the coverage gap between any of the steps illustrates in the call-flow diagram 1000 of FIG. 10.

Figure 11:
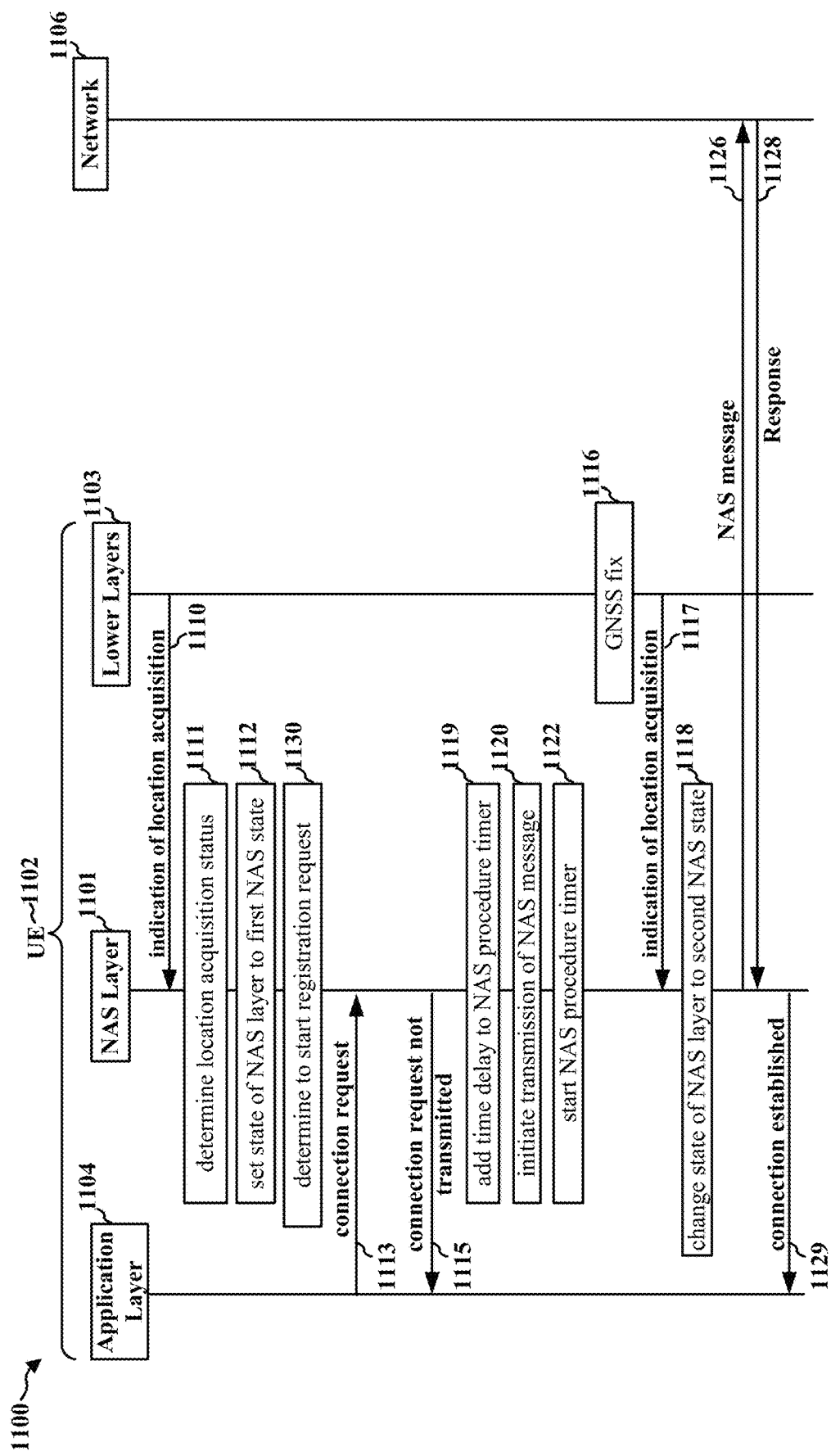
FIG. 11 is a call-flow diagram of wireless communication.

FIG. 11 is a call-flow diagram 1100 of a method of wireless communication. The call-flow diagram 1100 may include a UE 1102 and a network 1106. The UE 1102 may include a NAS layer 1101, one or more lower layers 1103, and an application layer 1104. The call-flow diagram 1100 may illustrate the procedure to transmit the NAS message based on the GNSS fix procedure from the perspective of the UE 1102. The NAS message may include at least one of a connection request, a registration request, or a paging response. In one aspect, the connection request may be started based on the connection request from the application layer 1104. In another aspect, the registration request may be started from the NAS layer 1101. For example, the UE 1102 may include the IoT NTN device, and acquire the GNSS. For example, the UE 1102 may include the IoT NTN device, and acquire the GNSS location to perform the time/frequency pre-compensation. The UE 1102 may be configured to apply additional time delay to NAS procedure timer based on the additional delay being specified in the one or more lower layers 603 for GNSS location acquisition. The NAS layer 1101 of the UE 1102 may receive an indication from the one or more lower layer 1103 that GNSS fix is not available, and increase the NAS procedure timer may applying additional time delay.

At 1110, the NAS layer 1101 of the UE 1102 may receive, from the one or more lower layer 1103, an indication of the location acquisition indicating whether the GNSS location is available in the one or more lower layers 1103 than the NAS layer 1101. The location acquisition may indicate whether the GNSS location is available or can be made available within a short period of time (e.g., no need to get a GNSS fix). Here, the NAS layer 1101 of the UE 1102 may receive, from the one or more lower layer 1103, an indication of the location acquisition indicating that the GNSS location is available in the one or more lower layers 1103 than the NAS layer 1101.

At 1111, the NAS layer 1101 of the UE 1102 may determine a location acquisition status associated with a GNSS location of the UE 1102. Here, the NAS layer 1101 of the UE 1102 may determine that the GNSS fix is available based on the indication of the location acquisition received from the one or more lower layers 1103 at 1110.

At 1112, the NAS layer 1101 of the UE 1102 may set a state of the NAS layer 1101. The NAS layer 1101 of the UE 1102 may set a state of the NAS layer to a first state (e.g., the first NAS state) indicating that the UE 1102 is unable to initiate transmission of the NAS message before establishing the GNSS Fix or a second state (e.g., the second NAS state) indicating that the UE 1102 is able to initiate transmission of the NAS message before establishing the GNSS Fix. Here, the first NAS state may be considered as a substate of a 5GMM-IDLE state and may be referred to as "5GMM-IDLE mode with location delay." In other examples, the first NAS state may be referred to by another name. In another aspect, the NAS layer 1101 may set the state of the NAS layer 1101 to a second state (e.g., the second NAS state) based on the location acquisition status indicating that the GNSS location is available in a lower layer than the NAS layer 1101 or the UE is of the type that the additional delay is not specified for the GNSS location acquisition. That is, the UE 1102 may be configured with the second NAS state indicating that the UE 1102 is able to initiate transmission of the NAS message before establishing the GNSS Fix.

At 1130, the NAS layer 1101 of the UE 1102 may determine to start a network registration process. The NAS layer 1101 of the UE 1102 may be specified to transmit a registration reqeust to the network. The NAS layer 1101 of the UE 1102 may may determine to increase the NAS procedure timer based on the state of NAS layer set at 1112 determined based on the location acquisition status determined at 1111. In one aspect, based on the NAS layer 1101 being in the first NAS state indicating that the GNSS location is not available in a lower layer than the NAS layer 1101, the NAS layer 1101 may increase the NAS procedure timer. In another aspect, based on the NAS layer 1101 being in the second NAS state indicating that the GNSS location is available in a lower layer than the NAS layer 1101, the NAS layer 1101 may initiate the registration request without increasing the NAS procedure timer.

At 1113, the NAS layer 1101 of the UE 1102 may receive a connection request from the application layer 1104. In response to receiving the connection request from the application layer 1104, the NAS layer 1101 may increase or maintain the NAS procedure timer and initiate the connection request based on the state of NAS layer set at 1112 determined based on the location acquisition status determined at 1111. In one aspect, based on the NAS layer 1101 being in the first NAS state indicating that the GNSS location is not available in a lower layer than the NAS layer 1101, the NAS layer 1101 may increase the NAS procedure timer and initiate the connection request based on the state of NAS layer set at 1112 determined based on the location acquisition status determined at 1111. In another aspect, based on the NAS layer 1101 being in the second NAS state indicating that the GNSS location is available in a lower layer than the NAS layer 1101, the NAS layer 1101 may maintain the NAS procedure timer and initiate the connection request based on the state of NAS layer set at 1112 determined based on the location acquisition status determined at 1111.

At 1115, the NAS layer 1101 of the UE 1102 may indicate to the application layer 1104 of the UE 1102 that the connection request is transmitted at the NAS layer 1101 with the increased NAS procedure timer based on the location acquisition status. The NAS layer 1101 in the first state may indicate to the application layer 1104 that the connection requests are initiated with the increased NAS procedure timer due to the GNSS location unavailable at the one or more lower layers 1103. That is, the UE 1102 may be configured that when the NAS layer 1101 is in the first NAS state, indicating that the UE 1102 is unable to initiate connection requests before establishing the GNSS Fix, and the NAS layer 1101 in the first NAS state may be configured to indicate the application layer 1104 that the connection request at the NAS layer 1101 is initiated with the increased NAS procedure timer.

At 1119, the NAS layer 1101 of the UE 1102 may add the time delay to the NAS procedure timer based on the location acquisition status, the time delay being associated with a response to the NAS message. The transmission of the NAS message may include at least one of the connection request, the registration request, or the paging response. In one aspect, the NAS message may be associated with the connection request received from the application layer 1104 at 1113. In another aspect, the NAS message may be associated with the registration request generated from the NAS layer 1101 at 1130. That is, the NAS layer 1101 may add the additional time delay to the NAS procedure timer based on the state of the NAS layer 1101 being in the second NAS state indicating that the GNSS location is available in a lower layer than the NAS layer 1101. In response to setting the state of the NAS layer to the second NAS state at 1111, the NAS layer 1101 may increase the NAS procedure timer by adding the additional time delay. In one aspect, the state of the NAS layer 1101 may be set to the second NAS state at 1112 based on the indication of the location acquisition received at 1110 indicating that the GNSS location is not available or cannot be made available within a short period of time, and the additional time delay may correspond with the delay to acquire the GNSS fix. In another aspect, the state of the NAS layer 1101 may be set to the second NAS state at 1112 based on the UE 1102 being the type that the additional delay in the one or more lower layers 1103 may be specified for GNSS location acquisition, and the additional time delay may correspond with the additional delay specified on the one or more lower layers 1103 for GNSS location acquisition.

In one aspect, the NAS layer 1101 may add the additional delay if the time since the last uplink transmission is greater than or equal to a threshold, wherein the threshold corresponds to the validity time of the GNSS fix. That is, even if the NAS layer 1101 determines that the UE 1102 is specified with the additional delay in the one or more lower layers 1103 for the GNSS location acquisition, if the GNSS location acquisition from the previous uplink transmission is still valid, the UE 1102 may initiate the transmission of the NAS message without incurring the additional delay. Accordingly, the NAS layer 1101 may determine if the time since the last uplink transmission is shorter than the validity duration of the GNSS location, the GNSS location is still valid, and the UE 1102 may not add the additional delay to increase the NAS procedure timer.

In another aspect, the NAS layer 1101 may determine that the additional delay would cause the message to be sent during the coverage gap, and the NAS layer 1101 may be configured to not send the registration request message or further delay the registration request message by the duration of the coverage gap. The coverage gap may be determined based on the starting time and the duration of the coverage gap received at 1108. The registration request message may be transmitted to the network 1106 based on the one or more lower layers 1103 establishing the GNSS location information and the RRC connection with the network 1106. However, the NAS procedure timer may be increased by the additional delay due to the GNSS location acquisition at the one or more lower layers 1103 and cause the transmission of the registration request message to be scheduled during the coverage gap. Since the UE 1102 and the network 1106 may not communicate during the coverage gap, the UE 1102 may not transmit the registration request message to the network 1106. For example, NAS procedure timer may be configured as 15 seconds for the registration procedure, and the NAS layer 1101 determines at 1111 that at the lower layers, the procedure to fix, e.g., determine, the GNSS address may take 14 seconds before sending out the NAS message to the network 1106, the NAS layer 1101 may add the 14 seconds to the 15 seconds to set the NAS procedure timer to be 29 seconds.

At 1120, the NAS layer 1101 of the UE 1102 may initiate the transmission of the NAS message for a NAS procedure based on the state of the NAS layer 1101 being the second NAS state. That is, the NAS layer 1101 may determine to initiate the transmission of the NAS message to the one or more lower layers 1103, based on the GNSS location being available in the one or more lower layers 1103, the determination of the location acquisition status associated with the GNSS location of the UE 1102 at 1111 may be based on the indication of the GNSS location availability received from the one or more lower layers 1103 at 1110. In one aspect, the state of the NAS layer 1101 may be set to the second NAS state at 1112, and the NAS layer 1101 may initiate the transmission of the NAS message. In another aspect, the state of the NAS layer 1101 may initially be set to the first NAS state at 1112 and changed to the second NAS state at 1118 based on receiving the indication of the location acquisition associated with the acquisition of the GNSS location of the UE 1102 at 1111, At 1122, the NAS layer 1101 of the UE 1102 may start the NAS procedure timer based on transmitting the NAS message at the NAS layer 1101. The NAS procedure timer may run until the UE 1102 receives a response to the transmission of the NAS message, and if the NAS procedure timer expires before receiving, from the network 1106, the response to the registration request message, the NAS layer 1101 may abort the initial attempt and re-starts the procedure.

At 1116, the one or more lower layers 1103 of the UE 1102 may acquire the GNSS fix with the network 1106. The GNSS fix procedure may refer to the procedure performed by the UE 1102 to acquire the signals of a sufficient number of base stations to confidently determine the location of the UE 1102. Before the UE 1102 may initiate the uplink data transmission to the network 1106, the UE 1102 may acquire the GNSS location to perform the time/frequency pre-compensation. For example, the GNSS fix or GNSS location acquisition procedure may take a relatively extensive time delay, e.g., between 10 to 30 seconds.

At 1117, the NAS layer 1101 of the UE 1102 may receive, from the one or more lower layer 1103, an indication of the location acquisition indicating that the GNSS location is available in the one or more lower layers 1103 than the NAS layer 1101 based on the one or more lower layers 1103 acquiring the GNSS fix with the network 1106 at 1116.

At 1118, the NAS layer 1101 of the UE 1102 may change the state of the NAS layer 1101 to the second NAS state of the NAS layer 1101 in response to receiving the indication from the lower layer that the GNSS location is available. The NAS layer 1101 of the UE 1102 may change the state of the NAS layer 1101 from the first NAS state to the second NAS state upon receiving the indication from the one or more lower layers 1103 that the location is available at 1110. That is, the UE 1102 may change the state of the NAS layer 1101 from the first NAS state to a different state, in which the NAS layer 1101 may initiate the connection request. The different states of the NAS layer 1101 may include states, e.g., the 5GMM-REGISTERED.NORMAL-SERVICE state or the 5GMM-IDLE state, respectively, upon receiving the indication from the one or more lower layers 1103 that the GMSS location is available.

At 1126, the one or more lower layers 1103 of the UE 1102 may transmit the the NAS message to the network 1106, and at 1128, the one or more lower layers 1103 of the UE 1102 may receive, from the network 1106, a response to the the NAS message transmitted to the network 1106 at 1126. At 1129, the NAS layer 1101 may indicate the application layer 1104 that the connection with the network 1106 was successfully established.

The call-flow diagram 650 of FIG. 6B may be applicable to the call-flow diagram 1100 of FIG. 11. Based on the call-flow diagram 650, the UE 1102 may determine to omit or delay the transmission of the NAS message to the network 1106 based on determining that the transmission of the NAS message may fall into the coverage gap. In one aspect, the determination to omit or delay the transmition of the NAS message based on the coverage gap may be super-imposed to the procedure illustrated in FIG. 11. That is, the UE 1102 may determine whether to omit or delay the transmition of the NAS message based on the coverage gap between any of the steps illustrates in the call-flow diagram 1100 of FIG. 11.

Figure 12:
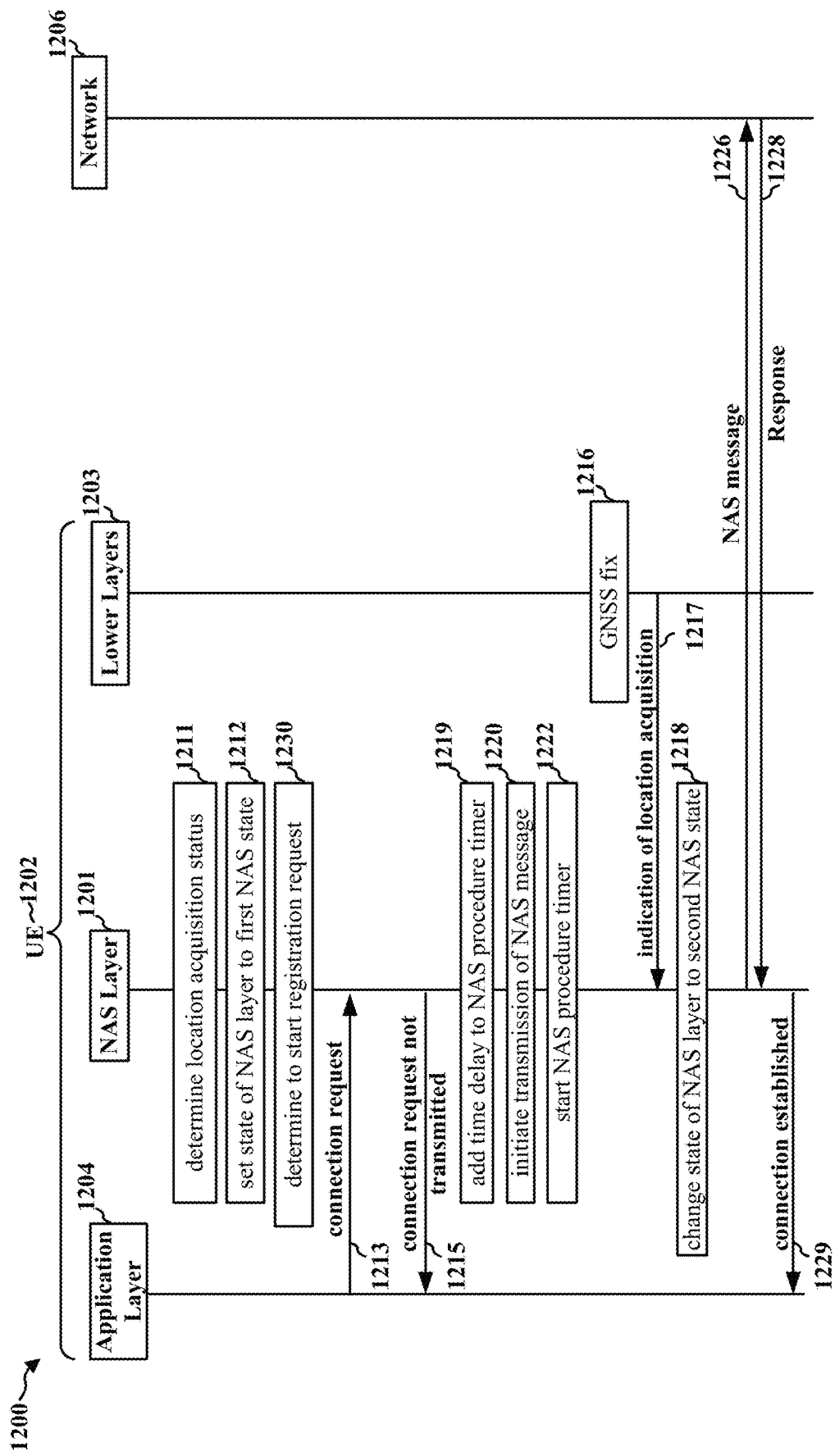
FIG. 12 is a call-flow diagram of wireless communication.

FIG. 12 is a call-flow diagram 1200 of a method of wireless communication. The call-flow diagram 1200 may include a UE 1202 and a network 1206. The UE 1202 may include a NAS layer 1201, one or more lower layers 1203, and an application layer 1204. The call-flow diagram 1200 may illustrate the procedure to transmit the NAS message based on the GNSS fix procedure from the perspective of the UE 1202. The NAS message may include at least one of a connection request, a registration request, or a paging response. In one aspect, the connection request may be started based on the connection request from the application layer 1204. In another aspect, the registration request may be started from the NAS layer 1201. For example, the UE 1202 may include the IoT NTN device, and acquire the GNSS location to perform the time/frequency pre-compensation. The UE 1202 may be configured to apply additional time delay to NAS procedure timer based on the additional delay being specified in the one or more lower layers 1203 for GNSS location acquisition. The NAS layer 1201 of the UE 1202 may determine that the UE 1202 is of the type that an additional delay in the one or more lower layers 1203 may be specified for GNSS location acquisition, and increase the NAS procedure timer may applying additional time delay.

At 1211, the NAS layer 1201 of the UE 1202 may determine a location acquisition status associated with a GNSS location of the UE 1202. Here, the NAS layer 1201 of the UE 1202 may determine that the UE 1202 is of the type that an additional delay in the one or more lower layers 1203 may be specified for GNSS location acquisition.

At 1212, the NAS layer 1201 of the UE 1202 may set a state of the NAS layer 1201. The NAS layer 1201 of the UE 1202 may set a state of the NAS layer to a first state (e.g., the first NAS state) indicating that the UE 1202 is unable to initiate transmission of the NAS message before establishing the GNSS Fix or a second state (e.g., the second NAS state) indicating that the UE 1202 is able to initiate the transmission of the NAS message before establishing the GNSS Fix. Here, the NAS layer 1201 of the UE 1202 may set a state of a NAS layer 1201 to the first NAS state based on the location acquisition status indicating that the UE is of the type that the additional delay in the one or more lower layers 1203 may be specified for the GNSS location acquisition. That is, the UE 1202 may be configured with the first NAS state that indicates that the UE 1202 is unable to initiate the transmission of the NAS message before establishing the GNSS Fix. Based on determining that the UE 1202 is of the type that an additional delay in the one or more lower layers 1203 may be specified for GNSS location acquisition, the NAS layer 1201 of the UE 1202 may set the state of the NAS layer 1201 to the first NAS state as a default state of the NAS layer 1201. The first NAS state may be considered as a substitute of a registered state, such as a 5GMM-REGISTERED state. In one example, the state may be referred to "5GMM-REGISTERED.NO-LOCATION-AVAILABLE" state. In another example, the first NAS state may be considered as a substate of a 5GMM-IDLE state and may be referred to as "5GMM-IDLE mode with location delay." In other examples, the first NAS state may be referred to by another name.

At 1230, the NAS layer 1201 of the UE 1202 may determine to start a network registration process. The NAS layer 1201 of the UE 1202 may be specified to transmit a registration reqeust to the network. The NAS layer 1201 of the UE 1202 may may determine to increase the NAS procedure timer based on the state of NAS layer set at 1212 determined based on the location acquisition status determined at 1211. In one aspect, based on the NAS layer 1201 being in the first NAS state indicating that the GNSS location is not available in a lower layer than the NAS layer 1201, the NAS layer 1201 may increase the NAS procedure timer. In another aspect, based on the NAS layer 1201 being in the second NAS state indicating that the GNSS location is available in a lower layer than the NAS layer 1201, the NAS layer 1201 may initiate the registration request without increasing the NAS procedure timer.

At 1213, the NAS layer 1201 of the UE 1202 may receive a connection request from the application layer 1204. In response to receiving the connection request from the application layer 1204, the NAS layer 1201 may increase or maintain the NAS procedure timer and initiate the connection request based on the state of NAS layer set at 1212 determined based on the location acquisition status determined at 1211. In one aspect, based on the NAS layer 1201 being in the first NAS state indicating that the UE is of the type that the additional delay in the one or more lower layers 1203 may be specified for the GNSS location acquisition, the NAS layer 1201 may increase the NAS procedure timer and initiate the connection request based on the state of NAS layer set at 1212 determined based on the location acquisition status determined at 1211. In another aspect, based on the NAS layer 1201 being in the second NAS state indicating that the GNSS location is available in a lower layer than the NAS layer 1201, the NAS layer 1201 may maintain the NAS procedure timer and initiate the connection request based on the state of NAS layer set at 1212 determined based on the location acquisition status determined at 1211.

At 1215, the NAS layer 1201 of the UE 1202 may indicate to the application layer 1204 of the UE 1202 that the connection request is transmitted at the NAS layer 1201 with the increased NAS procedure timer based on the location acquisition status. The NAS layer 1201 in the first state may indicate to the application layer 1204 that the connection requests are initiated with the increased NAS procedure timer due to the GNSS location unavailable at the one or more lower layers 1203. That is, the UE 1202 may be configured that when the NAS layer 1201 is in the first NAS state, indicating that the UE 1202 is unable to initiate connection requests before establishing the GNSS Fix, and the NAS layer 1201 in the first NAS state may be configured to indicate the application layer 1204 that the connection request at the NAS layer 1201 is initiated with the increased NAS procedure timer.

At 1219, the NAS layer 1201 of the UE 1202 may add the time delay to the NAS procedure timer based on the location acquisition status, the time delay being associated with a response to the connection request. That is, the NAS layer 1201 may add the additional time delay to the NAS procedure timer based on the state of the NAS layer 1201 being in the second NAS state indicating that the GNSS location is available in a lower layer than the NAS layer 1201. In response to the setting the state of the NAS layer to the second NAS state at 1211, the NAS layer 1201 may increase the NAS procedure timer by adding the additional time delay. In one aspect, the state of the NAS layer 1201 may be set to the second NAS state at 1212 based on the indication of the location acquisition received at 1210 indicating that the GNSS location is not available or cannot be made available within a short period of time, and the additional time delay may correspond with the delay to acquire the GNSS fix. In another aspect, the state of the NAS layer 1201 may be set to the second NAS state at 1212 based on the UE 1202 being the type that the additional delay in the one or more lower layers 1203 may be specified for GNSS location acquisition, and the additional time delay may correspond with the additional delay specified on the one or more lower layers 1203 for GNSS location acquisition.

In one aspect, the NAS layer 1201 may add the additional delay if the time since the last uplink transmission is greater than or equal to a threshold, wherein the threshold corresponds to the validity time of the GNSS fix. That is, even if the NAS layer 1201 determines that the UE 1202 is specified with the additional delay in the one or more lower layers 1203 for the GNSS location acquisition, if the GNSS location acquisition from the previous uplink transmission is still valid, the UE 1202 may initiate the connection request without incurring the additional delay. Accordingly, the NAS layer 1201 may determine if the time since the last uplink transmission is shorter than the validity duration of the GNSS location, the GNSS location is still valid, and the UE 1202 may not add the additional delay to increase the NAS procedure timer.

In another aspect, the NAS layer 1201 may determine that the additional delay would cause the message to be sent during the coverage gap, and the NAS layer 1201 may be configured to not send the registration request message or further delay the registration request message by the duration of the coverage gap. The coverage gap may be determined based on the starting time and the duration of the coverage gap received at 1208. The registration request message may be transmitted to the network 1206 based on the one or more lower layers 1203 establishing the GNSS location information and the RRC connection with the network 1206. However, the NAS procedure timer may be increased by the additional delay due to the GNSS location acquisition at the one or more lower layers 1203 and cause the transmission of the registration request message to be scheduled during the coverage gap. Since the UE 1202 and the network 1206 may not communicate during the coverage gap, the UE 1202 may not transmit the registration request message to the network 1206. For example, NAS procedure timer may be configured as 15 seconds for the registration procedure, and the NAS layer 1201 determines at 1211 that at the lower layers, the procedure to fix, e.g., determine, the GNSS address may take 14 seconds before sending out the connection request message to the network 1206, the NAS layer 1201 may add the 14 seconds to the 15 seconds to set the NAS procedure timer to be 29 seconds.

At 1220, the NAS layer 1201 of the UE 1202 may initiate the transmission of the NAS message for a NAS procedure based on the state of the NAS layer 1201 being the second NAS state. That is, the NAS layer 1201 may determine to initiate the transmission of the NAS message to the one or more lower layers 1203, based on the GNSS location being available in the one or more lower layers 1203, the determination of the location acquisition status associated with the GNSS location of the UE 1202 at 1211 may be based on the indication of the GNSS location availability received from the one or more lower layers 1203 at 1210. In one aspect, the state of the NAS layer 1201 may be set to the second NAS state at 1212, and the NAS layer 1201 may initiate the connection request. In another aspect, the state of the NAS layer 1201 may initially be set to the first NAS state at 1212 and changed to the second NAS state at 1218 based on receiving the indication of the location acquisition associated with the acquisition of the GNSS location of the UE 1202 at 1211, At 1222, the NAS layer 1201 of the UE 1202 may start the NAS procedure timer based on transmitting the NAS message at the NAS layer 1201. The NAS procedure timer may run until the UE 1202 receives a response to the transmission of the NAS message, and if the NAS procedure timer expires before receiving, from the network 1206, the response to the registration request message, the NAS layer 1201 may abort the initial attempt and re-starts the procedure.

At 1216, the one or more lower layers 1203 of the UE 1202 may acquire the GNSS fix with the network 1206. The GNSS fix procedure may refer to the procedure performed by the UE 1202 to acquire the signals of a sufficient number of base stations to confidently determine the location of the UE 1202. Before the UE 1202 may initiate the uplink data transmission to the network 1206, the UE 1202 may acquire the GNSS location to perform the time/frequency pre-compensation. For example, the GNSS fix or GNSS location acquisition procedure may take a relatively extensive time delay, e.g., between 10 to 30 seconds.

At 1217, the NAS layer 1201 of the UE 1202 may receive, from the one or more lower layer 1203, an indication of the location acquisition indicating that the GNSS location is available in the one or more lower layers 1203 than the NAS layer 1201 based on the one or more lower layers 1203 acquiring the GNSS fix with the network 1206 at 1216.

At 1218, the NAS layer 1201 of the UE 1202 may change the state of the NAS layer 1201 to the second NAS state of the NAS layer 1201 in response to receiving the indication from the lower layer that the GNSS location is available. The NAS layer 1201 of the UE 1202 may change the state of the NAS layer 1201 from the first NAS state to the second NAS state upon receiving the indication from the one or more lower layers 1203 that the location is available at 1210. That is, the UE 1202 may change the state of the NAS layer 1201 from the first NAS state to a different state, in which the NAS layer 1201 may initiate the connection request. The different states of the NAS layer 1201 may include states, e.g., the 5GMM-REGISTERED.NORMAL-SERVICE state or the 5GMM-IDLE state, respectively, upon receiving the indication from the one or more lower layers 1203 that the GMSS location is available.

At 1226, the one or more lower layers 1203 of the UE 1202 may transmit the NAS message to the network 1206, and at 1228, the one or more lower layers 1203 of the UE 1202 may receive, from the network 1206, a response to the NAS message transmitted to the network 1206 at 1226. At 1229, the NAS layer 1201 may indicate the application layer 1204 that the connection with the network 1206 was successfully established.

The call-flow diagram 650 of FIG. 6B may be applicable to the call-flow diagram 1200 of FIG. 12. Based on the call-flow diagram 650, the UE 1202 may determine to omit or delay the transmission of the NAS message to the network 1206 based on determining that the transmission of the NAS message may fall into the coverage gap. In one aspect, the determination to omit or delay the transmition of the NAS message based on the coverage gap may be super-imposed to the procedure illustrated in FIG. 12. That is, the UE 1202 may determine whether to omit or delay the transmission of the NAS message based on the coverage gap between any of the steps illustrates in the call-flow diagram 1200 of FIG. 12.

Figure 13:
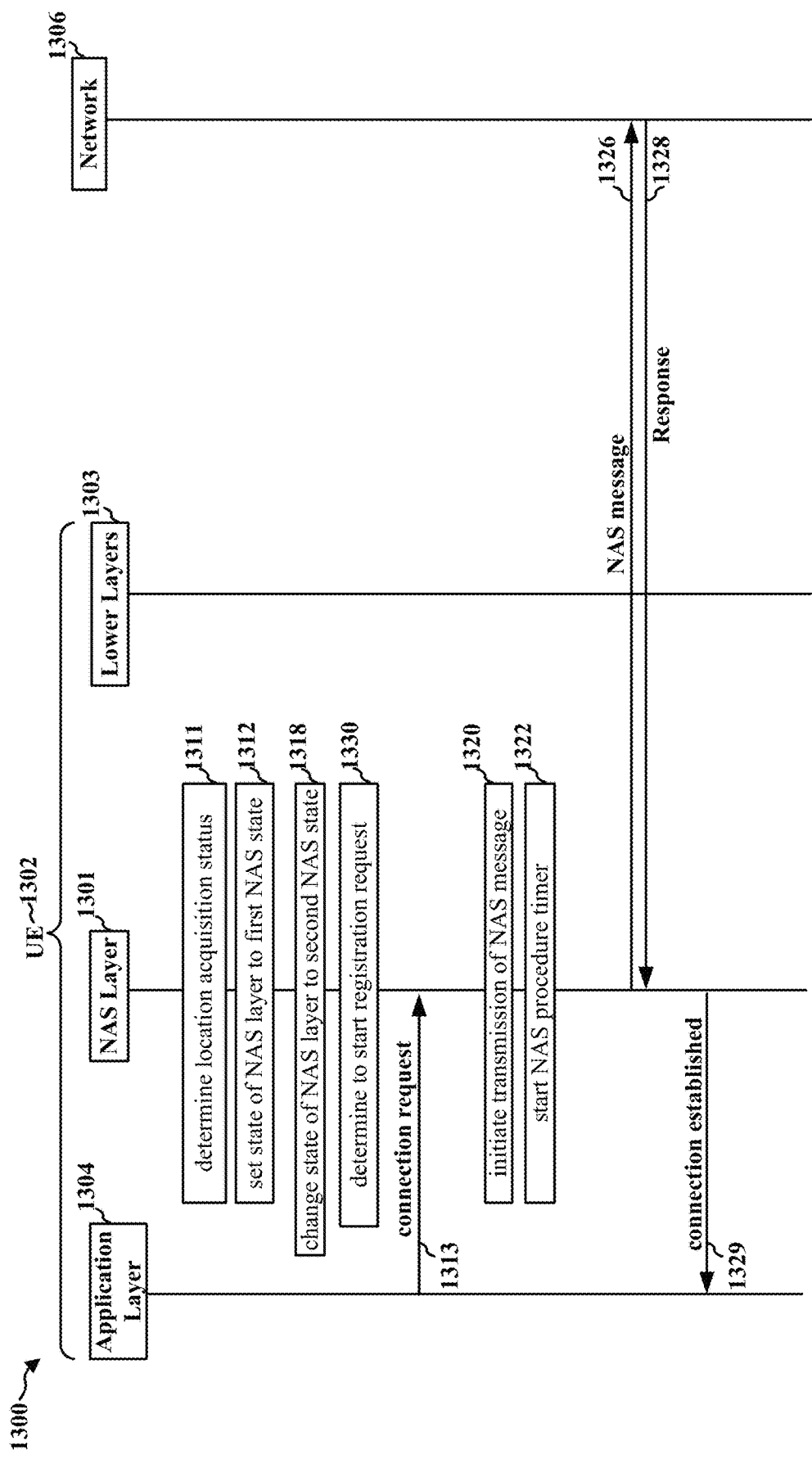
FIG. 13 is a call-flow diagram of wireless communication.

FIG. 13 is a call-flow diagram 1300 of a method of wireless communication. The call-flow diagram 1300 may include a UE 1302 and a network 1306. The UE 1302 may include a NAS layer 1301, one or more lower layers 1303, and an application layer 1304. The call-flow diagram 1300 may illustrate the procedure to transmit the NAS message based on the GNSS fix procedure from the perspective of the UE 1302. The NAS message may include at least one of a connection request, a registration request, or a paging response. In one aspect, the connection request may be started based on the connection request from the application layer 1304. In another aspect, the registration request may be started from the NAS layer 1301. For example, the UE 1302 may include the IoT NTN device, and acquire the GNSS location to perform the time/frequency pre-compensation. The UE 1302 may be configured to apply additional time delay to NAS procedure timer based on the additional delay being specified in the one or more lower layers 603 for GNSS location acquisition. The NAS layer 801 of the UE 802 may determine that the UE 802 is of the type that an additional delay in the one or more lower layers 803 may be specified for GNSS location acquisition, and not increase the NAS procedure timer since the last uplink transmission is less than a threshold.

At 1311, the NAS layer 1301 of the UE 1302 may determine a location acquisition status associated with a GNSS location of the UE 1302. Here, the NAS layer 1301 of the UE 1302 may determine that the UE 1302 is of the type that an additional delay in the one or more lower layers 1303 may be specified for GNSS location acquisition.

At 1312, the NAS layer 1301 of the UE 1302 may set a state of the NAS layer 1301. The NAS layer 1301 of the UE 1302 may set a state of the NAS layer to a first state (e.g., the first NAS state) indicating that the UE 1302 is unable to initiate transmission of the NAS message before establishing the GNSS Fix or a second state (e.g., the second NAS state) indicating that the UE 1302 is able to initiate transmission of the NAS message before establishing the GNSS Fix. Here, the NAS layer 1301 of the UE 1302 may set a state of a NAS layer 1301 to the first NAS state based on the location acquisition status indicating that the UE is of the type that the additional delay in the one or more lower layers 1303 may be specified for the GNSS location acquisition. That is, the UE 1302 may be configured with the first NAS state that indicates that the UE 1302 is unable to initiate transmission of the NAS message before establishing the GNSS Fix. Based on determining that the UE 1302 is of the type that an additional delay in the one or more lower layers 1303 may be specified for GNSS location acquisition, the NAS layer 1301 of the UE 1302 may set the state of the NAS layer 1301 to the first NAS state as a default state of the NAS layer 1301. The first NAS state may be considered as a substitute of a registered state, such as a 5GMM-REGISTERED state. In one example, the state may be referred to "5GMM-REGISTERED.NO-LOCATION-AVAILABLE" state. In another example, the first NAS state may be considered as a substate of a 5GMM-IDLE state and may be referred to as "5GMM-IDLE mode with location delay." In other examples, the first NAS state may be referred to by another name.

At 1318, the NAS layer 1301 of the UE 1302 may change the state of the NAS layer 1301 to the second NAS state of the NAS layer 1301 based on the time since the last uplink transmission is less than a threshold, wherein the threshold corresponds to the validity time of the GNSS fix. That is, even if the NAS layer 1301 determines that the UE 1302 is specified with the additional delay in the one or more lower layers 1303 for the GNSS location acquisition, if the GNSS location acquisition from the previous uplink transmission is still valid, the UE 1302 may initiate the transmission of the NAS message without incurring the additional delay. Accordingly, the NAS layer 1301 may determine if the time since the last uplink transmission is shorter than the validity duration of the GNSS location, the GNSS location is still valid, and the UE 1302 may not add the additional delay to increase the NAS procedure timer. That is, the UE 1302 may change the state of the NAS layer 1301 from the first NAS state to a different state, in which the NAS layer 1301 may initiate the transmission of the NAS message. The different states of the NAS layer 1301 may include states, e.g., the 5GMM-REGISTERED.NORMAL-SERVICE state or the 5GMM-IDLE state, respectively, upon receiving the indication from the one or more lower layers 1303 that the GMSS location is available.

At 1330, the NAS layer 1301 of the UE 1302 may determine to start a network registration process. The NAS layer 1301 of the UE 1302 may be specified to transmit a registration reqeust to the network. The NAS layer 1301 of the UE 1302 may may determine to increase the NAS procedure timer based on the state of NAS layer set at 1312 determined based on the location acquisition status determined at 1311. In one aspect, based on the NAS layer 1301 being in the first NAS state indicating that the GNSS location is not available in a lower layer than the NAS layer 1301, the NAS layer 1301 may increase the NAS procedure timer. In another aspect, based on the NAS layer 1301 being in the second NAS state indicating that the GNSS location is available in a lower layer than the NAS layer 1301, the NAS layer 1301 may initiate the registration request without increasing the NAS procedure timer.

At 1313, the NAS layer 1301 of the UE 1302 may receive a connection request from the application layer 1304. In response to receiving the connection request from the application layer 1304, the NAS layer 1301 may initiate the connection request or delay the connection request based on the state of NAS layer set at 1312 determined based on the location acquisition status determined at 1311. In one aspect, based on the NAS layer 1301 being in the first NAS state indicating that the GNSS location is not available in a lower layer than the NAS layer 1301 or the UE is of the type that the additional delay in the one or more lower layers 1303 may be specified for the GNSS location acquisition, the NAS layer 1301 may delay initiation of the connection request received from the application layer 1304. In another aspect, based on the NAS layer 1301 being in the second NAS state indicating that the GNSS location is available in a lower layer than the NAS layer 1301 or the UE is of the type that the additional delay is not specified for the GNSS location acquisition, the NAS layer 1301 may initiate the connection request received from the application layer 1304.

At 1320, the NAS layer 1301 of the UE 1302 may initiate the transmission of the NAS message for a NAS procedure based on the state of the NAS layer 1301 being the second NAS state. That is, the NAS layer 1301 may determine to initiate the transmission of the NAS message to the one or more lower layers 1303, based on the GNSS location being available in the one or more lower layers 1303, the determination of the location acquisition status associated with the GNSS location of the UE 1302 at 1311 may be based on the indication of the GNSS location availability received from the one or more lower layers 1303 at 1310. In one aspect, the state of the NAS layer 1301 may be set to the second NAS state at 1312, and the NAS layer 1301 may initiate the connection request. In another aspect, the state of the NAS layer 1301 may initially be set to the first NAS state at 1312 and changed to the second NAS state at 1318 based on receiving the indication of the location acquisition associated with the acquisition of the GNSS location of the UE 1302 at 1311, At 1322, the NAS layer 1301 of the UE 1302 may start the NAS procedure timer based on transmitting the NAS message at the NAS layer 1301. The NAS procedure timer may run until the UE 1302 receives a response to the transmission of the NAS message, and if the NAS procedure timer expires before receiving, from the network 1306, the response to the registration request message, the NAS layer 1301 may abort the initial attempt and re-starts the procedure.

At 1326, the one or more lower layers 1303 of the UE 1302 may transmit the connection request to the network 1306, and at 1328, the one or more lower layers 1303 of the UE 1302 may receive, from the network 1306, a response to the connection request transmitted to the network 1306 at 1326. At 1329, the NAS layer 1301 may indicate the application layer 1304 that the connection with the network 1306 was successfully established. The transmission of the NAS message may include at least one of the connection request, the registration request, or the paging response. In one aspect, the NAS message may be associated with the connection request received from the application layer 904 at 913. In another aspect, the NAS message may be associated with the registration request generated from the NAS layer 901 at 930.

The call-flow diagram 650 of FIG. 6B may be applicable to the call-flow diagram 1300 of FIG. 13. Based on the call-flow diagram 650, the UE 1302 may determine to omit or delay the transmission of the NAS message to the network 1306 based on determining that the transmission of the NAS message may fall into the coverage gap. In one aspect, the determination to omit or delay the transmission of the NAS message based on the coverage gap may be super-imposed to the procedure illustrated in FIG. 13. That is, the UE 1302 may determine whether to omit or delay the transmission of the NAS message based on the coverage gap between any of the steps illustrates in the call-flow diagram 1300 of FIG. 13. At 1329, the NAS layer 1301 may indicate the application layer 904 that the connection with the network 1306 was successfully established.

Figure 14A:
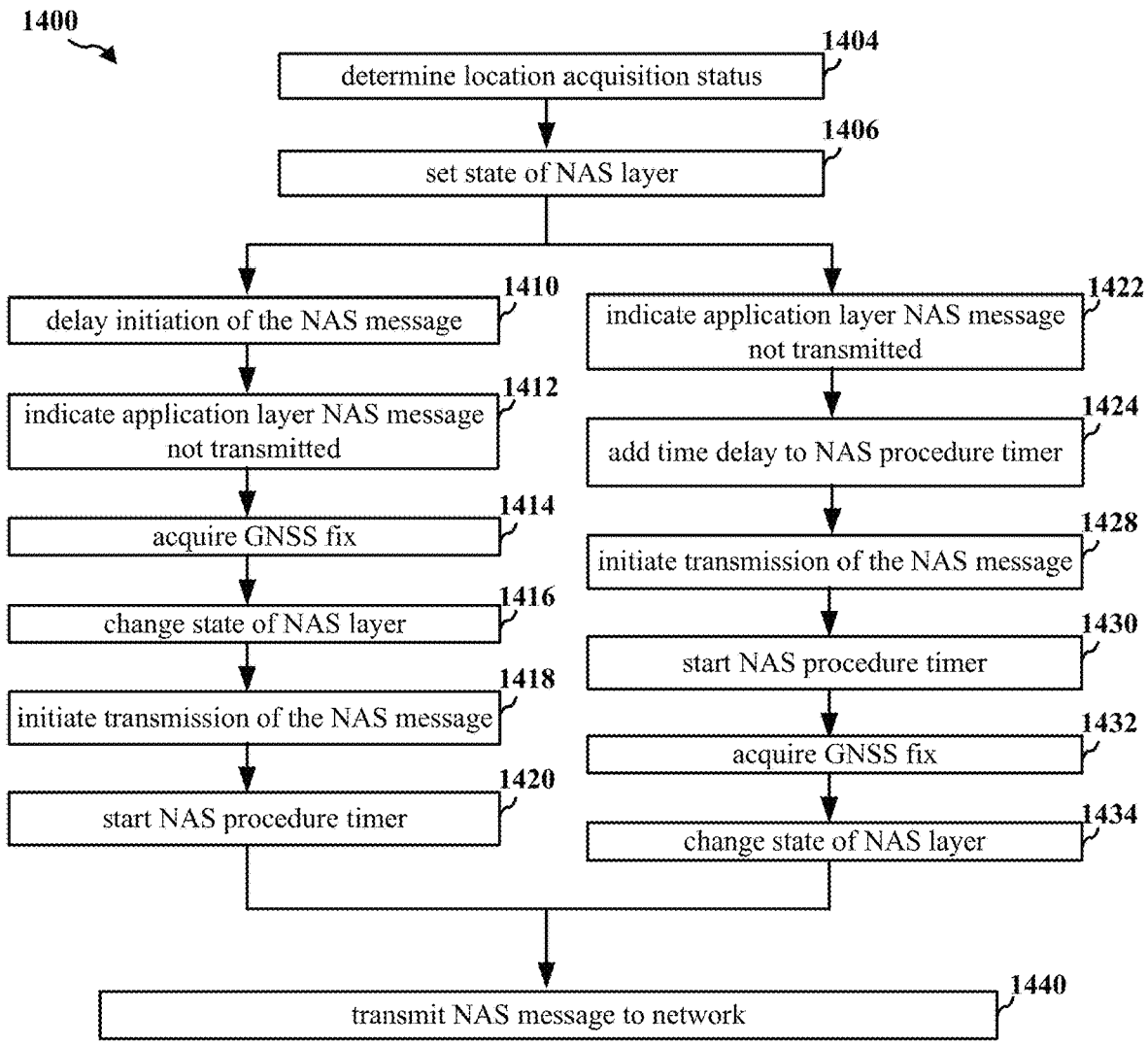
FIG. 14A is a flowchart of wireless communication.

FIG. 14A is a flowchart 1400 of a method of wireless communication. The method may be performed by a UE (e.g., the UE 104/602/702/802/902/1002/1102/1202/1302; the apparatus 2102). The UE may transmit the NAS message based on the GNSS fix procedure from the perspective of the UE. For example, the UE may include the IoT NTN device, and acquire the GNSS location to perform the time/frequency pre-compensation. The NAS message may include at least one of a connection request, a registration request, or a paging response. In one aspect, the connection request may be started based on the connection request from the application layer. In another aspect, the registration request may be started from the NAS layer.

652 At 1404, the UE may determine a location acquisition status associated with a GNSS location of the UE. The UE may receive an indication of the location acquisition status indicating whether the GNSS location is available in the one or more lower layers than the NAS layer. The location acquisition status may be determined based on the indication of the location acquisition received from the one or more lower layers. In one aspect, the indication received from the location acquisition status from the one or more lower layers may indicate whether the GNSS location is available or can be made available within a short period of time (e.g., no need to get a GNSS fix). In another aspect, the location acquisition status may indicate that the UE is of the type that an additional delay in the one or more lower layers is used for GNSS location acquisition. For example, at 611, 711, 811, 911, 1011, 1111, 1211, and 1311, the NAS layer 601, 701, 801, 901, 1001, 1101, 1201, or 1301 of the UE 602, 702, 802, 902, 1002, 1102, 1202, or 1302 may determine a location acquisition status associated with the GNSS location of the UE 602, 702, 802, 902, 1002, 1102, 1202, or 1302. The NAS layer 601, 701, 801, 901, 1001, 1101, 1201, or 1301 of the UE 602, 702, 802, 902, 1002, 1102, 1202, or 1302 may receive an indication of the location acquisition status indicating whether the GNSS location is available in the one or more lower layers 603, 703, 803, 903, 1003, 1103, 1203, or 1303 than the NAS layer 601, 701, 801, 901, 1001, 1101, 1201, or 1301. Furthermore, 1404 may be performed by a location acquisition component 2142.

At 1406, the UE may set a state of the NAS layer. In one aspect, the NAS layer of the UE may set a state of a NAS layer to a first state (e.g., the first NAS state) based on the location acquisition status indicating that the GNSS location is not available in a lower layer than the NAS layer or the UE is of the type that the additional delay in the one or more lower layers may be specified for the GNSS location acquisition. That is, the UE may be configured with the first NAS state that indicates that the UE is unable to initiate transmission of the NAS message before establishing the GNSS Fix. The first NAS state may be considered as a substitute of a registered state, such as a 5GMM-REGISTERED state. In one example, the state may be referred to "5GMM-REGISTERED.NO-LOCATION-AVAILABLE" state. In another example, the first NAS state may be considered as a substate of a 5GMM-IDLE state and may be referred to as "5GMM-IDLE mode with location delay." In other examples, the first NAS state may be referred to by another name. In another aspect, the NAS layer may set the state of the NAS layer to a second state (e.g., the second NAS state) based on the location acquisition status indicating that the GNSS location is available in a lower layer than the NAS layer or the UE is of the type that the additional delay is not specified for the GNSS location acquisition. For example, at 612, 712, 812, 912, 1012, 1112, 1212, and 1312, the NAS layer 601, 701, 801, 901, 1001, 1101, 1201, or 1301 of the UE 602, 702, 802, 902, 1002, 1102, 1202, or 1302 may set a state of the NAS layer 601, 701, 801, 901, 1001, 1101, 1201, or 1301. Furthermore, 1406 may be performed by a NAS layer state managing component 2146.

At 1410, the UE may delay initiation of the transmission of the NAS message at the NAS layer until the state of the NAS layer is changed to the second NAS state based on the location acquisition status indicating that the GNSS location is available at the lower layer or the UE is of the type that the additional delay in the one or more lower layers may be specified for the GNSS location acquisition. That is, the NAS layer of the UE may not initiate the transmission of the NAS message at the NAS layer until the state of the NAS layer is changed from the first NAS state to the second NAS state. After the state of the NAS layer is changed to the second NAS state based on receiving an indication of the location acquisition status indicating that the GNSS location is available at the one or more lower layers, the NAS layer may initiate the transmission of the NAS message. For example, at 714 and 814, the NAS layer 701 or 801 of the UE 702 or 802 may delay initiation of the transmission of the NAS message at the NAS layer 701 or 801 until the state of the NAS layer 701 or 801 is changed to a second state based on the location acquisition status indicating that the GNSS location is available at the lower layer 703 or 803. Furthermore, 1410 may be performed by the NAS message managing component 2144.

At 1412, the UE may indicate to an application layer of the UE that the connection request at the NAS layer is not transmitted due to the location acquisition status. The NAS layer in the first state may indicate to the application layer that the connection requests are delayed due to the GNSS location unavailable at the one or more lower layers. That is, the UE may be configured that when the NAS layer is in the first NAS state, indicating that the UE is unable to initiate connection requests before establishing the GNSS Fix, and the NAS layer in the first NAS state may be configured to indicate the application layer that the connection request at the NAS layer is delayed until the state of the NAS layer is changed to a different state. For example, at 715 and 815, the NAS layer 701 or 801 of the UE 702 or 802 may indicate to the application layer 704 or 804 of the UE 702 or 802 that the connection request is not transmitted at the NAS layer based on the location acquisition status. Furthermore, 1412 may be performed by the NAS message managing component 2144.

At 1414, the UE may acquire the GNSS fix with the network. The GNSS fix procedure may refer to the procedure performed by the UE to acquire the signals of a sufficient number of base stations to confidently determine the location of the UE. Before the UE may initiate the uplink data transmission to the network, the UE may acquire the GNSS location to perform the time/frequency pre-compensation. For example, the GNSS fix or GNSS location acquisition procedure may take a relatively extensive time delay, e.g., between 10 to 30 seconds. For example, at 716 and 816, the one or more lower layers 703 or 803 of the UE702 or 802 may acquire the GNSS fix with the network 606. Furthermore, 1414 may be performed by the location acquisition component 2142.

At 1416, the UE may change the state of the NAS layer to the second NAS state of the NAS layer in response to receiving the indication from the lower layer that the GNSS location is available. The NAS layer of the UE may change the state of the NAS layer from the first NAS state to the second NAS state upon receiving the indication from the one or more lower layers that the location is available. That is, the UE may change the state of the NAS layer from the first NAS state to a different state, in which the NAS layer may initiate the transmission of the NAS message. The different states of the NAS layer may include states, e.g., the 5GMM-REGISTERED.NORMAL-SERVICE state or the 5GMM-IDLE state, respectively, upon receiving the indication from the one or more lower layers that the GMSS location is available. For example, at 718, 818, and 918, the NAS layer 701, 801, and 901 of the UE702, 802, and 902 may change the state of the NAS layer 701, 801, and 901 to the second NAS state of the NAS layer 701, 801, and 901 in response to receiving the indication from the lower layer that the GNSS location is available. Furthermore, 1416 may be performed by the NAS layer state managing component 2146.

At 1418, the UE may initiate the transmission of the NAS message for a NAS procedure based on the state of the NAS layer being the second NAS state. That is, the NAS layer may determine to initiate the transmission of the NAS message to the one or more lower layers, based on the GNSS location being available in the one or more lower layers, the determination of the location acquisition status associated with the GNSS location of the UE may be based on the indication of the GNSS location availability received from the one or more lower layers. In one aspect, the state of the NAS layer may be set to the second NAS state, and the NAS layer may initiate the transmission of the NAS message. In another aspect, the state of the NAS layer may initially be set to the first NAS state and changed to the second NAS state based on receiving the indication of the location acquisition associated with the acquisition of the GNSS location of the UE. For example, at 620, 720, 820, and 920, the NAS layer 601, 701, 801, and 901 of the UE 602, 702, 802, and 902 may initiate the connection request for a NAS procedure based on the state of the NAS layer 601, 701, 801, and 901 being the second NAS state. Furthermore, 1418 may be performed by a NAS message managing component 2144.

At 1420, the UE may start the NAS procedure timer based on transmitting the NAS message at the NAS layer. The NAS procedure timer may run until the UE 602, 702, 802, and 902 receives a response to the transmission of the NAS message, and if the NAS procedure timer expires before receiving, from the network 606, the response to the registration request message, the NAS layer 601, 701, 801, and 901 may abort the initial attempt and re-starts the procedure. For example, at 622, 722, 822, and 922, the NAS layer 601, 701, 801, and 901 of the UE 602, 702, 802, and 902 may start the NAS procedure timer based on transmitting the NAS message at the NAS layer 601, 701, 801, and 901. Furthermore, 1420 may be performed by the NAS procedure timer component 2148.

At 1422 the UE may indicate to an application layer of the UE that the connection request at the NAS layer is not transmitted due to the location acquisition status. The NAS layer in the first state may indicate to the application layer that the connection requests are delayed due to the GNSS location unavailable at the one or more lower layers. That is, the UE may be configured that when the NAS layer is in the first NAS state, indicating that the UE is unable to initiate connection requests before establishing the GNSS Fix, and the NAS layer in the first NAS state may be configured to indicate the application layer that the connection request at the NAS layer is delayed until the state of the NAS layer is changed to a different state. For example, at 1115 and 1215, the NAS layer 1101 or 1201 of the UE 1102 or 1202 may indicate to the application layer 1104 or 1204 of the UE 1102 or 1202 that the connection request is not transmitted at the NAS layer based on the location acquisition status. Furthermore, 1422 may be performed by the NAS message managing component 2144.

At 1424, the UE may add the time delay to the NAS procedure timer based on the location acquisition status, the time delay being associated with a response to the NAS message. The transmission of the NAS message may include at least one of the connection request, the registration request, or the paging response. In one aspect, the NAS message may be associated with the connection request received from the application layer. In another aspect, the NAS message may be associated with the registration request generated from the NAS layer. That is, the NAS layer may add the additional time delay to the NAS procedure timer based on the state of the NAS layer being in the second NAS state indicating that the GNSS location is available in a lower layer than the NAS layer or the UE is of the type that the additional delay is not specified for the GNSS location acquisition. In response to the setting the state of the NAS layer to the second NAS state, the NAS layer may increase the NAS procedure timer by adding the additional time delay. In one aspect, the state of the NAS layer may be set to the second NAS state based on the indication of the location acquisition received indicating that the GNSS location is not available or cannot be made available within a short period of time, and the additional time delay may correspond with the delay to acquire the GNSS fix. In another aspect, the state of the NAS layer may be set to the second NAS state at based on the UE being the type that the additional delay in the one or more lower layers may be specified for GNSS location acquisition, and the additional time delay may correspond with the additional delay specified on the one or more lower layers for GNSS location acquisition. For example, at 1119 and 1219, the NAS layer 1101 or 1201 of the UE 1102 or 1202 may add the time delay to the NAS procedure timer based on the location acquisition status, the time delay being associated with a response to the connection request. Furthermore, 1424 may be performed by the NAS procedure timer component 2148.

At 1428, the UE may initiate the transmission of the NAS message for a NAS procedure based on the state of the NAS layer being the second NAS state. That is, the NAS layer may determine to initiate the transmission of the NAS message to the one or more lower layers, based on the GNSS location being available in the one or more lower layers, the determination of the location acquisition status associated with the GNSS location of the UE may be based on the indication of the GNSS location availability received from the one or more lower layers. In one aspect, the state of the NAS layer may be set to the second NAS state, and the NAS layer may initiate the transmission of the NAS message. In another aspect, the state of the NAS layer may initially be set to the first NAS state and changed to the second NAS state based on receiving the indication of the location acquisition associated with the acquisition of the GNSS location of the UE. For example, at 1020, 1120, 1220, and 1320, the NAS layer 1001, 1101, 1201, or 1301 of the UE 1002, 1102, 1202, or 1302 may initiate the connection request for a NAS procedure based on the state of the NAS layer 1001, 1101, 1201, or 1301 being the second NAS state. Furthermore, 1428 may be performed by a NAS message managing component 2144.

At 1430, the UE may start the NAS procedure timer based on transmitting the NAS message at the NAS layer. The NAS procedure timer may run until the UE 1002, 1102, 1202, or 1302 receives a response to the transmission of the NAS message, and if the NAS procedure timer expires before receiving, from the network 706, the response to the registration request message, the NAS layer 1001, 1101, 1201, or 1301 may abort the initial attempt and re-starts the procedure. For example, at 1022, 1122, 1222, and 1322, the NAS layer 1001, 1101, 1201, or 1301 of the UE 1002, 1102, 1202, or 1302 may start the NAS procedure timer based on transmitting the NAS message at the NAS layer 1001, 1101, 1201, or 1301. Furthermore, 1430 may be performed by the NAS procedure timer component 2148.

At 1432, the UE may acquire the GNSS fix with the network. The GNSS fix procedure may refer to the procedure performed by the UE to acquire the signals of a sufficient number of base stations to confidently determine the location of the UE. Before the UE may initiate the uplink data transmission to the network, the UE may acquire the GNSS location to perform the time/frequency pre-compensation. For example, the GNSS fix or GNSS location acquisition procedure may take a relatively extensive time delay, e.g., between 10 to 30 seconds. For example, at 1116 and 1216, the one or more lower layers 1103 or 1203 of the UE 1102 or 1202 may acquire the GNSS fix with the network 706. Furthermore, 1432 may be performed by the location acquisition component 2142.

At 1434, the UE may change the state of the NAS layer to the second NAS state of the NAS layer in response to receiving the indication from the lower layer that the GNSS location is available. The NAS layer of the UE may change the state of the NAS layer from the first NAS state to the second NAS state upon receiving the indication from the one or more lower layers that the location is available. That is, the UE may change the state of the NAS layer from the first NAS state to a different state, in which the NAS layer may initiate the connection request. The different states of the NAS layer may include states, e.g., the 5GMM-REGISTERED.NORMAL-SERVICE state or the 5GMM-IDLE state, respectively, upon receiving the indication from the one or more lower layers that the GMSS location is available. For example, at 1118, 1218 and 1318, the NAS layer 1101, 1201, or 1301 of the UE 1102, 1202, or 1302 may change the state of the NAS layer 1101, 1201, or 1301 to the second NAS state of the NAS layer 1101, 1201, or 1301 in response to receiving the indication from the lower layer that the GNSS location is available. Furthermore, 1434 may be performed by the NAS layer state managing component 2146.

At 1440, the UE may transmit the NAS message to the network and receive, from the network, a response to the the NAS message transmitted to the network. For example, at 626, 628, 726, 728, 826, 828, 926, 928, 1026, 1028, 1126, 1128, 1226, 1228, 1326, and 1328, the one or more lower layers 603, 703, 803, 903, 1003, 1103, 1203, or 1303 of the UE 602, 702, 802, 902, 1002, 1102, 1202, or 1302 may transmit the connection request to the network 606, 706, 806, 906, 1006, 1106, 1206, or 1306 and receive, from the network 606, 706, 806, 906, 1006, 1106, 1206, or 1306, a response to the connection request transmitted to the network 606, 706, 806, 906, 1006, 1106, 1206, or 1306. Furthermore, 1440 may be performed by the NAS message managing component 2144.

Figure 14B:
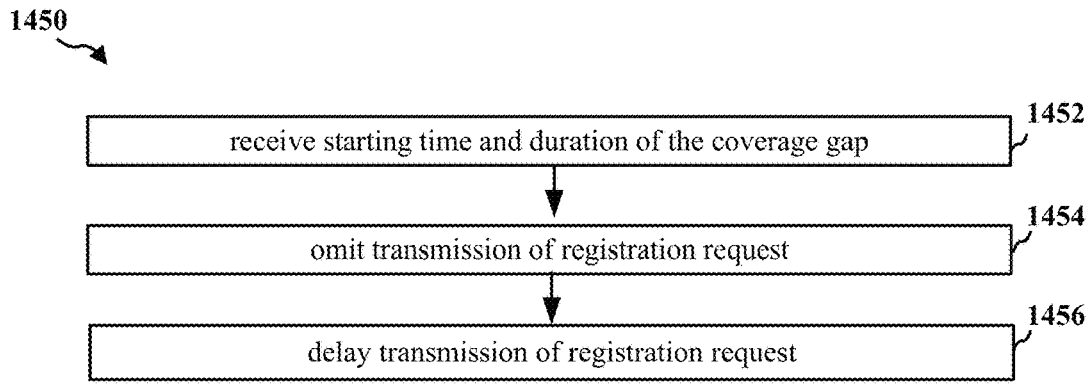
FIG. 14B is a flowchart of wireless communication.

FIG. 14B is a flowchart 1450 of a method of wireless communication. The method may be performed by a UE (e.g., the UE 104/602; the apparatus 2102). The UE may determine to omit or delay the transmission of the NAS message to the network 606 based on determining that the transmission of the NAS message may fall into the coverage gap. In one aspect, the determination to omit or delay the transmission of the NAS message based on the coverage gap may be super-imposed to the procedure illustrated in FIG. 14A. That is, the UE may determine whether to omit or delay the transmission of the NAS message based on the coverage gap between any of the steps illustrates in the flowchart 1400 of FIG. 14A. The NAS message may include at least one of a connection request, a registration request, or a paging response. In one aspect, the connection request may be started based on the connection request from the application layer 704. In another aspect, the registration request may be started from the NAS layer 701.

At 1452, the UE may receive a starting time and a duration of the coverage gap from the network. In one aspect, the UE may determine the coverage gap based on the starting time and the duration of the coverage gap received from the network. For example, at 652, the UE 602 may receive a starting time and a duration of the coverage gap from the network 606. Furthermore, 1452 may be performed by a cell coverage component 2140.

At 1454, the UE may omit transmission of the NAS message during a coverage gap in time during which the UE is not covered by a cell of the network, the cell comprising an NTN cell or a TN cell. The NTN providing the NTN cell may include a satellite network. For example, at 654, the NAS layer 601 of the UE 602 may omit transmission of a registration request message during a coverage gap in time during which the UE 602, 702, 802, 902, 1002, 1102, 1202, or 1302 is not covered by a cell of the network 606, 706, 806, 906, 1006, 1106, 1206, or 1306, the cell comprising an NTN cell or a TN cell. Furthermore, 1454 may be performed by the NAS message managing component 2144.

At 1456, the UE may delay transmission of the registration request message until the UE is within coverage of the cell of the network. That is, the NAS layer of the UE may postpone the transmission of the registration request to the subsequent in-coverage time. In one aspect, the transmission of the connection request may be delayed by a time delay based on a duration of the coverage gap. In another aspect, the UE may delay the transmission of the registration request for a time delay corresponding to the duration of the coverage gap so that the registration request may be transmitted to the network during the subsequent in-coverage time. For example, at 656, the NAS layer 601 of the UE 602 may delay transmission of the registration request message until the UE 602 is within coverage of the cell of the network 606. Furthermore, 1456 may be performed by the NAS message managing component 2144.

Figure 15:
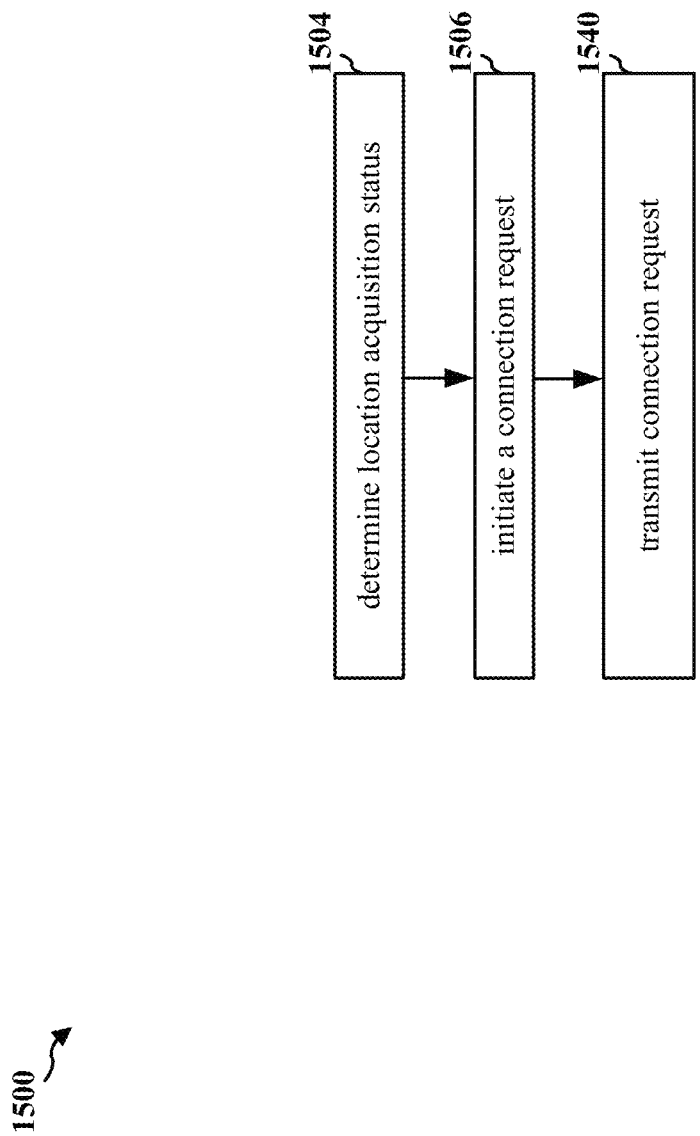
FIG. 15 is a flowchart of wireless communication.

FIG. 15 is a flowchart 1500 of a method of wireless communication. The method may be performed by a UE (e.g., the UE 104/502; the apparatus 2102). The UE may transmit the connection request procedure based on the GNSS fix procedure from the perspective of the UE. For example, the UE may include the IoT NTN device, and acquire the GNSS location to perform the time/frequency pre-compensation.

At 1504, the UE may determine a location acquisition status associated with a GNSS location of the UE. The UE may receive an indication of the location acquisition status indicating whether the GNSS location is available in the one or more lower layers than the NAS layer. The location acquisition status may be determined based on the indication of the location acquisition received from the one or more lower layers. In one aspect, the indication received from the location acquisition status from the one or more lower layers may indicate whether the GNSS location is available or can be made available within a short period of time (e.g., no need to get a GNSS fix). In another aspect, the location acquisition status may indicate that the UE is of the type that an additional delay in the one or more lower layers is used for GNSS location acquisition. For example, at 611, 711, 811, 911, 1011, 1111, 1211, and 1311, the NAS layer 601, 701, 801, 901, 1001, 1101, 1201, or 1301 of the UE 602, 702, 802, 902, 1002, 1102, 1202, or 1302 may determine a location acquisition status associated with the GNSS location of the UE 602, 702, 802, 902, 1002, 1102, 1202, or 1302. The NAS layer 601, 701, 801, 901, 1001, 1101, 1201, or 1301 of the UE 602, 702, 802, 902, 1002, 1102, 1202, or 1302 may receive an indication of the location acquisition status indicating whether the GNSS location is available in the one or more lower layers 603, 703, 803, 903, 1003, 1103, 1203, or 1303 than the NAS layer 601, 701, 801, 901, 1001, 1101, 1201, or 1301. Furthermore, 1504 may be performed by a location acquisition component 2142.

At 1506, the UE may set a state of the NAS layer. In one aspect, the NAS layer of the UE may set a state of a NAS layer to a first state (e.g., the first NAS state) based on the location acquisition status indicating that the GNSS location is not available in a lower layer than the NAS layer or the UE is of the type that the additional delay in the one or more lower layers may be specified for the GNSS location acquisition. That is, the UE may be configured with the first NAS state that indicates that the UE is unable to initiate connection requests before establishing the GNSS Fix. The first NAS state may be considered as a substitute of a registered state, such as a 5GMM-REGISTERED state. In one example, the state may be referred to "5GMM-REGISTERED.NO-LOCATION-AVAILABLE" state. In another example, the first NAS state may be considered as a substate of a 5GMM-IDLE state and may be referred to as "5GMM-IDLE mode with location delay." In other examples, the first NAS state may be referred to by another name. In another aspect, the NAS layer may set the state of the NAS layer to a second state (e.g., the second NAS state) based on the location acquisition status indicating that the GNSS location is available in a lower layer than the NAS layer or the UE is of the type that the additional delay is not specified for the GNSS location acquisition. For example, at 612, 712, 812, 912, 1012, 1112, 1212, and 1312, the NAS layer 601, 701, 801, 901, 1001, 1101, 1201, or 1301 of the UE 602, 702, 802, 902, 1002, 1102, 1202, or 1302 may set a state of the NAS layer 601, 701, 801, 901, 1001, 1101, 1201, or 1301. Furthermore, 1506 may be performed by a NAS layer state managing component 2146.

At 1540, the UE may transmit the connection request to the network. For example, at 626, 628, 726, and 728, the one or more lower layers 603, 703, 803, 903, 1003, 1103, 1203, or 1303 of the UE 602, 702, 802, 902, 1002, 1102, 1202, or 1302 may transmit the connection request to the network 606, 706, 806, 906, 1006, 1106, 1206, or 1306. Furthermore, 1540 may be performed by the NAS message managing component 2144.

Figure 16:
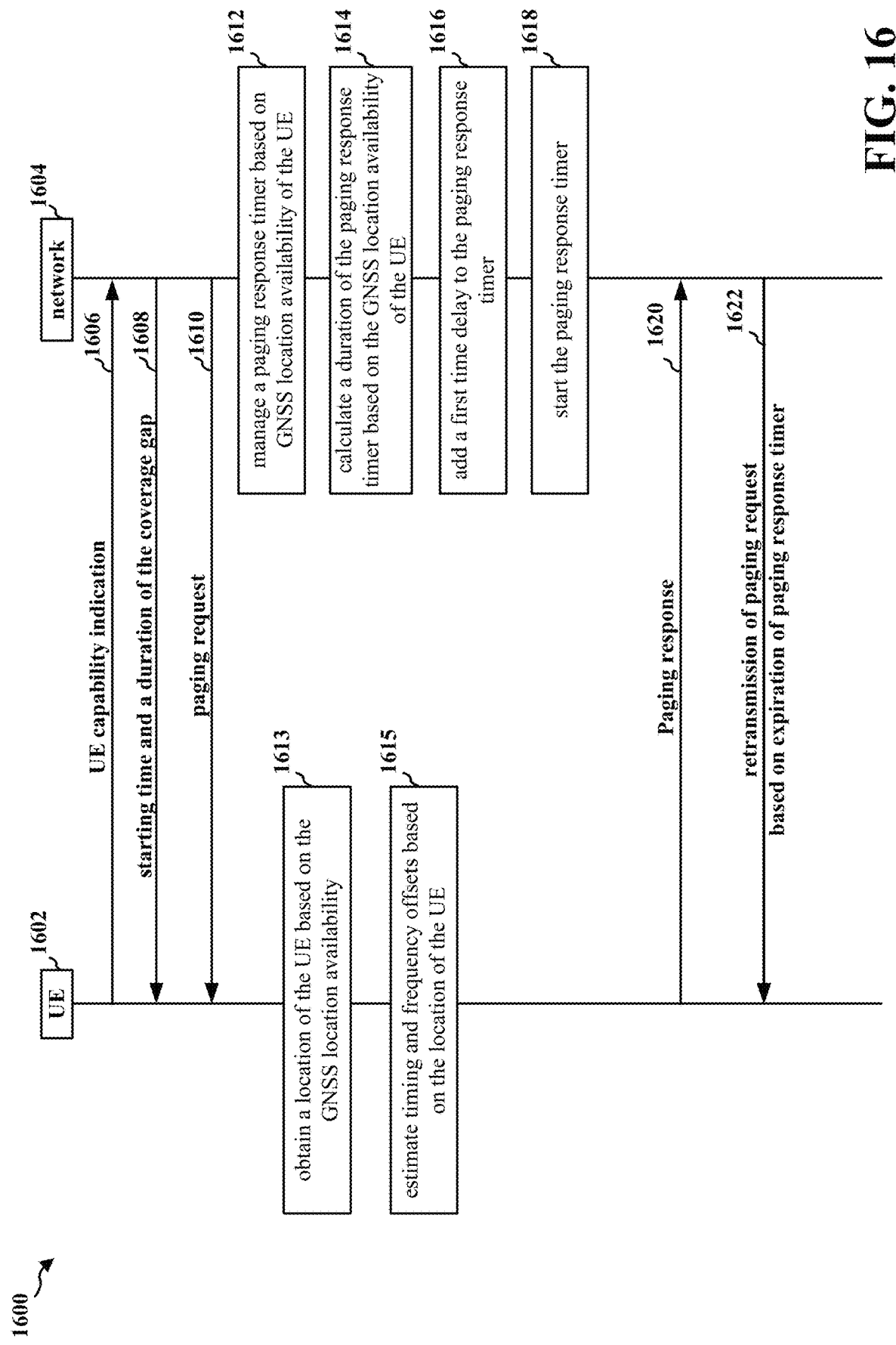
FIG. 16 is a call-flow diagram of wireless communication.

FIG. 16 is a call-flow diagram 1600 of a method of wireless communication. The call-flow diagram 1600 may include a UE 1602 and a network 1604. The call-flow diagram 1600 may illustrate the network 1604 procedure of transmitting a paging request to the UE 1602 based on the GNSS fix procedure from the perspective of the network 1604. For example, the UE 1602 may include the IoT NTN device, and acquire the GNSS location to perform the time/frequency pre-compensation.

At 1606, the network 1604 may receive a UE capability indication from the UE 1602 that indicates the GNSS location availability of the UE 1602. The UE 1602 may transmit the UE capability indication to a network that indicates the GNSS location availability of the UE 1602. The GNSS location availability of the UE 1602 may indicate whether the UE 1602 is specified with a time delay greater than a threshold value to obtain the location of the UE using the GNSS. For example, the threshold value may be one (1) second. The UE capability indication may include a duration of a time delay for the UE 1602 to perform a time-frequency pre-compensation before initiating connection with the network 1604. The UE capability indication may also indicate the length of the delay to perform the time/frequency pre-compensation before initiating the connection with the network 1604.

At 1608, the network 1604 may transmit a starting time and a duration of the coverage gap to the UE 1602. The UE 1602 may receive the starting time and the duration of the coverage gap from the base station 1604. That is, the network 1604 may transmit the starting time and the duration of the coverage gap to the UE 1602, and the network 1604 and the UE 1602 may be aware of the coverage gap schedules.

At 1610, the network 1604 may transmit a paging request to the UE 1602. The UE 1602 may receive the paging request from the network 1604. Upon transmitting the paging request to the UE 1602, the network 1604 may start a paging response timer. The UE 1602 may receive the paging request from the network 1604. The paging response timer may run until the network 1604 receives a paging response from the UE 1602, and the network 1604 may determine that the transmission of the paging request has failed in response to the expiration of the paging response timer.

At 1612, the network 1604 may manage the paging response timer based on a GNSS location availability of the UE 1602, the paging response timer controlling a retransmission of the paging request based on a paging response not being received from the UE 1702. The GNSS location availability may indicate a time delay for the UE 1602 to perform a time-frequency pre-compensation before initiating connection with the network 1604.

In one aspect, the GNSS location availability of the UE 1602 may be received in the UE capability indication received from the UE 1602 at 1606. That is, UE capability indication may indicate whether the UE 1602 uses a delay to perform the time/frequency pre-compensation before initiating a connection with the network 1604. The UE capability indication may also indicate the length of the delay to perform the time/frequency pre-compensation before initiating the connection with the network 1604. The network 1604 may manage the paging response timer by increasing the paging response timer based on the time delay of the UE 1602 to obtain the location of the UE 1602 being greater than the threshold value. The network 1604 may manage the paging response timer by not increasing the paging response timer based on the time delay of the UE 1602 to obtain the location of the UE 1602 being less than the threshold value.

In another aspect, the GNSS location availability of the UE 1602 may be received as a UE 1602 communication parameter from an HSS of the network 1604. That is, the HSS of the network 1604 may keep a database of the UE communication parameters, and the UE communication parameters may include the indication of the GNSS location availability of the UE 1602. The network 1604 may refer to the database in the HSS to determine the GNSS location availability in the UE 1602. The UE 1602 communication parameter may include a stationary indication of the UE 1602 indicating GNSS location availability at the UE 1602, where no delay is added to the paging response timer based on the stationary indication. That is, the UE communication parameters may include a stationary indication, which, if set, indicates that the UE 1602 is a stationary UE 1602 that uses the delay. The UE 1602 communication parameter may also indicate a non-stationary status of the UE 1602, where management of the paging response timer includes an addition of a delay to the paging response timer based on the non-stationary status. The network 1604 may manage the paging response timer by increasing the paging response timer based on the stationary indication. The UE 1602 communication parameter may indicate a duration of the delay for the UE 1602.

At 1614, the network 1604 may calculate a duration of the paging response timer based on the GNSS location availability of the UE 1602. The paging response timer may run in response to transmitting the paging request to the UE 1602, and the network 1604 may declare that the transmission of the paging request failed in response to the expiration of the paging response timer. The network 1604 may calculate the paging response timer to compensate for the additional time delay at the UE 1602 from the GNSS location acquisition. For example, the paging response timer may be configured to 16 seconds, but the one or more lower layers of the UE 1602 may take another 16 seconds to acquire the GNSS fix before sending the paging response to the network 1604. The network 1604 may not be aware of this, and may declare that the paging request failed upon expiration of the paging response timer.

At 1616, the network 1604 may add a first time delay to the paging response timer, the first time delay corresponding to an additional delay for the UE 1602 to perform a time-frequency pre-compensation before initiating connection with the network 1604. That is, the network 1604 may increase the paging response timer by the additional delay for the UE 1602, and the network 1604 may avoid the paging response timer from expiring due to the additional time delay at the UE 1602 from the GNSS location acquisition.

At 1618, the network 1604 may start the paging response timer based on a coverage gap in time during which the UE 1602 is not covered by a cell of the network 1604, the cell including an NTN cell or a TN cell. The NTN providing the NTN cell may include a satellite network 1604 In one aspect, the paging response timer may be started based on a time duration until a next coverage gap being greater than or equal to an additional delay for the UE 1602 to perform a time-frequency pre-compensation before initiating connection with the network 1604.

The network 1604 may further determine whether to start the paging response based on the determination of the time until the next coverage gap at the UE 1602 location. If the time to the next coverage gap is less than the value of the page response timer, the network 1604 does not start the page response timer. That is, if the network 1604 determines that the page response is expected during the next coverage gap, the network 1604 may not start the page response timer.

At 1613, the UE 1602 may obtain the location of the UE 1602 based on the GNSS location availability. The time delay to obtain the location of the UE 1602 using the GNSS may be specified to be greater than or equal to a threshold value. In one aspect, the UE 1602 may be specified with the time delay greater than or equal to the threshold value to obtain the location of the UE 1602 using the GNSS. Accordingly, the time delay specified for the UE 1602 to obtain the location of the UE 1602 before transmitting the paging response may affect the network 1604 in determining whether the paging request was successfully transmitted to the UE 1602.

At 1615, the UE may estimate timing and frequency offsets based on the location of the UE 1602. The timing and frequency offsets may be estimated based on the location of the UE 1602. The UE 1602 may transmit the paging response based on the timing and frequency offsets estimated based on the location of the UE 1602.

At 1620, the network 1604 may receive a paging response from the UE 1602 prior to an expiration of the paging response timer. The UE 1602 may transmit the paging response to the network 1604, the transmitting based on the location of the UE 1602. The paging response may be transmitted after an extended period following receipt of the paging request at 1610, the extended period being based on the UE capability indication transmitted to the network 1604 at 1606, the extended period being used by the UE 1602 to obtain the location of the UE 1602. The paging response may include the NAS layer message from the UE 1602 that may initiate the connection establishment procedure (e.g., the SERVICE REQUEST message) in paging response transmitted by the network 1604 at 1610.

At 1622, the network 1604 may retransmit the paging request based on expiration of the paging response timer. That is, the paging timer expires before receiving the paging response from the UE 1602, and upon expiration of the paging response timer, the network 1604 may retransmit the paging request to the UE 1602.

Figure 17:
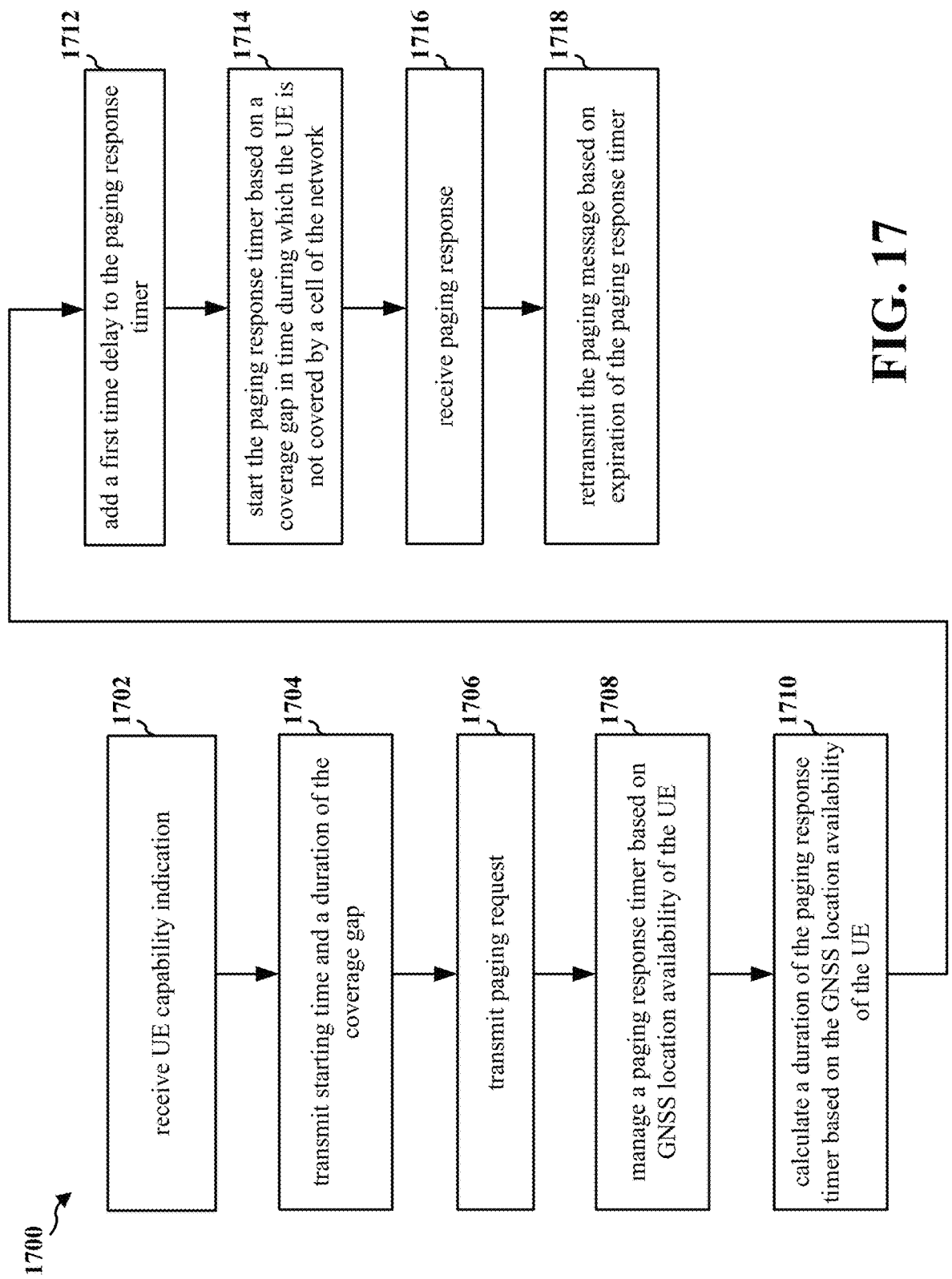
FIG. 17 is a flowchart of wireless communication.

FIG. 17 is a flowchart 1700 of a method of wireless communication. The method may be performed by a network (e.g., the network 606/1704; the apparatus 2202). The network may transmit a paging request to a UE based on the GNSS fix procedure from the perspective of the network. For example, the UE may include the IoT NTN device, and acquire the GNSS location to perform the time/frequency pre-compensation.

At 1702, the network may receive a UE capability indication from the UE that indicates the GNSS location availability of the UE. The UE may transmit the UE capability indication to a network that indicates the GNSS location availability of the UE. The GNSS location availability of the UE may indicate whether the UE is specified with a time delay greater than a threshold value to obtain the location of the UE using the GNSS. For example, the threshold value may be one (1) second. The UE capability indication may include a duration of a time delay for the UE to perform a time-frequency pre-compensation before initiating connection with the network. The UE capability indication may also indicate the length of the delay to perform the time/frequency pre-compensation before initiating the connection with the network. For example, at 1606, the network 1604 may receive a UE capability indication from the UE 1602 that indicates the GNSS location availability of the UE 1602. Furthermore, 1702 may be performed by a UE capability indication component 2240.

At 1704, the network may transmit a starting time and a duration of the coverage gap to the UE. The UE may receive the starting time and the duration of the coverage gap from the base station. That is, the network may transmit the starting time and the duration of the coverage gap to the UE, and the network and the UE may be aware of the coverage gap schedules. For example, at 1608, the network 1604 may transmit a starting time and a duration of the coverage gap to the UE 1602. Furthermore, 1704 may be performed by a coverage gap component 2242.

At 1706, the network may transmit a paging request to the UE. Upon transmitting the paging request to the UE, the network may start a paging response timer. The UE may receive the paging request from the network. The paging response timer may run until the network receives a paging response from the UE, and the network may determine that the transmission of the paging request has failed in response to the expiration of the paging response timer. For example, at 1610, the network 1604 may transmit a paging request to the UE 1602. Furthermore, 1706 may be performed by a paging component 2244.

At 1708, the network may manage the paging response timer based on a GNSS location availability of the UE, the paging response timer controlling a retransmission of the paging request based on a paging response not being received from the UE. The GNSS location availability may indicate a time delay for the UE to perform a time-frequency pre-compensation before initiating connection with the network 1604. In one aspect, the GNSS location availability of the UE may be received in the UE capability indication received from the UE at 1702. That is, UE capability indication may indicate whether the UE uses a delay to perform the time/frequency pre-compensation before initiating a connection with the network. The UE capability indication may also indicate the length of the delay to perform the time/frequency pre-compensation before initiating the connection with the network. The network may manage the paging response timer by increasing the paging response timer based on the time delay of the UE to obtain the location of the UE being greater than the threshold value. The network may manage the paging response timer by not increasing the paging response timer based on the time delay of the UE to obtain the location of the UE being less than the threshold value. In another aspect, the GNSS location availability of the UE may be received as a UE communication parameter from an HSS of the network. That is, the HSS of the network may keep a database of the UE communication parameters, and the UE communication parameters may include the indication of the GNSS location availability of the UE. The network may refer to the database in the HSS to determine the GNSS location availability in the UE. The UE communication parameter may include a stationary indication of the UE indicating GNSS location availability at the UE, where no delay is added to the paging response timer based on the stationary indication. That is, the UE communication parameters may include a stationary indication, which, if set, indicates that the UE is a stationary UE with the delay. The UE communication parameter may also indicate a non-stationary status of the UE, where management of the paging response timer includes an addition of a delay to the paging response timer based on the non-stationary status. The network may manage the paging response timer by increasing the paging response timer based on the stationary indication. The UE communication parameter may indicate a duration of the delay for the UE. For example, at 1612, the network 1604 may manage the paging response timer based on a GNSS location availability of the UE 1602, the paging response timer controlling a retransmission of the paging request based on a paging response not being received from the UE 1702. Furthermore, 1708 may be performed by a paging response timer managing component 2246.

At 1710, the network may calculate a duration of the paging response timer based on the GNSS location availability of the UE. The paging response timer may run in response to transmitting the paging request to the UE, and the network may declare that the transmission of the paging request failed in response to the expiration of the paging response timer. The network may calculate the paging response timer to compensate for the additional time delay at the UE from the GNSS location acquisition. For example, the paging response timer may be configured to 16 seconds, but the one or more lower layers of the UE may take another 16 seconds to acquire the GNSS fix before sending the paging response to the network. The network may not be aware of this, and may declare that the paging request failed upon expiration of the paging response timer. For example, at 1614, the network 1604 may calculate a duration of the paging response timer based on the GNSS location availability of the UE 1602. Furthermore, 1710 may be performed by the paging response timer managing component 2246.

At 1712, the network may add a first time delay to the paging response timer, the first time delay corresponding to an additional delay for the UE to perform a time-frequency pre-compensation before initiating connection with the network. That is, the network 1604 may increase the paging response timer by the additional delay for the UE 1602, and the network 1604 may avoid the paging response timer from expiring due to the additional time delay at the UE 1602 from the GNSS location acquisition. For example, at 1616, the network 1604 may add a first time delay to the paging response timer, the first time delay corresponding to an additional delay for the UE 1602 to perform a time-frequency pre-compensation before initiating connection with the network 1604. Furthermore, 1712 may be performed by the paging response timer managing component 2246.

At 1714, the network may start the paging response timer based on a coverage gap in time during which the UE is not covered by a cell of the network, the cell including an NTN cell or a TN cell. The NTN providing the NTN cell may include a satellite network. In one aspect, the paging response timer may be started based on a time duration until a next coverage gap being greater than or equal to an additional delay for the UE to perform a time-frequency pre-compensation before initiating connection with the network. The network may further determine whether to start the paging response based on the determination of the time until the next coverage gap at the UE location. If the time to the next coverage gap is less than the value of the page response timer, the network does not start the page response timer. That is, if the network determines that the page response is expected during the next coverage gap, the network may not start the page response timer. For example, at 1618, the network 1604 may start the paging response timer based on a coverage gap in time during which the UE 1602 is not covered by a cell of the network 1604, the cell including an NTN cell or a TN cell. Furthermore, 1714 may be performed by the paging response timer managing component 2246.

At 1716, the network may receive a paging response from the UE prior to an expiration of the paging response timer. The UE may transmit the paging response to the network, the transmitting based on the location of the UE. The paging response may be transmitted after an extended period following receipt of the paging request at 1706, the extended period being based on the UE capability indication transmitted to the network at 1702, the extended period being used by the UE to obtain the location of the UE. The paging response may include the NAS layer message from the UE that may initiate the connection establishment procedure (e.g., the SERVICE REQUEST message) in paging response transmitted by the network at 1706. For example, at 1620, the network 1604 may receive a paging response from the UE 1602. Furthermore, 1716 may be performed by the paging component 2244.

At 1718, the network may retransmit the paging request based on expiration of the paging response timer. That is, the paging timer expires before receiving the paging response from the UE, and upon expiration of the paging response timer, the network may retransmit the paging request to the UE. For example, at 1622, the network 1604 may retransmit the paging request based on expiration of the paging response timer. Furthermore, 1718 may be performed by the paging component 2244.

Figure 18:
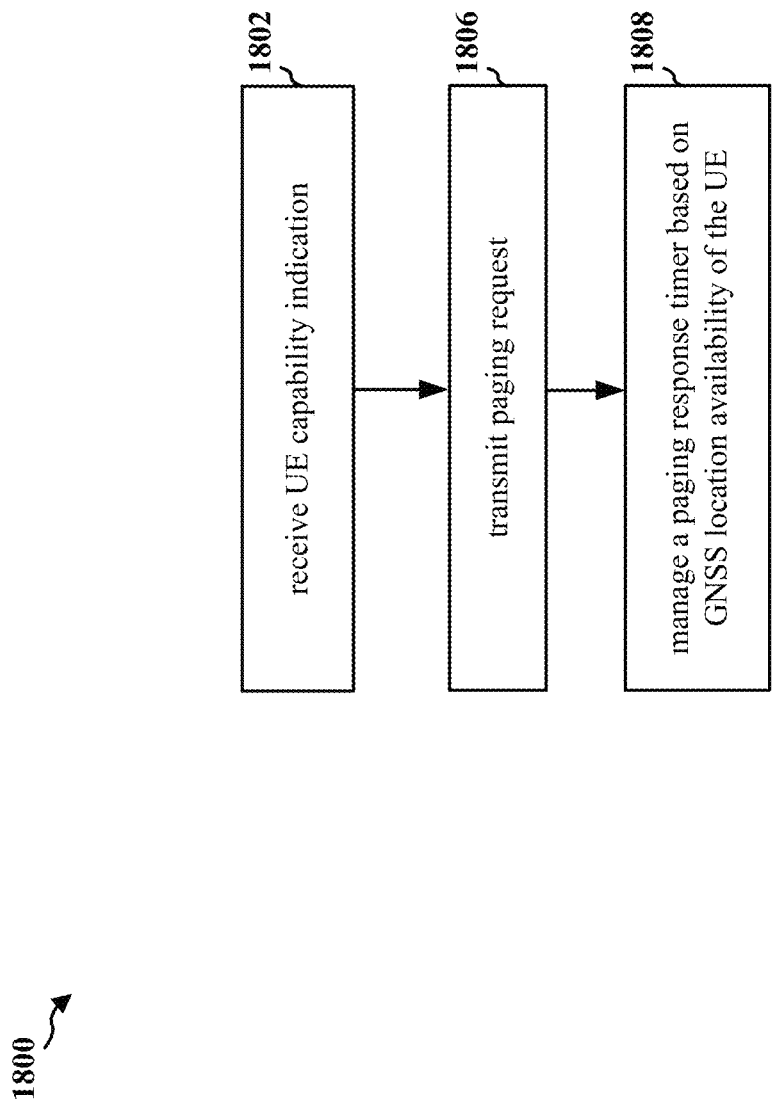
FIG. 18 is a flowchart of wireless communication.

FIG. 18 is a flowchart 1800 of a method of wireless communication. The method may be performed by a network (e.g., the network 606/1704; the apparatus 2202). The network may transmit a paging request to a UE based on the GNSS fix procedure from the perspective of the network. For example, the UE may include the IoT NTN device, and acquire the GNSS location to perform the time/frequency pre-compensation.

At 1802, the network may receive a UE capability indication from the UE that indicates the GNSS location availability of the UE. The UE may transmit the UE capability indication to a network that indicates the GNSS location availability of the UE. The GNSS location availability of the UE may indicate whether the UE is specified with a time delay greater than a threshold value to obtain the location of the UE using the GNSS. For example, the threshold value may be one (1) second. The UE capability indication may include a duration of a time delay for the UE to perform a time-frequency pre-compensation before initiating connection with the network. The UE capability indication may also indicate the length of the delay to perform the time/frequency pre-compensation before initiating the connection with the network. For example, at 1606, the network 1604 may receive a UE capability indication from the UE 1602 that indicates the GNSS location availability of the UE 1602. Furthermore, 1802 may be performed by a UE capability indication component 2240.

At 1806, the network may transmit a paging request to the UE. Upon transmitting the paging request to the UE, the network may start a paging response timer. The UE may receive the paging request from the network. The paging response timer may run until the network receives a paging response from the UE, and the network may determine that the transmission of the paging request has failed in response to the expiration of the paging response timer. For example, at 1610, the network 1604 may transmit a paging request to the UE 1602. Furthermore, 1806 may be performed by a paging component 2244.

At 1808, the network may manage the paging response timer based on a GNSS location availability of the UE, the paging response timer controlling a retransmission of the paging request based on a paging response not being received from the UE. The GNSS location availability may indicate a time delay for the UE to perform a time-frequency pre-compensation before initiating connection with the network 1604. In one aspect, the GNSS location availability of the UE may be received in the UE capability indication received from the UE at 1802. That is, UE capability indication may indicate whether the UE uses a delay to perform the time/frequency pre-compensation before initiating a connection with the network. The UE capability indication may also indicate the length of the delay to perform the time/frequency pre-compensation before initiating the connection with the network. The network may manage the paging response timer by increasing the paging response timer based on the time delay of the UE to obtain the location of the UE being greater than the threshold value. The network may manage the paging response timer by not increasing the paging response timer based on the time delay of the UE to obtain the location of the UE being less than the threshold value. In another aspect, the GNSS location availability of the UE may be received as a UE communication parameter from an HSS of the network. That is, the HSS of the network may keep a database of the UE communication parameters, and the UE communication parameters may include the indication of the GNSS location availability of the UE. The network may refer to the database in the HSS to determine the GNSS location availability in the UE. The UE communication parameter may include a stationary indication of the UE indicating GNSS location availability at the UE, where no delay is added to the paging response timer based on the stationary indication. That is, the UE communication parameters may include a stationary indication, which, if set, indicates that the UE is a stationary UE with the delay. The UE communication parameter may also indicate a non-stationary status of the UE, where management of the paging response timer includes an addition of a delay to the paging response timer based on the non-stationary status. The network may manage the paging response timer by increasing the paging response timer based on the stationary indication. The UE communication parameter may indicate a duration of the delay for the UE. For example, at 1612, the network 1604 may manage the paging response timer based on a GNSS location availability of the UE 1602, the paging response timer controlling a retransmission of the paging request based on a paging response not being received from the UE 1702. Furthermore, 1808 may be performed by a paging response timer managing component 2246.

Figure 19:
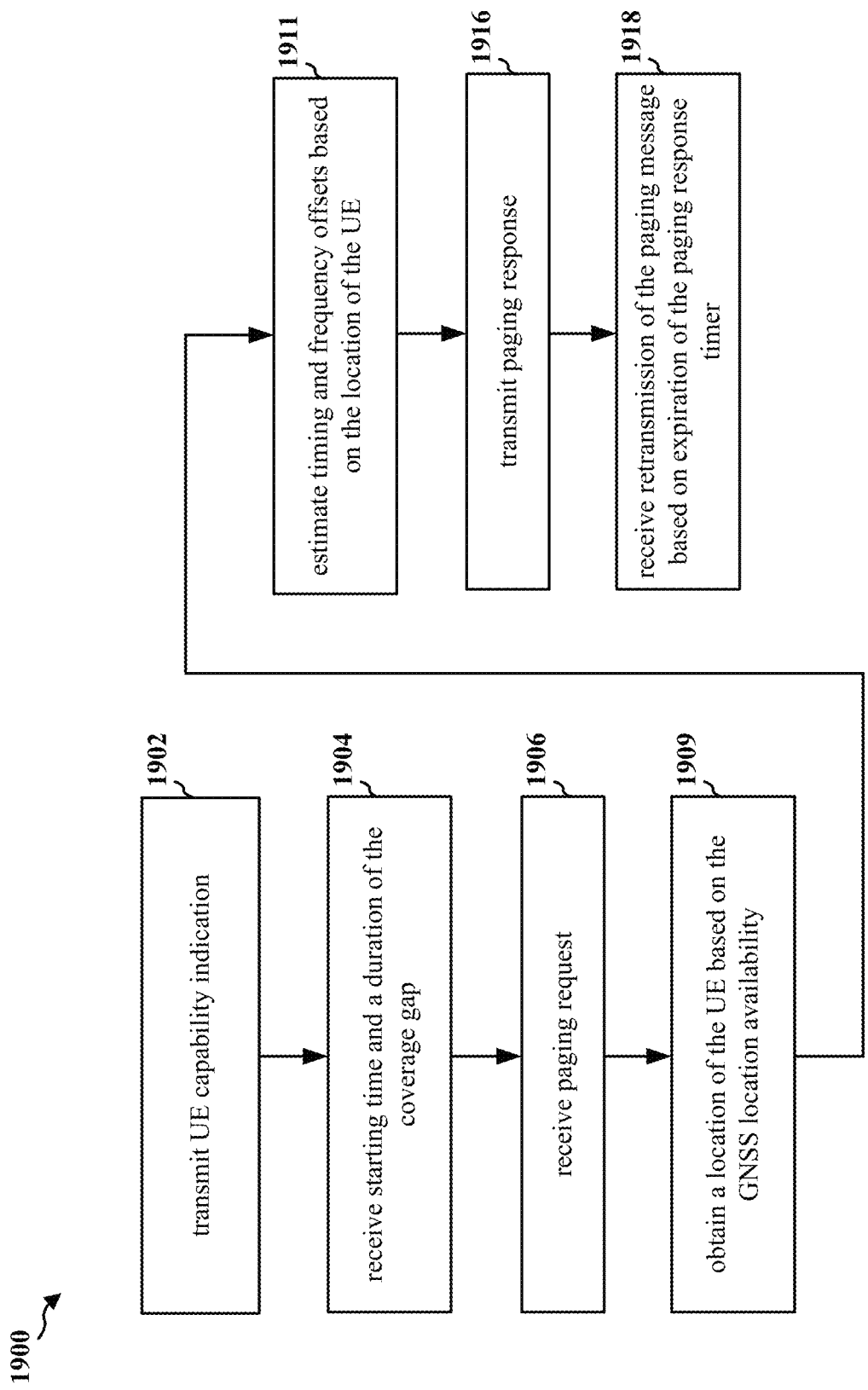
FIG. 19 is a flowchart of wireless communication.

FIG. 19 is a flowchart 1900 of a method of wireless communication. The method may be performed by a UE (e.g., the UE 104/602, 702, 802, 902, 1002, 1102, 1202, 1302, or 1602; the apparatus 2102). The UE may transmit the connection request procedure based on the GNSS fix procedure from the perspective of the UE. For example, the UE may include the IoT NTN device, and acquire the GNSS location to perform the time/frequency pre-compensation.

At 1902, the UE may transmit the UE capability indication to a network that indicates the GNSS location availability of the UE. The GNSS location availability of the UE 1602 may indicate whether the UE 1602 is specified with a time delay greater than a threshold value to obtain the location of the UE using the GNSS. For example, the threshold value may be one (1) second. The UE capability indication may include a duration of a time delay for the UE 1602 to perform a time-frequency pre-compensation before initiating connection with the network 1604. The UE capability indication may also indicate the length of the delay to perform the time/frequency pre-compensation before initiating the connection with the network 1604. For example, at 1606, the UE 1602 may transmit the UE capability indication to a network that indicates the GNSS location availability of the UE 1602. Furthermore, 1902 may be performed by a UE capability indication component 2150.

At 1904, the UE may receive the starting time and the duration of the coverage gap from the base station. That is, the network 1604 may transmit the starting time and the duration of the coverage gap to the UE 1602, and the network 1604 and the UE 1602 may be aware of the coverage gap schedules. For example, at 1608, the UE 1602 may receive the starting time and the duration of the coverage gap from the base station 1604. Furthermore, 1904 may be performed by a cell coverage component 2140.

At 1906, the UE may receive the paging request from the network. Upon transmitting the paging request to the UE 1602, the network 1604 may start a paging response timer. The UE 1602 may receive the paging request from the network 1604. The paging response timer may run until the network 1604 receives a paging response from the UE 1602, and the network 1604 may determine that the transmission of the paging request has failed in response to the expiration of the paging response timer. For example, at 1610, the UE 1602 may receive the paging request from the network 1604. Furthermore, 1906 may be performed by a NAS message managing component 2144.

At 1909, the UE may obtain the location of the UE based on the GNSS location availability. The time delay to obtain the location of the UE using the GNSS may be specified to be greater than or equal to a threshold value. In one aspect, the UE may be specified with the time delay greater than or equal to the threshold value to obtain the location of the UE using the GNSS. Accordingly, the time delay specified for the UE to obtain the location of the UE before transmitting the paging response may affect the network in determining whether the paging request was successfully transmitted to the UE. For example, at 1613, the UE 1602 may obtain the location of the UE 1602 based on the GNSS location availability. Furthermore, 1909 may be performed by a location acquisition component 2142.

At 1911, the UE may estimate timing and frequency offsets based on the location of the UE. The timing and frequency offsets may be estimated based on the location of the UE. The UE may transmit the paging response based on the timing and frequency offsets estimated based on the location of the UE. For example, at 1615, the UE 1602 may estimate timing and frequency offsets based on the location of the UE 1602. Furthermore, 1911 may be performed by the location acquisition component 2142.

At 1916, the UE may transmit the paging response to the network, the transmitting based on the location of the UE. The paging response may be transmitted after an extended period following receipt of the paging request at 1906, the extended period being based on the UE capability indication transmitted to the network at 1902, the extended period being used by the UE to obtain the location of the UE. The paging response may include the NAS layer message from the UE that may initiate the connection establishment procedure (e.g., the SERVICE REQUEST message) in paging response transmitted by the network 1604 at 1610. For example, at 1620, the UE 1602 may transmit the paging response to the network 1604, the transmitting based on the location of the UE 1602. Furthermore, 1916 may be performed by the NAS message managing component 2144.

At 1918, the UE may receive a retransmission of the paging request based on expiration of the paging response timer. That is, the paging timer expires before receiving the paging response from the UE, and upon expiration of the paging response timer, the network may retransmit the paging request to the UE. For example, at 1622, the UE 1602 may retransmit the paging request based on expiration of the paging response timer. Furthermore, 1918 may be performed by the NAS message managing component 2144.

Figure 20:
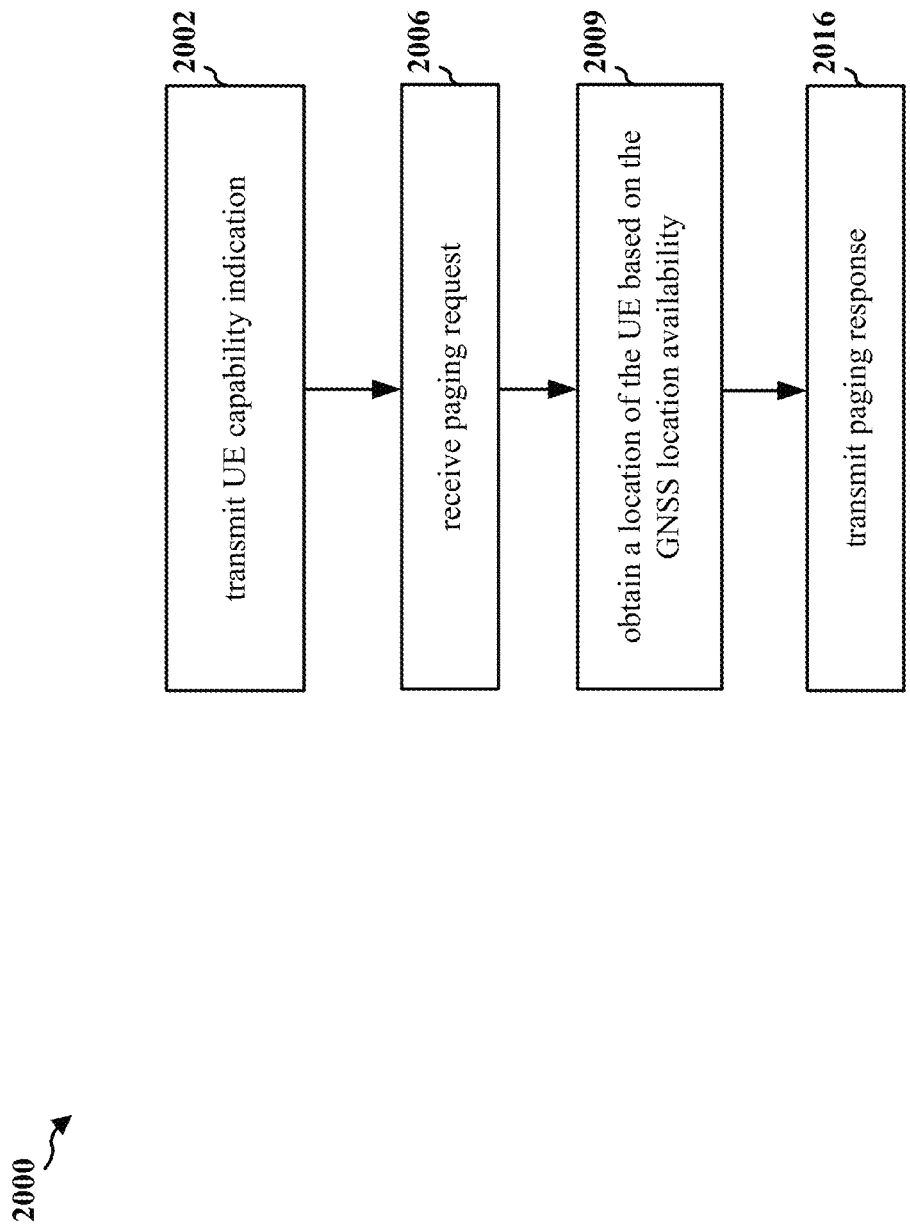
FIG. 20 is a flowchart of wireless communication.

FIG. 20 is a flowchart 2000 of a method of wireless communication. The method may be performed by a UE (e.g., the UE 104/602, 702, 802, 902, 1002, 1102, 1202, 1302, or 1602; the apparatus 2102). The UE may transmit the connection request procedure based on the GNSS fix procedure from the perspective of the UE. For example, the UE may include the IoT NTN device, and acquire the GNSS location to perform the time/frequency pre-compensation.

At 2002, the UE may transmit the UE capability indication to a network that indicates the GNSS location availability of the UE. The GNSS location availability of the UE 1602 may indicate whether the UE 1602 is specified with a time delay greater than a threshold value to obtain the location of the UE using the GNSS. For example, the threshold value may be one (1) second. The UE capability indication may include a duration of a time delay for the UE 1602 to perform a time-frequency pre-compensation before initiating connection with the network 1604. The UE capability indication may also indicate the length of the delay to perform the time/frequency pre-compensation before initiating the connection with the network 1604. For example, at 1606, the UE 1602 may transmit the UE capability indication to a network that indicates the GNSS location availability of the UE 1602. Furthermore, 2002 may be performed by a UE capability indication component 2150.

At 2006, the UE may receive the paging request from the network. Upon transmitting the paging request to the UE 1602, the network 1604 may start a paging response timer. The UE 1602 may receive the paging request from the network 1604. The paging response timer may run until the network 1604 receives a paging response from the UE 1602, and the network 1604 may determine that the transmission of the paging request has failed in response to the expiration of the paging response timer. For example, at 1610, the UE 1602 may receive the paging request from the network 1604. Furthermore, 2006 may be performed by a NAS message managing component 2144.

At 2009, the UE may obtain the location of the UE based on the GNSS location availability. The time delay to obtain the location of the UE using the GNSS may be specified to be greater than or equal to a threshold value. In one aspect, the UE may be specified with the time delay greater than or equal to the threshold value to obtain the location of the UE using the GNSS. Accordingly, the time delay specified for the UE to obtain the location of the UE before transmitting the paging response may affect the network in determining whether the paging request was successfully transmitted to the UE. For example, at 1613, the UE 1602 may obtain the location of the UE 1602 based on the GNSS location availability. Furthermore, 2009 may be performed by a location acquisition component 2142.

At 2016, the UE may transmit the paging response to the network, the transmitting based on the location of the UE. The paging response may be transmitted after an extended period following receipt of the paging request at 2006, the extended period being based on the UE capability indication transmitted to the network at 2002, the extended period being used by the UE to obtain the location of the UE. The paging response may include the NAS layer message from the UE that may initiate the connection establishment procedure (e.g., the SERVICE REQUEST message) in paging response transmitted by the network 1604 at 1610. For example, at 1620, the UE 1602 may transmit the paging response to the network 1604, the transmitting based on the location of the UE 1602. Furthermore, 2016 may be performed by the NAS message managing component 2144.

Figure 21:
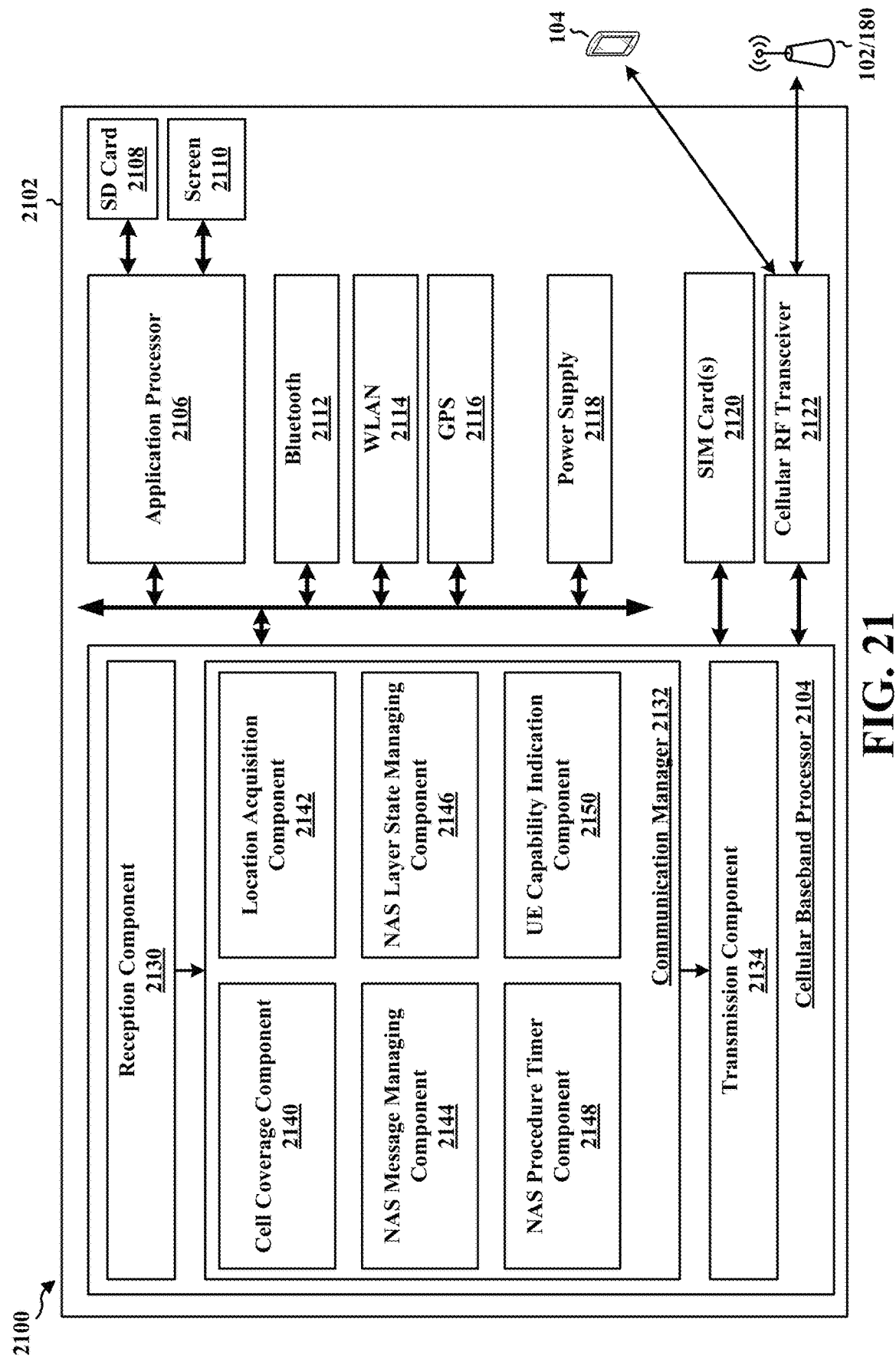
FIG. 21 is a diagram illustrating an example of a hardware implementation for an example apparatus.

FIG. 21 is a diagram 2100 illustrating an example of a hardware implementation for an apparatus 2102. The apparatus 2102 may be a UE, a component of a UE, or may implement UE functionality. In some aspects, the apparatus 2102 may include a cellular baseband processor 2104 (also referred to as a modem) coupled to a cellular RF transceiver 2122. In some aspects, the apparatus 2102 may further include one or more subscriber identity modules (SIM) cards 2120, an application processor 2106 coupled to a secure digital (SD) card 2108 and a screen 2110, a Bluetooth module 2112, a wireless local area network (WLAN) module 2114, a Global Positioning System (GPS) module 2116, or a power supply 2118. The cellular baseband processor 2104 communicates through the cellular RF transceiver 2122 with the UE 104 and/or BS 212/180. The cellular baseband processor 2104 may include a computer-readable medium/memory. The computer-readable medium/memory may be non-transitory. The cellular baseband processor 2104 is responsible for general processing, including the execution of software stored on the computer-readable medium/memory. The software, when executed by the cellular baseband processor 2104, causes the cellular baseband processor 2104 to perform the various functions described supra. The computer-readable medium/memory may also be used for storing data that is manipulated by the cellular baseband processor 2104 when executing software. The cellular baseband processor 2104 further includes a reception component 2130, a communication manager 2132, and a transmission component 2134. The communication manager 2132 includes the one or more illustrated components. The components within the communication manager 2132 may be stored in the computer-readable medium/memory and/or configured as hardware within the cellular baseband processor 2104. The cellular baseband processor 2104 may be a component of the UE 350 and may include the memory 360 and/or at least one of the TX processor 368, the RX processor 356, and the controller/processor 359. In one configuration, the apparatus 2102 may be a modem chip and include just the baseband processor 2104, and in another configuration, the apparatus 2102 may be the entire UE (e.g., see 350 of FIG. 3) and include the additional modules of the apparatus 2102.

The communication manager 2132 includes a cell coverage component 2140 that is configured to receive a starting time and a duration of the coverage gap from the network, e.g., as described in connection with 1452 and 1904. The communication manager 2132 further includes a location acquisition component 2142 that is configured to determine a location acquisition status associated with a GNSS location of the UE, acquire GNSS fix with the network, obtain the location of the UE based on the GNSS location availability, and estimate timing and frequency offsets based on the location of the UE, e.g., as described in connection with 1404, 1414, 1432, 1504, 1909, 1911, and 2009. The communication manager 2132 further includes a NAS message managing component 2144 that is configured to delay initiation of the transmission of the NAS message at the NAS layer until the state of the NAS layer is changed to the second NAS state, indicate to an application layer of the UE that the NAS message at the NAS layer is not transmitted due to the location acquisition status, initiate the transmission of the NAS message for a NAS procedure based on the state of the NAS layer being the second NAS state, transmit the NAS message to the network, receive, from the network, a response to the NAS message transmitted to the network, omit or delay transmission of the NAS message during a coverage gap in time during which the UE is not covered by a cell of the network, and receive the paging request or the retransmission of the paging request from the network, e.g., as described in connection with 1410, 1412, 1418, 1422, 1428, 1440, 1454, 1456, 1540, 1906, 1916, 2006, and 2016. The communication manager 2132 includes a NAS layer state managing component 2146 that is configured to set a state of the NAS layer, and change the state of the NAS layer to the second NAS state of the NAS layer in response to receiving the indication from the lower layer that the GNSS location is available, e.g., as described in connection with 1406, 1416, 1434, 1506, 1902. The communication manager 2132 further includes a NAS procedure timer component 2148 that is configured to add the time delay to the NAS procedure timer based on the location acquisition status, the time delay being associated with a response to the connection request, and start the NAS procedure timer based on transmitting the connection request at the NAS layer, e.g., as described in connection with 1420, 1424, and 1430. The communication manager 2132 further includes a UE capability indication component 2150 that is configured to transmit the UE capability indication to a network that indicates the GNSS location availability of the UE, e.g., as described in connection with 1902 and 2002.

The apparatus may include additional components that perform each of the blocks of the algorithm in the flowcharts of FIGS. 6A, 6B, 7, 14A, and 14B. As such, each block in the flowcharts of FIGS. 6A, 6B, 7, 14A, and 14B may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

As shown, the apparatus 2102 may include a variety of components configured for various functions. In one configuration, the apparatus 2102, and in particular the cellular baseband processor 2104, includes means for transmitting a UE capability indication to a network that indicates a GNSS location availability of the UE, means for receiving a paging request from the network, means for obtaining a location of the UE based on the GNSS location availability, means for transmitting a paging response to the network, the transmitting based on the location of the UE, means for estimating timing and frequency offsets based on the location of the UE, and means for transmitting the paging response based on the timing and frequency offsets. The apparatus 2102 includes means for determining a location acquisition status associated with a GNSS location of the UE, means for initiating a connection request for NAS procedure based on the location acquisition status of the UE, and means for transmitting the connection request to a network. The apparatus 2102 includes means for setting a state of a NAS layer to a first state based on the location acquisition status indicating that the GNSS location is not available in a lower layer than the NAS layer, and means for delaying initiation of the connection request at the NAS layer until the state of the NAS layer is changed to a second state based on the location acquisition status indicating that the GNSS location is available at the lower layer. The apparatus 2102 includes means for changing the state of the NAS layer to the second state of the NAS layer in response to receiving an indication from the lower layer that the GNSS location is available, means for indicating to an application layer of the UE that the connection request at the NAS layer is not transmitted due to the location acquisition status, means for adding a time delay to a NAS procedure timer based on the location acquisition status, the time delay being associated with a response to the connection request, and means for starting the NAS procedure timer based on transmitting the connection request at a NAS layer, the NAS procedure timer corresponding to the location acquisition status of the UE. The apparatus 2102 includes means for omitting transmission of a registration request message during a coverage gap in time during which the UE is not covered by a cell of the network, the cell including a NTN cell or a TN cell, means for delaying transmission of the registration request message until the UE is within coverage of the cell of the network, and means for delaying the transmission by a time delay based on a duration of the coverage gap. The means may be one or more of the components of the apparatus 2102 configured to perform the functions recited by the means. As described supra, the apparatus 2102 may include the TX Processor 368, the RX Processor 356, and the controller/processor 359. As such, in one configuration, the means may be the TX Processor 368, the RX Processor 356, and the controller/processor 359 configured to perform the functions recited by the means.

Figure 22:
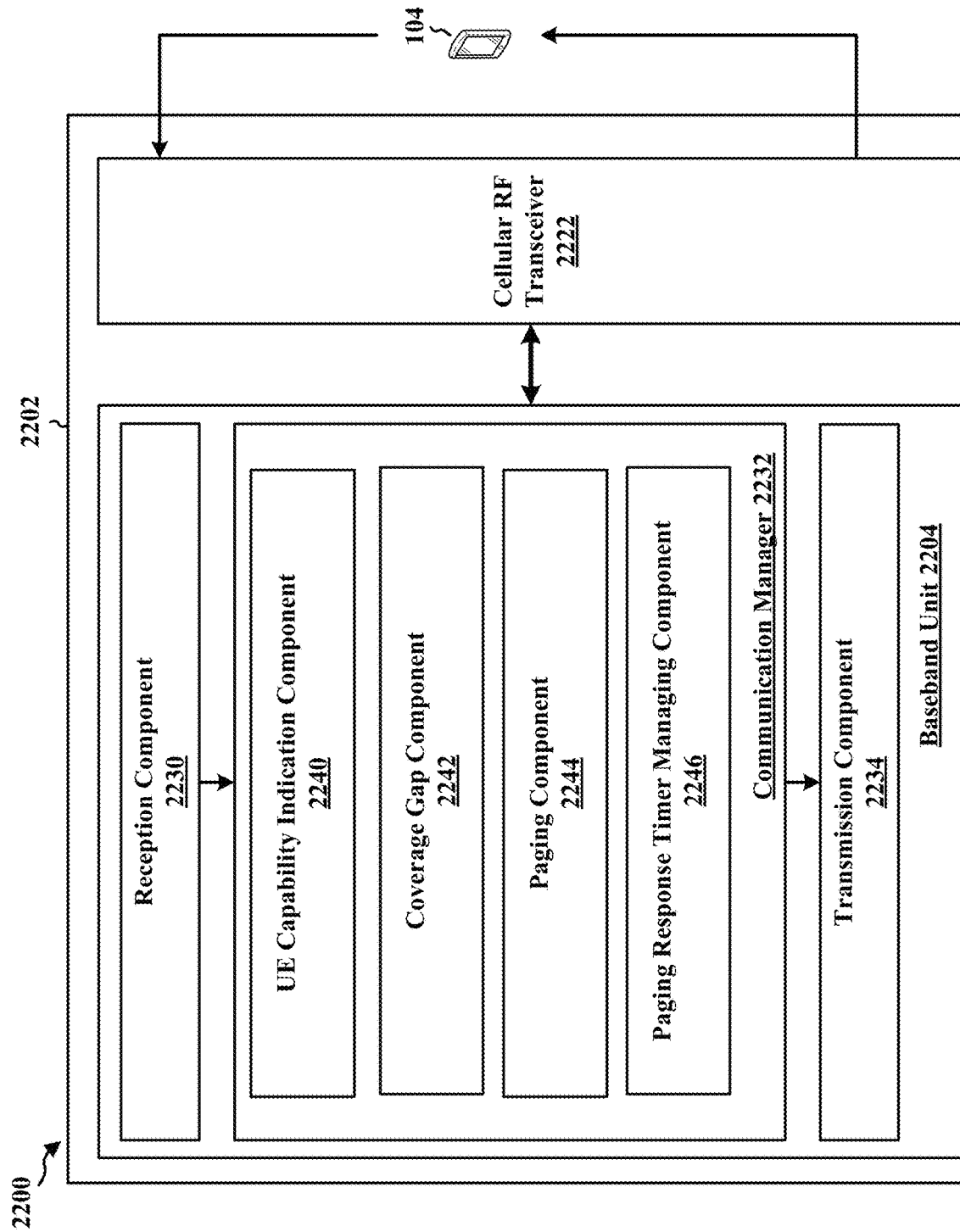
FIG. 22 is a diagram illustrating an example of a hardware implementation for an example apparatus.

FIG. 22 is a diagram 2200 illustrating an example of a hardware implementation for an apparatus 2202. The apparatus 2202 may be a base station, a component of a base station, or may implement base station functionality. In some aspects, the apparatus 2202 may include a baseband unit 2204. The baseband unit 2204 may communicate through a cellular RF transceiver 2222 with the UE 104. The baseband unit 2204 may include a computer-readable medium/memory. The baseband unit 2204 is responsible for general processing, including the execution of software stored on the computer-readable medium/memory. The software, when executed by the baseband unit 2204, causes the baseband unit 2204 to perform the various functions described supra. The computer-readable medium/memory may also be used for storing data that is manipulated by the baseband unit 2204 when executing software. The baseband unit 2204 further includes a reception component 2230, a communication manager 2232, and a transmission component 2234. The communication manager 2232 includes the one or more illustrated components. The components within the communication manager 2232 may be stored in the computer-readable medium/memory and/or configured as hardware within the baseband unit 2204. The baseband unit 2204 may be a component of the base station 310 and may include the memory 376 and/or at least one of the TX processor 316, the RX processor 370, and the controller/processor 375.

The communication manager 2232 includes a UE capability indication component 2240 that is configured to receive a UE capability indication from the UE that indicates the GNSS location availability of the UE. The UE capability indication may include a duration of a time delay for the UE to perform a time-frequency pre-compensation before initiating connection with the network, e.g., as described in connection with 1802. The communication manager 2232 further includes a coverage gap component 2242 that is configured to transmit a starting time and a duration of the coverage gap to the UE, e.g., as described in connection with 1804. The communication manager 2232 further includes a paging component 2244 that is configured to transmit a paging request to the UE, receive a paging response from the UE, and retransmit the paging request based on expiration of the paging response timer, e.g., as described in connection with 1806, 1816, 1818, and 1906. The communication manager 2232 further includes a paging response timer managing component 2246 that is configured to manage the paging response timer based on a GNSS location availability of the UE, the paging response timer controlling a retransmission of the paging request based on a paging response not being received from the UE, calculate a duration of the paging response timer based on the GNSS location availability of the UE, add a first time delay to the paging response timer, the first time delay corresponding to an additional delay for the UE to perform a time-frequency pre-compensation before initiating connection with the network, and start the paging response timer based on a coverage gap in time during which the UE is not covered by a cell of the network, the cell including an NTN cell or a TN cell, e.g., as described in connection with 1808, 1810, 1812, 1814, and 1908.

The apparatus may include additional components that perform each of the blocks of the algorithm in the flowcharts of FIGS. 16, 18, 19, and 22. As such, each block in the flowcharts of FIGS. 16, 18, 19, and 22 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

As shown, the apparatus 2202 may include a variety of components configured for various functions. In one configuration, the apparatus 2202, and in particular the baseband unit 2204, includes means for receiving a UE capability indication from a UE that indicates a GNSS location availability of the UE, means for transmitting a paging request to the UE, and means for managing a paging response timer based on the GNSS location availability of the UE, the paging response timer controlling a retransmission of the paging request based on whether a paging response is received from the UE. The apparatus 2202 includes means for retransmitting the paging request based on an expiration of the paging response timer. The apparatus 2202 includes means for receiving the paging response from the UE prior to an expiration of the paging response timer. The apparatus 2202 includes means for increasing the paging response timer based on the stationary indication, means for increasing the paging response timer based on the time delay of the UE to obtain the location of the UE being greater than the threshold value, means for not increasing the paging response timer based on the time delay of the UE to obtain the location of the UE being less than the threshold value, means for calculating a duration of the paging response timer based on the GNSS location availability of the UE, and means for adding a first time delay to the paging response timer, the first time delay corresponding to an additional delay specified for the UE to perform a time-frequency pre-compensation before initiating connection with the network. The apparatus 2202 includes means for starting the paging response timer based on a coverage gap in time during which the UE is not covered by a cell of the network, the cell including a NTN cell or a TN cell, and means for start the paging response timer based on a time duration until a next coverage gap being greater than or equal to an additional delay for the UE to perform a time-frequency pre-compensation before initiating connection with the network. The apparatus 2202 includes means for transmitting a starting time and a duration of the coverage gap to the UE. As described supra, the apparatus 2202 may include the TX Processor 316, the RX Processor 370, and the controller/processor 375. As such, in one configuration, the means may be the TX Processor 316, the RX Processor 370, and the controller/processor 375 configured to perform the functions recited by the means.

The apparatus may include a user equipment (UE) and a network. The UE may include internet of things (IoT) non-terrestrial network (NTN) (IoT NTN) device, and the UE may acquire a global navigation satellite system (GNSS) location to perform the time/frequency pre-compensation. A NAS layer of the UE may determine a location acquisition status associated with a GNSS location of the UE, and initiate a connection request procedure based on the GNSS fix procedure at one or more lower layer of the UE. The NAS layer may set a state of a NAS layer to a first state based on the location acquisition status indicating that the GNSS location is not available in a lower layer than the NAS layer, and change the state of the NAS layer to the second state of the NAS layer in response to receiving an indication from the lower layer that the GNSS location is available. The NAS layer may delay initiation of the connection request at the NAS layer under the first state of the NAS layer and transmit the connection request under the second state of the NAS layer. The NAS layer may add a time delay to a NAS procedure timer based on the location acquisition status, and start the NAS procedure timer based on transmitting the connection request at the NAS layer. The NAS layer may omit or delay the transmission of the registration request message during the coverage gap.

The network may transmit a paging request to the UE, and manage a paging response timer based on the GNSS fix procedure at the UE. The paging response timer may be controlling a retransmission of the paging request based on a paging response not being received from the UE. The network may receive a UE capability indication from the UE, and the UE capability indication may include a duration of a time delay for the UE to perform a time-frequency pre-compensation before initiating connection with the network. The GNSS location availability of the UE may be received as a UE communication parameter from a home subscriber server (HSS) of the network. For one example, the network may add a delay to the paging response timer based on the non-stationary status. For another example, the network may calculate a duration of the paging response timer based on the GNSS location availability of the UE. The network may start the paging response timer based on a coverage gap in time during which the UE is not covered by a cell of the network, the cell including an NTN cell or a terrestrial network (TN) cell. The network may start the paging response timer based on a time duration until a next coverage gap being greater than or equal to an additional delay for the UE to perform a time-frequency pre-compensation before initiating connection with the network.

It is understood that the specific order or hierarchy of blocks in the processes/flowcharts disclosed is an illustration of example approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." Terms such as "if," "when," and "while" should be interpreted to mean "under the condition that" rather than imply an immediate temporal relationship or reaction. That is, these phrases, e.g., "when," do not imply an immediate action in response to or during the occurrence of an action, but simply imply that if a condition is met then an action will occur, but without requiring a specific or immediate time constraint for the action to occur. The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

The following aspects are illustrative only and may be combined with other aspects or teachings described herein, without limitation.

Aspect 1 is an apparatus for wireless communication including at least one processor coupled to a memory and configured to transmit a UE capability indication to a network that indicates a GNSS location availability of the UE, receive a paging request from the network, obtain a location of the UE based on the GNSS location availability, and transmit a paging response to the network, the transmitting based on the location of the UE.

Aspect 2 is the apparatus of aspect 1, where the paging response is transmitted after an extended period following receipt of the paging request, the extended period being based on the UE capability indication that the UE transmitted to the network, the extended period being used by the at least one processor and the memory to obtain the location of the UE.

Aspect 3 is the apparatus of any of aspects 1 and 2, where the at least one processor and the memory further configured to estimate timing and frequency offsets based on the location of the UE, and transmit the paging response based on the timing and frequency offsets.

Aspect 4 is the apparatus of any of aspects 1 to 3, where the GNSS location availability of the UE indicates whether a time delay for obtaining the location of the UE using the GNSS is greater than or equal to a threshold value.

Aspect 5 is the apparatus of any of aspects 1 to 4, where the GNSS location availability of the UE indicates whether a time delay for obtaining the location of the UE using the GNSS is greater than or equal to a threshold value.

Aspect 6 is the apparatus of aspect 5, where the threshold value is one second.

Aspect 7 is the apparatus of any of aspects 1 to 6, where the GNSS location availability of the UE indicates the time delay for obtaining the location of the UE using the GNSS.

Aspect 8 is a method of wireless communication for implementing any of aspects 1 to 7.

Aspect 9 is an apparatus for wireless communication including means for implementing any of aspects 1 to 7.

Aspect 10 is a computer-readable medium storing computer executable code, where the code when executed by a processor causes the processor to implement any of aspects 1 to 7.

Aspect 11 is an apparatus for wireless communication including at least one processor coupled to a memory and configured to receive a UE capability indication from a UE that indicates a GNSS location availability of the UE, transmit a paging request to the UE, and manage a paging response timer based on the GNSS location availability of the UE, the paging response timer controlling a retransmission of the paging request based on whether a paging response is received from the UE.

Aspect 12 is the apparatus of aspect 11, where the at least one processor and the memory are further configured to retransmit the paging request based on an expiration of the paging response timer.

Aspect 13 is the apparatus of any of aspects 11 and 12, where the at least one processor and the memory are further configured to receive the paging response from the UE prior to an expiration of the paging response timer.

Aspect 14 is the apparatus of any of aspects 11 to 13, where the GNSS location availability of the UE is received as a UE communication parameter from a HSS of the network.

Aspect 15 is the apparatus of aspect 14, where the UE communication parameter includes a stationary indication of the UE, where, to manage the paging response timer, the at least one processor and the memory are further configured to increase the paging response timer based on the stationary indication.

Aspect 16 is the apparatus of any of aspects 11 to 15, where the GNSS location availability of the UE indicates whether the UE is specified with a time delay to obtain a location of the UE using the GNSS is greater than or equal to a threshold value.

Aspect 17 is the apparatus of aspect 16, where the GNSS location availability of the UE indicates that the time delay to obtain the location of the UE using the GNSS is greater than or equal to the threshold value, where, to manage the paging response timer, the at least one processor and the memory are further configured to increase the paging response timer based on the time delay of the UE to obtain the location of the UE being greater than the threshold value.

Aspect 18 is the apparatus of any of aspects 16 and 17, where the GNSS location availability of the UE indicates that the time delay to obtain the location of the UE using the GNSS is less than the threshold value, where, to manage the paging response timer, the at least one processor and the memory are further configured to not increase the paging response timer based on the time delay of the UE to obtain the location of the UE being less than the threshold value.

Aspect 19 is the apparatus of any of aspects 11 to 18, where, to manage the paging response timer, the at least one processor and the memory are configured to calculate a duration of the paging response timer based on the GNSS location availability of the UE.

Aspect 20 is the apparatus of aspect 19, where, to calculate the duration of the paging response timer, the at least one processor and the memory are further configured to add a first time delay to the paging response timer, the first time delay corresponding to an additional delay specified for the UE to perform a time-frequency pre-compensation before initiating connection with the network.

Aspect 21 is the apparatus of any of aspects 11 to 20, where the at least one processor and the memory are further configured to start the paging response timer based on a coverage gap in time during which the UE is not covered by a cell of the network, the cell including an NTN cell or a TN cell.

Aspect 22 is the apparatus of aspect 21, where the at least one processor and the memory are further configured to transmit a starting time and a duration of the coverage gap to the UE.

Aspect 23 is the apparatus of any of aspects 21 and 22, where the at least one processor and the memory are configured to start the paging response timer based on a time duration until a next coverage gap being greater than or equal to an additional delay for the UE to perform a time-frequency pre-compensation before initiating connection with the network.

Aspect 24 is the apparatus of any of aspects 11 to 23, where an NTN providing the NTN cell includes a satellite network.

Aspect 25 is a method of wireless communication for implementing any of aspects 11 to 24.

Aspect 26 is an apparatus for wireless communication including means for implementing any of aspects 11 to 24.

Aspect 27 is a computer-readable medium storing computer executable code, where the code when executed by a processor causes the processor to implement any of aspects 11 to 24.

Aspect 28 is an apparatus for wireless communication including at least one processor coupled to a memory and configured to determine a location acquisition status associated with a GNSS location of the UE, initiate a connection request for a NAS procedure based on the location acquisition status of the UE, and transmit the connection request to a network.

Aspect 29 is the apparatus of aspect 28, where the at least one processor and the memory are further configured to set a state of a NAS layer to a first state based on the location acquisition status indicating that the GNSS location is not available in a lower layer than the NAS layer, and delay initiation of the connection request at the NAS layer until the state of the NAS layer is changed to a second state based on the location acquisition status indicating that the GNSS location is available at the lower layer.

Aspect 30 is the apparatus of aspect 29, where the at least one processor and the memory are further configured to change the state of the NAS layer to the second state of the NAS layer in response to receiving an indication from the lower layer that the GNSS location is available, where the at least one processor and the memory are configured to transmit the connection request based on the state of the NAS layer being the second state.

Aspect 31 is the apparatus of any of aspects 29 and 30, where the at least one processor and the memory are further configured to indicate to an application layer of the UE that the connection request at the NAS layer is not transmitted due to the location acquisition status.

Aspect 32 is the apparatus of any of aspects 28 to 31, where the at least one processor and the memory are further configured to add a time delay to a NAS procedure timer based on the location acquisition status, the time delay being associated with a response to the connection request, and start the NAS procedure timer based on transmitting the connection request at a NAS layer, the NAS procedure timer corresponding to the location acquisition status of the UE.

Aspect 33 is the apparatus of aspect 32, where the time delay is added based on the location acquisition status indicating that the UE corresponds to a UE type with an additional delay for the location acquisition, and the time delay corresponds with the additional delay for the location acquisition.

Aspect 34 is the apparatus of aspect 33, where adding the time delay to the NAS procedure timer is further based on a time duration following a last uplink transmission being greater than or equal to a threshold value.

Aspect 35 is the apparatus of aspect 34, where the threshold value corresponds to a validity duration of the GNSS location.

Aspect 36 is the apparatus of any of aspects 28 to 35, where the at least one processor and the memory are further configured to omit transmission of a registration request message during a coverage gap in time during which the UE is not covered by a cell of the network, the cell including an NTN cell or a TN cell.

Aspect 37 is the apparatus of aspect 36, where an NTN providing the NTN cell includes a satellite network.

Aspect 38 is the apparatus of any of aspects 36 and 37, where the at least one processor and the memory are further configured to delay transmission of the registration request message until the UE is within coverage of the cell of the network.

Aspect 39 is the apparatus of aspect 38, where a starting time and a duration of the coverage gap is communicated to the UE by the network.

Aspect 40 is the apparatus of any of aspects 38 and 39, where the at least one processor and the memory are further configured to delay the transmission by a time delay based on a duration of the coverage gap.

Aspect 41 is a method of wireless communication for implementing any of aspects 28 to 40.

Aspect 42 is an apparatus for wireless communication including means for implementing any of aspects 28 to 40.

Aspect 43 is a computer-readable medium storing computer executable code, where the code when executed by a processor causes the processor to implement any of aspects 28 to 40.

What is claimed is:

1. A user equipment (UE), comprising:
   memory comprising instructions;
   a transceiver; and
   at least one processor configured to execute the instructions to cause the UE to:
      initiate a non-access stratum (NAS) message for a NAS procedure based on a location acquisition status associated with a global navigation satellite system (GNSS) location of the UE; and
      transmit, via the transceiver, the NAS message, wherein the transmission of the NAS message is omitted during a coverage gap in time during which the UE is not covered by a cell of a network, the cell comprising a non-terrestrial network (NTN) cell or a terrestrial network (TN) cell.

2. The UE of claim 1, wherein the at least one processor is further configured to execute the instructions to cause the UE to:
   set a state of a NAS layer to a first state based on the location acquisition status indicating that the GNSS location is not available in a layer that is lower than the NAS layer; and
   delay initiation of the NAS message at the NAS layer until the state of the NAS layer is changed to a second state based on the location acquisition status indicating that the GNSS location is available in the layer that is lower than the NAS layer.

3. The UE of claim 2, wherein the at least one processor is further configured to execute the instructions to cause the UE to:
   change the state of the NAS layer to the second state in response to receiving an indication that the GNSS location is available from the layer that is lower than the GNSS layer, and
   transmit, via the transceiver, the NAS message based on the state of the NAS layer being the second state.

4. The UE of claim 2, wherein the at least one processor is further configured to execute the instructions to cause the UE to:
   indicate to an application layer of the UE that the NAS message is not transmitted due to the location acquisition status.

5. The UE of claim 1, wherein the at least one processor is further configured to execute the instructions to cause the UE to:
   add a time delay to a NAS procedure timer based on the location acquisition status, the time delay being associated with a response to the NAS message; and
   start the NAS procedure timer based on transmitting the NAS message, the NAS procedure timer corresponding to the location acquisition status.

6. The UE of claim 5, wherein:
   the time delay is added based on the location acquisition status indicating that the UE corresponds to a UE type with an additional delay for a location acquisition; and
   the time delay corresponds with the additional delay for the location acquisition.

7. The UE of claim 6, wherein the time delay added to the NAS procedure timer is further based on a time duration following a last uplink transmission being greater than or equal to a threshold value.

8. The UE of claim 7, wherein the threshold value corresponds to a validity duration of the GNSS location.

9. The UE of claim 1, wherein the NAS message comprises a registration request message and further wherein the at least one processor is further configured to execute the instructions to cause the UE to delay the transmission of the registration request message until the UE is within coverage of the cell of the network.

10. The UE of claim 9, wherein the at least one processor is further configured to execute the instructions to cause the UE to receive, via the transceiver, a starting time and a duration of the coverage gap from the network.

11. The UE of claim 9, wherein the at least one processor is further configured to execute the instructions to cause the UE to delay the transmission by an amount of time that is based on a duration of the coverage gap.

12. The UE of claim 1, wherein the NAS procedure comprises a registration procedure.

13. A user equipment (UE), comprising:
memory comprising instructions;
a transceiver; and
at least one processor configured to execute the instructions to cause the UE to:
initiate a connection request for a non-access stratum (NAS) procedure based on a location acquisition status associated with a global navigation satellite system (GNSS) location of the UE;
set a state of a NAS layer to a first state based on the location acquisition status indicating that the GNSS location is not available in a layer that is lower than the NAS layer;
delay the initiation of the connection request at the NAS layer until the state of the NAS layer is changed to a second state based on the location acquisition status indicating that the GNSS location is available in the layer that is lower than the NAS layer; and
transmit, via the transceiver, the connection request.

14. The UE of claim 13, wherein the at least one processor is further configured to execute the instructions to cause the UE to:
change the state of the NAS layer to the second state in response to receiving an indication that the GNSS location is available from the layer that is lower than the GNSS layer, and
transmit, via the transceiver, the connection request based on the state of the NAS layer being the second state.

15. The UE of claim 13, wherein the at least one processor is further configured to execute the instructions to cause the UE to:
indicate to an application layer of the UE that the connection request is not transmitted due to the location acquisition status.

16. The UE of claim 13, wherein the NAS procedure comprises a registration procedure.

17. A user equipment (UE), comprising:
memory comprising instructions;
a transceiver; and
at least one processor configured to execute the instructions to cause the UE to:
initiate a connection request for a non-access stratum (NAS) procedure based on a location acquisition status associated with a global navigation satellite system (GNSS) location of the UE;
transmit, via the transceiver, the connection request;
add a time delay to a NAS procedure timer based on the location acquisition status, the time delay being associated with a response to the connection request; and
start the NAS procedure timer based on transmitting the connection request, the NAS procedure timer corresponding to the location acquisition status.

18. The UE of claim 17, wherein:
the time delay is added based on the location acquisition status indicating that the UE corresponds to a UE type with an additional delay for a location acquisition; and
the time delay corresponds with the additional delay for the location acquisition.

19. The UE of claim 18, wherein the time delay added to the NAS procedure timer is further based on a time duration following a last uplink transmission being greater than or equal to a threshold value.

20. The UE of claim 19, wherein the threshold value corresponds to a validity duration of the GNSS location.

21. The UE of claim 17, wherein the NAS procedure comprises a registration procedure.

* * * * *